United States Patent
Holmes et al.

(10) Patent No.: US 10,861,121 B2
(45) Date of Patent: Dec. 8, 2020

(54) METHODS OF MANUFACTURING SECURITY DOCUMENTS AND SECURITY DEVICES

(71) Applicant: DE LA RUE INTERNATIONAL LIMITED, Baskingstoke (GB)

(72) Inventors: Brian William Holmes, Fleet (GB); John Godfrey, London (GB); Ian Cornes, Bolton (GB); John O'Malley, Manchester (GB); Lawrence George Commander, Reading (GB)

(73) Assignee: DE LA RUE INTERNATIONAL LIMITED, Hampshire (GB)

( * ) Notice: Subject to any disclaimer, the term of this patent is extended or adjusted under 35 U.S.C. 154(b) by 250 days.

(21) Appl. No.: 15/740,172

(22) PCT Filed: Jul. 11, 2016

(86) PCT No.: PCT/GB2016/052081
§ 371 (c)(1),
(2) Date: Dec. 27, 2017

(87) PCT Pub. No.: WO2017/009616
PCT Pub. Date: Jan. 19, 2017

(65) Prior Publication Data
US 2018/0186166 A1    Jul. 5, 2018

(30) Foreign Application Priority Data
Jul. 10, 2015   (GB) .................................. 1512118.9

(51) Int. Cl.
*G06T 1/00*     (2006.01)
*B29D 11/00*    (2006.01)
(Continued)

(52) U.S. Cl.
CPC ...... *G06T 1/0014* (2013.01); *B29D 11/00298* (2013.01); *B29D 11/00365* (2013.01);
(Continued)

(58) Field of Classification Search
CPC ..................... G06T 1/0014; G06T 7/80; G06T 2207/30144; B42D 25/324; B42D 25/342;
(Continued)

(56) References Cited

U.S. PATENT DOCUMENTS

| 4,892,336 A | 1/1990 | Kaule et al. |
| 5,330,799 A | 7/1994 | Sandor et al. |

(Continued)

FOREIGN PATENT DOCUMENTS

| EP | 1 008 616 B1 | 6/2000 |
| GB | 2490780 A | 11/2012 |

(Continued)

OTHER PUBLICATIONS

Jan. 8, 2016 Search Report issued in United Kingdom Patent Application No. GB 1512118.9.

(Continued)

*Primary Examiner* — David H Banh
(74) *Attorney, Agent, or Firm* — Oliff PLC

(57) ABSTRACT

A method of manufacturing a security document, including: providing a polymer substrate having first and second surfaces; and: applying an array of focussing elements to the first surface of the polymer substrate across a first region; forming an image array by: providing a die form having a surface including an arrangement of raised areas and recessed areas defining the pattern; applying a first curable material to the surface of the die form so it substantially fills the recessed areas; bringing a pattern support layer in contact with the surface of the die form so it covers the recessed areas; separating the pattern support layer from the (Continued)

surface of the die form so the first curable material in the recessed areas is removed from the recessed areas and retained on the pattern support layer; and at least partly curing the first curable material in one or more curing steps.

17 Claims, 18 Drawing Sheets

(51) Int. Cl.
| | |
|---|---|
| *G02B 3/00* | (2006.01) |
| *B42D 25/425* | (2014.01) |
| *B42D 25/45* | (2014.01) |
| *B42D 25/455* | (2014.01) |
| *B42D 25/324* | (2014.01) |
| *B42D 25/46* | (2014.01) |
| *B42D 25/355* | (2014.01) |
| *B42D 25/378* | (2014.01) |
| *B42D 25/48* | (2014.01) |
| *B42D 25/342* | (2014.01) |
| *B42D 25/351* | (2014.01) |
| *B41M 3/14* | (2006.01) |
| *G02B 1/04* | (2006.01) |
| *G06T 7/80* | (2017.01) |
| *G06K 9/32* | (2006.01) |
| *H04N 1/00* | (2006.01) |
| *H04N 5/232* | (2006.01) |
| *H04N 5/247* | (2006.01) |
| *B42D 25/29* | (2014.01) |
| *B42D 25/23* | (2014.01) |
| *B42D 25/24* | (2014.01) |
| *B42D 25/47* | (2014.01) |

(52) U.S. Cl.
CPC ......... *B29D 11/00442* (2013.01); *B41M 3/14* (2013.01); *B42D 25/324* (2014.10); *B42D 25/342* (2014.10); *B42D 25/351* (2014.10); *B42D 25/355* (2014.10); *B42D 25/378* (2014.10); *B42D 25/425* (2014.10); *B42D 25/45* (2014.10); *B42D 25/455* (2014.10); *B42D 25/46* (2014.10); *B42D 25/48* (2014.10); *G02B 1/041* (2013.01); *G02B 3/005* (2013.01); *G02B 3/0006* (2013.01); *G02B 3/0012* (2013.01); *G02B 3/0031* (2013.01); *G06K 9/3216* (2013.01); *G06K 9/3275* (2013.01); *G06T 7/80* (2017.01); *H04N 1/00267* (2013.01); *H04N 5/23212* (2013.01); *H04N 5/247* (2013.01); *B42D 25/23* (2014.10); *B42D 25/24* (2014.10); *B42D 25/29* (2014.10); *B42D 25/47* (2014.10); *G06K 2009/3225* (2013.01); *G06T 2207/30144* (2013.01)

(58) Field of Classification Search
CPC .. B42D 25/351; B42D 25/355; B42D 25/378; B42D 25/425; B42D 25/45; B42D 25/455; B42D 25/46; B42D 25/48; B42D 25/23; B42D 25/24; B42D 25/29; B42D 25/47; B29D 11/00298; B29D 11/00365; B29D 11/00442; B41M 3/14; G02B 1/041; G02B 3/0006; G02B 3/0012; G02B 3/0031; G02B 3/005; G06K 9/3216; G06K 9/3275; G06K 2009/3225; H04N 1/00267; H04N 5/23212; H04N 5/247

See application file for complete search history.

(56) References Cited

U.S. PATENT DOCUMENTS

| | | | |
|---|---|---|---|
| 5,712,731 A * | 1/1998 | Drinkwater | G02B 5/1885 |
| | | | 359/619 |
| 6,856,462 B1 | 2/2005 | Scarbrough et al. | |
| 7,609,451 B1 | 10/2009 | Scarbrough | |
| 8,908,276 B2 * | 12/2014 | Holmes | G07D 7/207 |
| | | | 359/618 |
| 9,804,497 B2 * | 10/2017 | Lister | B42D 25/42 |
| 2004/0070836 A1 | 4/2004 | Rosenthal | |
| 2006/0162853 A1* | 7/2006 | Elbers | B41M 3/148 |
| | | | 156/209 |
| 2008/0037131 A1* | 2/2008 | Steenblik | B44F 1/10 |
| | | | 359/619 |
| 2009/0297805 A1 | 12/2009 | Dichtl | |
| 2011/0045248 A1 | 2/2011 | Hoffmuller et al. | |
| 2011/0063644 A1* | 3/2011 | Niihara | B41J 15/04 |
| | | | 358/1.12 |
| 2011/0116152 A1 | 5/2011 | Guigan et al. | |
| 2012/0268819 A1* | 10/2012 | Commander | G02B 27/2214 |
| | | | 359/566 |
| 2012/0274998 A1* | 11/2012 | Holmes | G02B 27/2214 |
| | | | 359/2 |
| 2012/0321793 A1 | 12/2012 | Lundvall et al. | |
| 2013/0071568 A1 | 3/2013 | Guigan | |
| 2013/0094789 A1 | 4/2013 | Hoffman et al. | |
| 2014/0319739 A1* | 10/2014 | Tombs | G03G 15/224 |
| | | | 264/447 |
| 2014/0322380 A1* | 10/2014 | Tombs | G03G 15/6585 |
| | | | 425/385 |
| 2015/0061280 A1* | 3/2015 | Power | G02B 5/1828 |
| | | | 283/85 |
| 2015/0068377 A1* | 3/2015 | Chanclon | B26D 5/00 |
| | | | 83/37 |
| 2017/0120634 A1* | 5/2017 | Angulo Navarro | B41J 11/663 |

FOREIGN PATENT DOCUMENTS

| | | |
|---|---|---|
| GB | 2503783 A | 1/2014 |
| GB | 2520605 A | 5/2015 |
| WO | 94/27254 A1 | 11/1994 |
| WO | 2005/052650 A2 | 6/2005 |
| WO | 2005/106601 A2 | 11/2005 |
| WO | 2008/042631 A1 | 4/2008 |
| WO | 2011/051668 A1 | 5/2011 |
| WO | 2011/051669 A1 | 5/2011 |
| WO | 2011/051670 A2 | 5/2011 |
| WO | 2011/102800 A1 | 8/2011 |
| WO | 2011/107782 A1 | 9/2011 |
| WO | 2011/107783 A1 | 9/2011 |
| WO | 2011/116425 A1 | 9/2011 |
| WO | 2012/027779 A1 | 3/2012 |
| WO | 2013/167887 A1 | 11/2013 |
| WO | 2014/000020 A1 | 1/2014 |
| WO | 2014/070079 A1 | 5/2014 |
| WO | 2014/184559 A1 | 11/2014 |
| WO | 2015/011493 A1 | 1/2015 |
| WO | 2015/011494 A1 | 1/2015 |
| WO | 2015/044671 A1 | 4/2015 |

OTHER PUBLICATIONS

Oct. 31, 2017 Combined Search Report and Examination Report issued in United Kingdom Patent Application No. GB 1709454.1.
Sep. 26, 2017 Combined Search Report and Examination issued in United Kingdom Patent Application No. GB 1714332.2.
Dec. 8, 2016 International Search Report and Written Opinion issued in International Patent Application No. PCT/GB2016/052081.
Jan. 16, 2018 International Preliminary Report on Patentability issued in International Patent Application No. PCT/GB2016/052081.

* cited by examiner

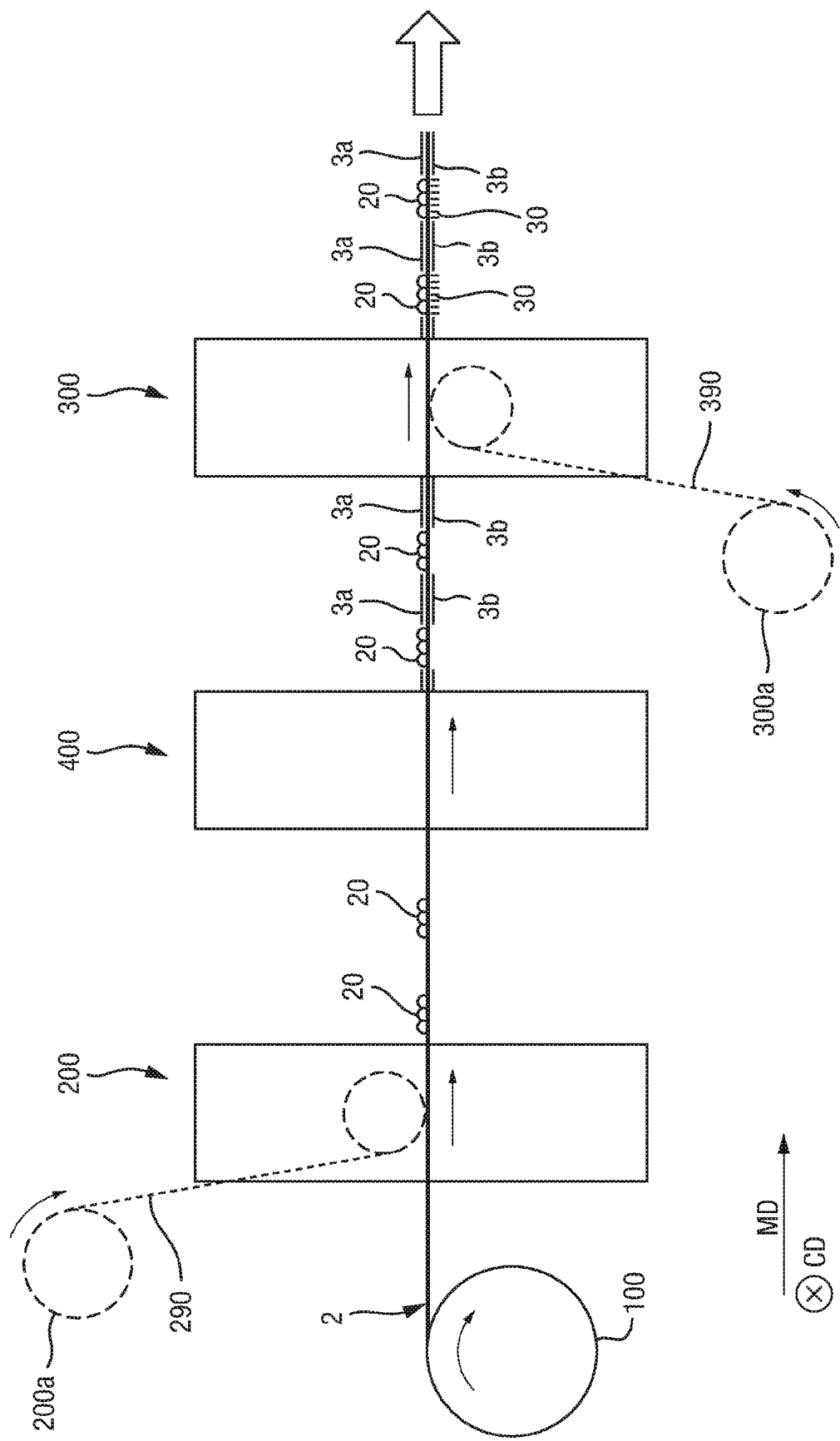

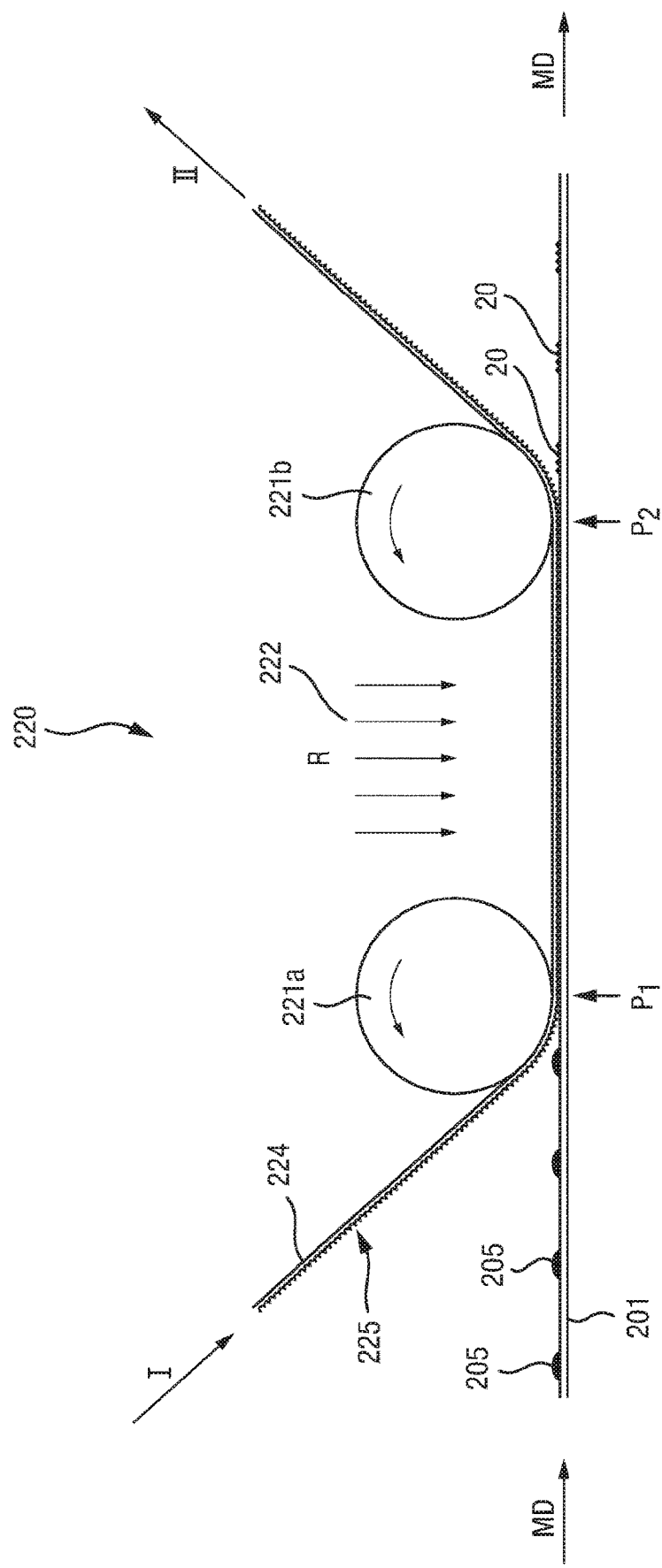

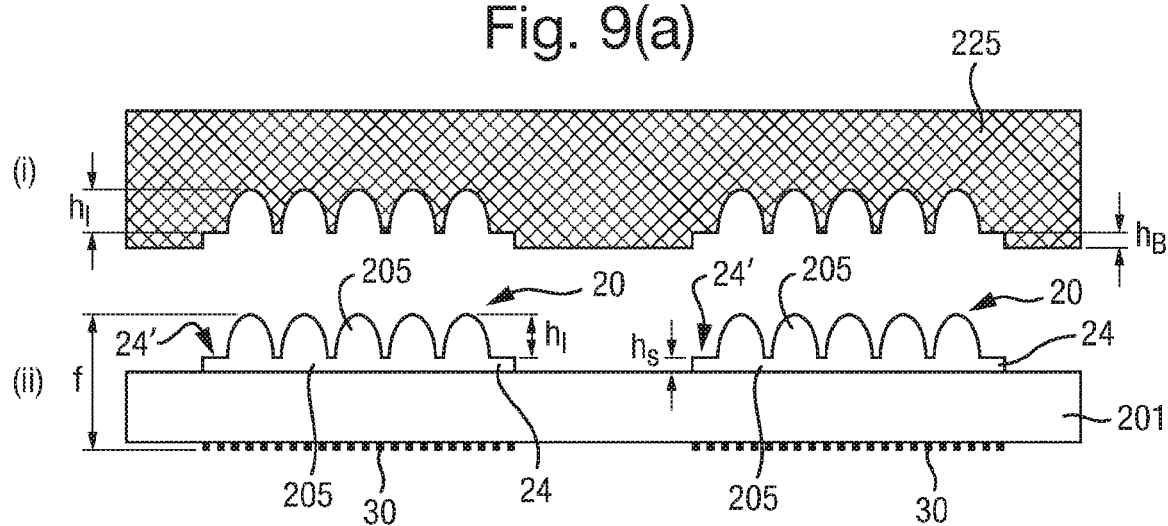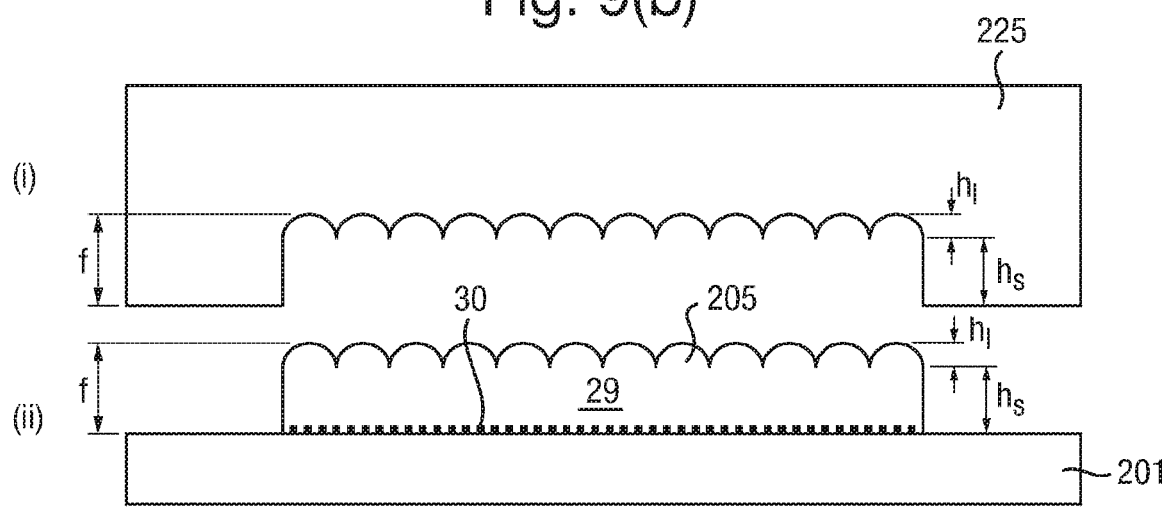

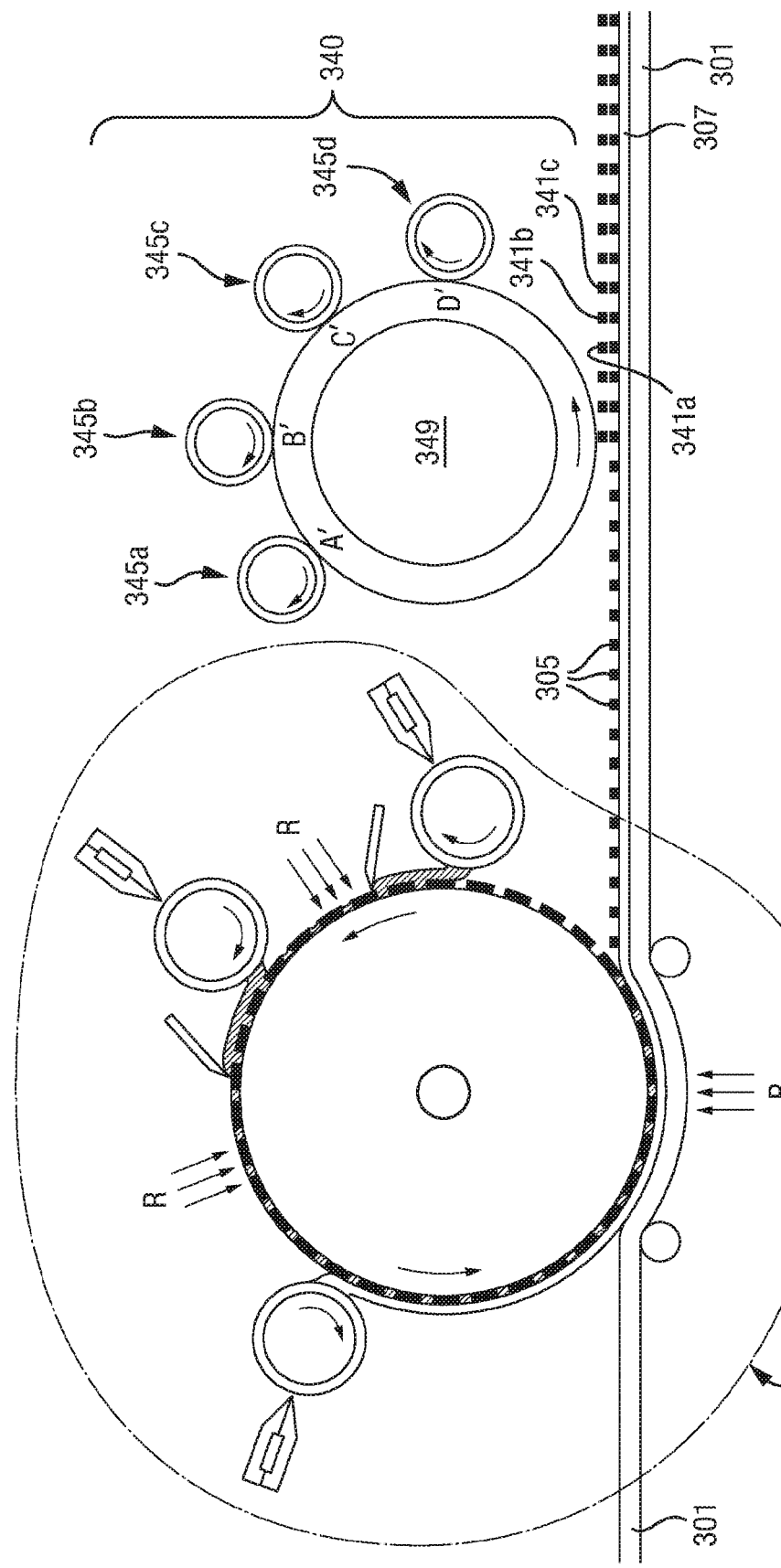

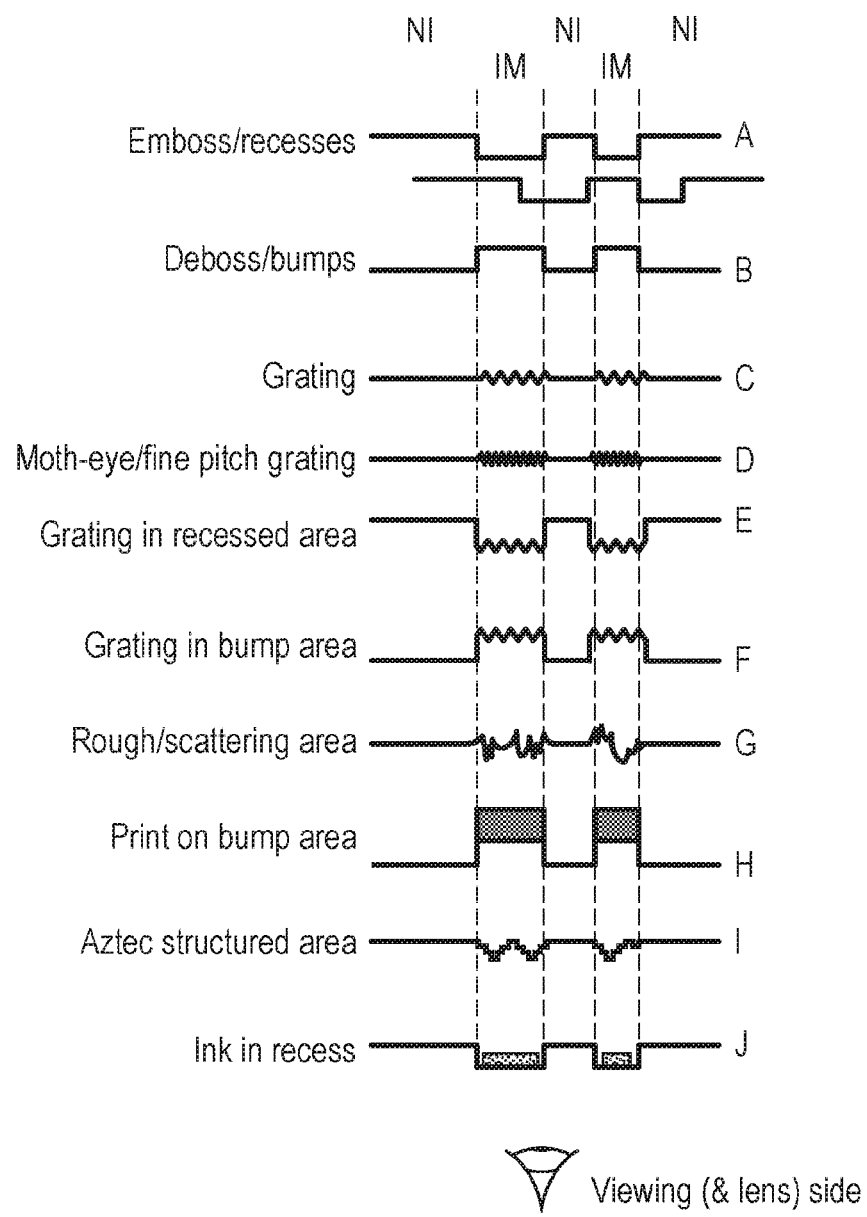

METHODS OF MANUFACTURING SECURITY DOCUMENTS AND SECURITY DEVICES

This invention relates to methods of manufacturing security documents and security devices, and to the corresponding products. Security devices are typically used on security documents such as banknotes, cheques, passports, identity cards, certificates of authenticity, fiscal stamps and other secure documents, in order to confirm their authenticity.

Articles of value, and particularly documents of value such as banknotes, cheques, passports, identification documents, certificates and licences, are frequently the target of counterfeiters and persons wishing to make fraudulent copies thereof and/or changes to any data contained therein. Typically such objects are provided with a number of visible security devices for checking the authenticity of the object. By "security device" we mean a feature which it is not possible to reproduce accurately by taking a visible light copy, e.g. through the use of standardly available photocopying or scanning equipment. Examples include features based on one or more patterns such as microtext, fine line patterns, latent images, venetian blind devices, lenticular devices, moiré interference devices and moiré magnification devices, each of which generates a secure visual effect. Other known security devices include holograms, watermarks, embossings, perforations and the use of colour-shifting or luminescent/fluorescent inks. Common to all such devices is that the visual effect exhibited by the device is extremely difficult, or impossible, to copy using available reproduction techniques such as photocopying. Security devices exhibiting non-visible effects such as magnetic materials may also be employed.

One class of security devices are those which produce an optically variable effect, meaning that the appearance of the device is different at different angles of view. Such devices are particularly effective since direct copies (e.g. photocopies) will not produce the optically variable effect and hence can be readily distinguished from genuine devices. Optically variable effects can be generated based on various different mechanisms, including holograms and other diffractive devices, moiré interference and other mechanisms relying on parallax such as venetian blind devices, and also devices which make use of focussing elements such as lenses, including moiré magnifier devices, integral imaging devices and so-called lenticular devices.

Security devices comprising focussing elements typically require the use of at least one transparent material either to act as an optical spacer between the focussing elements and an image, or image array, on which the focussing elements are to focus, or to act as a support for the focussing element so that some other object can be viewed therethrough. As such, security devices comprising focussing elements are particularly well suited to deployment on security documents based on polymer document substrates, such as polymer banknotes, since the polymer document substrate can be selected to be transparent and so provide one or both of the above functions if desired. Therefore, in the main part the present disclosure relates to polymer-based security documents.

However, other aspects of the invention disclosed herein are not so limited as will be made clear below. For example, the security devices can be formed using a transparent material which is applied to a security document of any sort, such as a conventional paper-based document, e.g. in the form of a security article such as a thread, strip, patch, foil or inserted which is incorporated into or applied onto the security document.

Several aspects of the invention involve the provision of a focussing element array and an image array located approximately in the focal plane of the focussing element array such that the focussing element array exhibits a substantially focussed image of the image array. This focussed image may preferably be optically variable and could for example be based on any of the mechanisms detailed below. It should be appreciated that in all aspects of the invention the focussing element array and image array could optionally be configured to provide any one or more of these effects, unless otherwise specified:

Moiré magnifier devices (examples of which are described in EP-A-1695121, WO-A-94/27254, WO-A-2011/107782 and WO2011/107783) make use of an array of focusing elements (such as lenses or mirrors) and a corresponding array of microimages, wherein the pitches of the focusing elements and the array of microimages and/or their relative locations are mismatched with the array of focusing elements such that a magnified version of the microimages is generated due to the moiré effect. Each microimage is a complete, miniature version of the image which is ultimately observed, and the array of focusing elements acts to select and magnify a small portion of each underlying microimage, which portions are combined by the human eye such that the whole, magnified image is visualised. This mechanism is sometimes referred to as "synthetic magnification". The magnified array appears to move relative to the device upon tilting and can be configured to appear above or below the surface of the device itself. The degree of magnification depends, inter alia, on the degree of pitch mismatch and/or angular mismatch between the focusing element array and the microimage array.

Integral imaging devices are similar to moiré magnifier devices in that an array of microimages is provided under a corresponding array of lenses, each microimage being a miniature version of the image to be displayed. However here there is no mismatch between the lenses and the microimages. Instead a visual effect is created by arranging for each microimage to be a view of the same object but from a different viewpoint. When the device is tilted, different ones of the images are magnified by the lenses such that the impression of a three-dimensional image is given.

"Hybrid" devices also exist which combine features of moiré magnification devices with those of integral imaging devices. In a "pure" moiré magnification device, the microimages forming the array will generally be identical to one another. Likewise in a "pure" integral imaging device there will be no mismatch between the arrays, as described above. A "hybrid" moiré magnification/integral imaging device utilises an array of microimages which differ slightly from one another, showing different views of an object, as in an integral imaging device. However, as in a moiré magnification device there is a mismatch between the focusing element array and the microimage array, resulting in a synthetically magnified version of the microimage array, due to the moiré effect, the magnified microimages having a three-dimensional appearance. Since the visual effect is a result of the moiré effect, such hybrid devices are considered a subset of moiré magnification devices for the purposes of the present disclosure. In general, therefore, the microimages provided in a moiré magnification device should be substantially identical in the sense that they are either exactly the same as one another (pure moiré magnifiers) or show the same object/scene but from different viewpoints (hybrid devices).

Moiré magnifiers, integral imaging devices and hybrid devices can all be configured to operate in just one dimension (e.g. utilising cylindrical lenses) or in two dimensions (e.g. comprising a 2D array of spherical or aspherical lenses).

Lenticular devices on the other hand do not rely upon magnification, synthetic or otherwise. An array of focusing elements, typically cylindrical lenses, overlies a corresponding array of image sections, or "slices", each of which depicts only a portion of an image which is to be displayed. Image slices from two or more different images are interleaved and, when viewed through the focusing elements, at each viewing angle, only selected image slices will be directed towards the viewer. In this way, different composite images can be viewed at different angles. However it should be appreciated that no magnification typically takes place and the resulting image which is observed will be of substantially the same size as that to which the underlying image slices are formed. Some examples of lenticular devices are described in U.S. Pat. No. 4,892,336, WO-A-2011/051669, WO-A-2011051670, WO-A-2012/027779 and U.S. Pat. No. 6,856,462. More recently, two-dimensional lenticular devices have also been developed and examples of these are disclosed in British patent application numbers 1313362.4 and 1313363.2. Lenticular devices have the advantage that different images can be displayed at different viewing angles, giving rise to the possibility of animation and other striking visual effects which are not possible using the moiré magnifier or integral imaging techniques.

Arrays of lenses or other focussing elements can also be used as a security device on their own (i.e. without a corresponding image array), since they can be used to exhibit a magnified or distorted view of any background they may be placed against, or scene viewed therethrough. This effect cannot be replicated by photocopying or similar.

Aspects of the present invention provide improved methods of manufacturing security documents comprising security devices of the sorts described above.

A first aspect of the present invention provides a method of manufacturing a security document, comprising:
providing a polymer substrate having first and second surfaces; and, in any order:
 (a) applying an array of focussing elements to the first surface of the polymer substrate across a first region
 (b) forming an image array comprising a pattern of a first curable material (preferably having a visible colour), by:
  (b)(i) providing a die form, the die form having a surface comprising an arrangement of raised areas and recessed areas defining the pattern;
  (b)(ii) applying a first curable material to the surface of the die form such that said first curable material substantially fills the recessed areas;
  (b)(iii) bringing a pattern support layer in contact with the surface of the die form such that it covers the recessed areas;
  (b)(iv) separating the pattern support layer from the surface of the die form such that the first curable material in the recessed areas is removed from said recessed areas and retained on the pattern support layer in accordance with the pattern; and
  (b)(v) during and/or after step (b)(ii), at least partly curing the first curable material in one or more curing steps;
  wherein either the pattern support layer comprises the polymer substrate or step (b) further comprises applying the pattern support layer to the polymer substrate, such that the image array is located in a plane spaced from the array of focussing elements by a distance substantially equal to the focal length of the focussing elements whereby the focussing elements exhibit a substantially focussed image of the image array; and
 (c) applying at least one opacifying layer to the first and/or second surfaces of the polymer substrate, the or each opacifying layer comprising a non-transparent material, wherein either the image array is located between the array of focussing elements and the at least one opacifying layer on the first surface of the substrate, or at least the opacifying layer(s) on the first surface of the substrate define a gap forming a window region in which at least part of the array of focussing elements is disposed such that a substantially focussed image of at least part of the image array is displayed in the window region.

Security devices such as moiré magnifiers, integral imaging devices and lenticular devices, as well as others involving the use of focusing elements, depend for their success significantly on the resolution with which the image array (comprising e.g. microimages or image elements) can be formed. Since the security device must be thin in order to be incorporated into a document such as a banknote, any focusing elements required must also be thin, which by their nature also limits their lateral dimensions. For example, lenses used in such security elements preferably have a width or diameter of 50 microns or less, e.g. 30 microns. In a lenticular device this leads to the requirement that each image element must have a width which is at most half the lens width. For example, in a "two channel" lenticular switch device which displays only two images (one across a first range of viewing angles and the other across the remaining viewing angles), where the lenses are of 30 micron width, each image element must have a width of 15 microns or less. More complicated lenticular effects such as animation, motion or 3D effects usually require more than two interlaced images and hence each element needs to be even finer in order to fit all of the image elements into the optical footprint of each lens. For instance, in a "six channel" device with six interlaced images, where the lenses are of 30 micron width, each image element must have a width of 5 microns or less.

Similarly high-resolution image elements are also required in moiré magnifiers and integral imaging devices since approximately one microimage must be provided for each focusing element and again this means in effect that each microimage must be formed within a small area of e.g. 30 by 30 microns. In order for the microimage to carry any detail, fine linewidths of 5 microns or less are therefore highly desirable.

Conventional processes used to manufacture image elements for security devices are based on printing and include intaglio, gravure, wet lithographic printing as well as dry lithographic printing. The achievable resolution is limited by several factors, including the viscosity, wettability and chemistry of the ink, as well as the surface energy, unevenness and wicking ability of the substrate, all of which lead to ink spreading. With careful design and implementation, such techniques can be used to print pattern elements with a line width of between 25 μm and 50 μm. For example, with gravure or wet lithographic printing it is possible to achieve line widths down to about 15 μm.

In contrast, the method defined in step (b) above can be used to achieve a very high resolution pattern, e.g. with pattern elements of 10 microns line width or less. Exemplary implementations of the step (b) method are described in WO-A-2014/070079, US-A-2009/0297805 and WO-A-2011/102800, each of which is incorporated herein by reference.

The present inventors have found that particular benefits are achieved where this method of forming the image array is incorporated into the production of a polymer-based security document, such as a polymer banknote. One advantage is that all of the recited components of the security document can, if desired, be formed using web-based techniques meaning that all steps can optionally be carried out as part of an in-line process, resulting in fast, high-volume output of security documents (or at least a security document precursor, ready for final printing and cutting). Another advantage is that the polymer substrate of the document itself can be transparent and act as an optical spacer between the array of focussing elements and the image array. Since a polymer document substrate can have a greater thickness than would be permissible for an article such as a thread or strip which is to be affixed to such a document substrate (e.g. approximately 70 microns rather than approximately 30 microns), this increase in available optical spacing lessens the constraints on the size of the elements forming the image array. Nonetheless by utilizing the high resolution image array formation technique defined in step (b) not only can the remaining constraints be met but they can be met comfortably, allowing for the creation of more complex effects, e.g. a greater number of channels in a lenticular device.

Thus, preferably the image array is located on the second surface of the polymer substrate. However, in other cases the image array or a second image array could be provided on the first surface of the polymer substrate, e.g. if the focussing element array is formed in an additional transparent layer applied to the first surface of the polymer substrate and itself provides the necessary optical spacing. Such an additional transparent layer could be provided by laminating a component carrying the focussing element array onto the first surface, or by cast curing for instance.

In a particularly preferred embodiment, step (b)(ii) comprises applying the first curable material to the surface of the die form in at least two sequential application steps such that any of the recessed areas not substantially filled in the first application step are substantially filled in the second or subsequent application step(s). In this case, the curing could all take place once all the application steps have been completed. However, preferably step (b)(v) comprises at least partially curing the first curable material in the recessed areas between each sequential application step in step (b)(ii). In a particularly preferred implementation, the first curable material applied to the surface of the die form in the last of the at least two sequential application steps is only partially cured (if at all) before step (b)(iii) and fully cured once the pattern support layer has been brought in contact with the die form. Thus, the preceding application(s) of curable material may be fully cured before the last is applied which remains at least partly uncured when it contacts the pattern support layer, thereby improving adhesion with the support layer. The material can then be fully cured once in contact resulting in a particularly strong bond.

In step (b)(ii) the first curable material could be applied in such a way that it is only deposited into the recessed areas, e.g. by appropriate selection of its viscosity or by application using a doctor chamber. However, preferably step (b)(ii) further comprises removing any excess first curable material from the surface of the die form outside the recessed areas, preferably using a doctor blade or by polishing.

In a particularly preferred embodiment, step (b) further comprises, after step (b)(ii) and before step (b)(iii):
  (b)(ii') covering the surface of the die form and the recessed areas filled with the first curable material with a second curable material;
  wherein step (b)(v) further comprises at least partly curing the second curable compound, and in step (b)(iii) the pattern support layer contacts the second curable material on the surface of the die form such that in step (b)(iv) the second curable material is additionally retained on the pattern support layer, the first curable material being retained on the second curable material in accordance with the pattern. This technique has been found to improve the bonding between the pattern elements and the pattern support layer.

Alternatively, step (b) may advantageously further comprise, before step (b)(iii):
  (b)(ii") applying a second curable material to the pattern support layer;
  wherein step (b)(v) further comprises at least partly curing the second curable compound, and in step (b)(iii) the second curable material on the surface of the pattern support layer contacts the die form such that in step (b)(iv) the first curable material is retained on the second curable material in accordance with the pattern. In this case it is desirable that the pattern support layer carrying the second curable material is pressed against the surface of the die form with some pressure to ensure good bonding.

In some embodiments, the second curable material will be transparent so that the pattern can be viewed from either side (provided the pattern support is also transparent). However in some preferred implementations, the second curable material is a substantially non-transparent material in the visible spectrum, the non-transparent second curable material preferably forming one of the at least one opacifying layers applied in step (c). Thus, the second curable material may extend over substantially the whole of the polymer substrate except for any desired window regions. The said opacifying layer can be used as an optical barrier in a dual-sided device as described in a later aspect of the invention.

In further preferred embodiments, the second curable material is configured to act as an anti-static layer. Advantageously, therefore, the second curable material comprises an electrically conductive substance. For instance, the second curable material could contain a dispersion of conductive particles such as graphite, or could comprise an additive such as any of those disclosed in EP1008616, WO2014/000020 and WO2008/042631. Transparent conductive additives are particularly preferred so that the appearance of the layer is substantially unaffected. However as mentioned above the second curable material as a whole may be either transparent or non-transparent.

The second curable material preferably has enhanced adhesion properties relative to the first curable material such that it acts to help retain the first curable material on the support layer.

In a particularly preferred implementation, the first curable material retained on the pattern support layer in step (b)(iv) is in the form of a plurality of printed features which correspond to the pattern, each of the plurality of printed features projecting away from the pattern support layer to form a raised surface of the plurality of printed features, the plurality of printed features being separated from each other by gaps in the first curable material on the pattern support layer, and step (b) further comprises, after step (b)(iv) and preferably step (b)(v):

(b)(vi) applying at least one optically detectable material to at least a portion of the pattern support layer either such that the at least one optically detectable material is present on only the raised surface of the printed features, and is substantially not present in the gaps in the first curable material on the pattern support layer, which separate the printed features, or such that the at least one optically detectable material is present on only in the gaps in the first curable material on the pattern support layer, which separate the printed features and is substantially not present on the raised surface of the printed features.

This approach allows the appearance of the pattern to be modified by the application of the at least one optically detectable material. Thus, the first curable material could be of any appearance (including transparent and/or colourless) whilst the optically detectable material can for instance have a colour which contrasts with the underlying support layer in order to render the pattern visible, or machine readable if the optically detecting material emits/reflects outside the visible spectrum only (e.g. UV luminescence). The at least one optically detectable material can be placed only in the recesses or only on the raised surfaces by controlling the parameters of the application process in step (b)(vi), e.g. the viscosity of the material(s) and the pressure and temperature at which they are applied. Exemplary processes and suitable parameters for achieving this are disclosed in US20110045248. Different materials could also be applied into the recesses and onto the tops of the relief, respectively.

Advantageously, at least two optically detectable materials with different optical detection characteristics may be applied to laterally-offset regions of the pattern in step (b)(vi). For example, the at least two materials may have different visible colours. In this way a multi-coloured pattern or image can be applied to the pattern and retained only in the recesses or only on the tops of the relief, whereby the high-resolution nature of the pattern is retained. The at least two materials are preferably applied in register with one another, but do not need to be registered to the pattern.

Preferably, the image array is configured so as to co-operate with the array of focussing elements to generate an optically variable effect. For example, in a particularly preferred embodiment, the image array comprises a micro-image array, and the pitches of the focusing element array and of the microimage array and their relative orientations are such that the focusing element array co-operates with the microimage array to generate a magnified version of the microimage array due to the moiré effect. (Moiré magnifier)

In another case, the image array comprises a microimage array, the microimages all depicting the same object from a different viewpoint, and the pitches and orientation of the focusing element array and of the microimage array are the same, such that the focusing element array co-operates with the microimage array to generate a magnified, optically-variable version of the object. (Integral imaging device)

In a still further example, the image array comprises a set of first image elements comprising portions of a first image, interleaved with a set of second image elements comprising portions of a second image, the focusing element array being configured such that each focusing element can direct light from a respective one of the first image elements or from a respective one of the second image elements therebetween in dependence on the viewing angle, whereby depending on the viewing angle the array of focusing elements directs light from either the set of first image elements or from the second image elements therebetween, such that as the device is tilted, the first image is displayed to the viewer at a first range of viewing angles and the second image is displayed to the viewer at a second, different range of viewing angles. (Lenticular device)

The focussing element array can be formed using various different techniques including embossing into the polymer substrate. In a particularly preferred embodiment, in step (a), the focussing element array is formed by:

(a)(i) applying at least one transparent curable material to a focussing element support layer (which is preferably transparent) or to a casting tool carrying a surface relief corresponding to the focussing elements, at least over an area corresponding to that of the first region;

(a)(ii) forming the transparent curable material(s) with the casting tool; and (a)(iii) curing the transparent curable material(s) so as to retain the surface relief;

wherein either the focussing element support layer comprises the polymer substrate or step (a) further comprises applying the focussing element support layer to the first surface of the polymer substrate, at least across the first region. This process is frequently referred to as cast-curing.

Advantageously, the at least one transparent curable material is applied to the focussing element support layer or to the casting tool only over the area corresponding to that of the first region and the casting tool carries the surface relief over an area extending beyond that of the first region, preferably over substantially the whole area of the casting tool. In this way the lateral size and shape of the focussing element array can be determined solely by the application of the curable material, with the surface relief being formed by a standard casting tool. This enables differently shaped focussing element arrays to be formed using the same equipment through control of the application process only, making the method well adapted for the production of devices which are customised, e.g. to a particular series of banknotes, without having to produce a specific casting tool for the purpose.

The required optical spacing between the focussing element array and the image array could be provided by another component of the security document, e.g. the polymer substrate, but in preferred embodiments, the surface relief on the casting tool is configured such that the thickness of the formed transparent curable material, optionally plus that of the focussing element support layer, is substantially equal to the focal length of the formed focussing elements, whereby preferably the focal plane of the array substantially corresponds to the first surface or the second surface of the polymer substrate. In other words, the surface relief cast into the curable material includes an optical spacing region between the focussing elements and the opposite surface of the curable material. This may amount to the entire focal length, in which case the curable material may itself provide all the optical spacing necessary between the focussing elements and the image array, or could be only part of it. In the former case this enables the entire security device (i.e. the focussing elements and the image array) to be provided on one side of the polymer substrate. This is particularly desirable in dual-sided configurations as discussed below but can also be beneficial e.g. if it is not desired to include a window in the design of the security document.

Preferably the casting tool comprises a cylinder carrying a sheet in which the surface relief is defined on its circumference, the casting tool cylinder being registered to the application of the at least one opacifying layer such that the join between the ends of the sheet on the cylinder falls within an area of the polymer substrate that has been or will be covered with the at least one opacifying layer. In this way any incomplete focussing elements or interruptions in the focussing element array can be hidden and do not detract from the appearance of the document.

In an alternative to cast-curing, in step (a) the focussing element array may be formed by printing a doming resin on to a focussing element support layer in accordance with the desired array pattern, the doming resin having a surface energy configured such that the doming resin adopts a profile capable of focussing light upon deposition onto the focussing element support layer, wherein either the focussing element support layer comprises the polymer substrate or step (a) further comprises applying the focussing element support layer to the first surface of the polymer substrate, at least across the first region. Examples of suitable doming resins can be found in U.S. Pat. No. 7,609,451 or US-A-2011/0116152, and include UV curable polymer resins such as those based on epoxyacrylates, polyether acrylates, polyester acrylates and urethane acrylates. Examples include Nasdar™ 3527 supplied by Nasdar Company and Rad-Cure™ VM4SP supplied by Rad-Cure Corporation.

In another alternative, in step (a) the focussing element array may be formed by treating the surface of a focussing element support layer so as to vary its surface properties, preferably its surface energy, in accordance with the desired array pattern and applying a transparent substance over the focussing element support layer, whereby the transparent substance reticulates due to the treated surface so as to form the focussing elements. Further details as to how the surface may be treated to vary the surface properties and examples of suitable materials are given in US-A-20130071586.

In some preferred implementations, the focussing element array includes focussing elements of different focal lengths, preferably having different heights. This can be used to increase the complexity of the optical effects achieved.

The method may advantageously further comprise applying a camouflaging layer over the image array between the image array and the viewer on the opposite side of the security document from that on which the focussed image of the image array not visible, the camouflaging layer preferably comprising a layer of iridescent, colour-shifting or liquid crystal material, optionally a patterned layer. This improves the appearance of the device from the side of the document on which the focussed image is not visible.

In one particularly preferred embodiment, the focussing element array and the image array are provided on the same side of the at least one opacifying layer, the at least one opacifying layer lying between the image array and the polymer substrate, and the focussing element array and the image array extend across at least 25% of the whole area of the polymer substrate, more preferably at least 50%, still preferably at least 70% and most preferably substantially the whole area of the polymer substrate. This enables the optical effect to be exhibit across a large area, rather than being confined to a window region, thereby increasing the visual impact. The document may still be provided with standard (static) graphics, e.g. security fine-line patterns, portraits and the like, which may be printed on the at least one opacifying layer or over the focussing element array. If the former, the image array is preferably configured to have a low optical density (e.g. fill factor) so that it does not significantly obstruct the appearance of the static graphics. For example a moiré magnifier or integral imaging type array of micro-images is particularly suitable for use as the image array in this case.

The security documents and security devices of the current invention can be optionally be made machine readable by the introduction of detectable materials in any of the layers or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials. Preferably one or more of the at least one opacifying layer comprises an electrically conductive material, to provide anti-static properties. These optional features apply to all aspects of the invention.

The invention further provides a security document made in accordance with the above method, preferably a banknote, cheque, identification document, passport, visa or stamp.

The following aspects of the invention are not limited to use in the above described method, although this is preferable.

One aspect of the present invention provides a method of applying a pattern to a pattern support layer, comprising the steps of:
(b)(i) providing a die form, the die form having a surface comprising a plurality of recesses defining the pattern;
(b)(ii) applying a first curable material to the surface of the die form such that it substantially fills the plurality of recesses and removing any excess of the first curable material from outside the recesses on the surface of the die form;
(b)(iii) bringing a pattern support layer in contact with the surface of the die form such that it covers the plurality of recesses; and
(b)(iv) separating the pattern support layer from the surface of the die form such that the first curable material in the plurality of recesses is removed from the plurality of recesses and retained on the pattern support layer in the form of a plurality of printed features which correspond to the pattern;
wherein each of the plurality of printed features projects away from the pattern support layer to form a raised surface of the plurality of printed features, and wherein the plurality of printed features are separated from each other by gaps in the first curable material on the pattern support layer;
the method further comprising the steps of
(b)(v) during and/or after step (b)(ii), at least partly curing the first curable material in one or more curing steps; and
(b)(vi) applying at least one optically detectable material to at least a portion of the pattern support layer either such that the at least one optically detectable material is present on only the raised surface of the printed features, and is substantially not present in the gaps in the first curable material on the pattern support layer, which separate the printed features, or such that the at least one optically detectable material is present on only in the gaps in the first curable material on the pattern support layer, which separate the printed features and is substantially not present on the raised surface of the printed features.

As mentioned in connection with the first aspect of the invention, this method allows for the formation of a high resolution pattern, e.g. with features of 10 microns or less, the appearance of which is determined by the at least one optically detectable material. This method can be utilised to form such patterns for any purpose, including image arrays as mentioned above, but also for security features which do not involve focussing elements, such as microtext features or moiré interference devices. The method can also be used in the context of making devices (such as moiré magnifiers etc) in the context of a security article such as a thread, strip, patch or the like, which can then be applied to or incorporated into a security document of any type, e.g. a paper-based document.

In a particularly preferred embodiment, step (b) further comprises, after step (b)(ii) and before step (b)(iii):

(b)(ii') covering the surface of the die form and the recessed areas filled with the first curable material with a second curable material;

wherein step (b)(v) further comprises at least partly curing the second curable compound, and in step (b)(iii) the pattern support layer contacts the second curable material on the surface of the die form such that in step (b)(iv) the second curable material is additionally retained on the pattern support layer, the first curable material being retained on the second curable material in accordance with the pattern. This technique has been found to improve the bonding between the pattern elements and the pattern support layer.

Alternatively, step (b) may advantageously further comprise, before step (b)(iii):

(b)(ii'') applying a second curable material to the pattern support layer;

wherein step (b)(v) further comprises at least partly curing the second curable compound, and in step (b)(iii) the second curable material on the surface of the pattern support layer contacts the die form such that in step (b)(iv) the first curable material is retained on the second curable material in accordance with the pattern. In this case it is desirable that the pattern support layer carrying the second curable material is pressed against the surface of the die form with some pressure to ensure good bonding.

In some embodiments, the second curable material will be transparent so that the pattern can be viewed from either side (provided the pattern support is also transparent). However in some preferred implementations, the second curable material is a substantially non-transparent material in the visible spectrum, the non-transparent second curable material preferably forming one of the at least one opacifying layers applied in step (c). Thus, the second curable material may extend over substantially the whole of the polymer substrate except for any desired window regions. The said opacifying layer can be used as an optical barrier in a dual-sided device as described in a later aspect of the invention.

For the same reasons mentioned previously, preferably in step (b)(vi) at least two optically detectable materials with different optical detection characteristics are applied to the at least a portion of the pattern support layer, preferably in laterally offset sub-portions. Advantageously, wherein the at least two optically detectable materials are applied to the portion of the pattern support layer in register with one another. However this register need not be highly accurate but only within the extent which would be visible to the naked eye. In some preferred implementations, the at least two optically detectable materials are each applied sequentially to a transfer surface and then applied together from the transfer surface to the portion of the pattern support layer, the transfer surface preferably comprising an offset roller or transfer blanket. Alternatively the materials could be applied sequentially to the pattern, e.g. in multiple print workings. Preferably the different optical detection characteristics are any of: different visible colours, different fluorescence, different luminescence or different phosphorescence. Most advantageously a multi-coloured pattern or image of the materials is applied.

Another aspect of the present invention provides a method of making a security device, comprising:

(a) forming an array of focussing elements on a first region of a focussing element support layer, which first region is less than the whole area of the focussing element support layer, by:

(a)(i) applying at least one transparent curable material either to the focussing element support layer or to a casting tool carrying a surface relief corresponding to the focussing elements, over an area which includes the first region and a second region laterally offset from the first region, the area preferably encompassing the whole area of the focussing element support layer or of the casting tool;

(a)(ii) forming the transparent curable material(s) with the casting tool;

(a)(iii) curing the transparent curable material(s) only in the first region and not in the second region, so as to retain the surface relief in the first region; and (a)(iv) removing the uncured transparent curable material(s) from the second region.

This approach allows the lateral shape, size and location of the focussing element array to be determined by the area of curing. This can be selected through appropriate control of the curing step and therefore allows the application of the curable material and the forming of the focussing element to be carried out in a standard manner, using standard tools, whilst achieving differently shaped arrays. This lends itself well to customisation of the device, e.g. for a particular series of banknotes, without needing to manufacture a new casting tool, for example.

Advantageously, the transparent curable material(s) are curable by exposure to radiation of at least a first wavelength, preferably UV radiation, and step (a)(iii) is performed by exposing the transparent curable material(s) to radiation of at least the first wavelength through a patterned mask which defines the first region as a radiation-transmissive portion thereof. The mask can be formed, for instance, using well known demetalisation techniques or laser ablation. Preferably, the surface relief and mask are arranged on opposite sides of the focussing element support layer, and are both configured to move at substantially the same speed as one another and as the focussing element support layer as the focussing element support layer is conveyed there past, the surface relief and mask each preferably being carried on respective opposing cylinders. This allows for continuous, web-based patterned curing.

In other implementations, the radiation source can be a radiation beam, e.g. laser, the direction of which can be controlled and then scanned across the transparent curable materials in the first region to achieve the desired patterning without a mask.

Preferably, the first region defines indicia, preferably alphanumeric character(s), symbol(s), logo(s), graphics or the like. This can be used to increase the complexity of the device.

Another aspect of the present invention provides a method of making a security device, comprising:

(a) forming an array of focussing elements on at least a first region of a focussing element support layer, by:

(a)(i) applying at least one transparent curable material either to the focussing element support layer or to a casting tool carrying a surface relief corresponding to the focussing elements, over an area which includes at least the first region;

(a)(ii) forming the transparent curable material(s) with the casting tool; and (a)(iii) curing the transparent curable material(s) so as to retain the surface relief at least in the first region;

wherein the casting tool comprises a belt carrying the surface relief, the belt being configured to move at substantially the same speed as the focussing element support layer along at least a part of a transport path along which the focussing element support layer is conveyed, which part includes a section in which the focussing element support layer is between an upstream cylinder and a downstream cylinder, said section of the transport path preferably being relatively planar, and step (a)(iii) is performed while the belt and the focussing element support layer traverse said section of the transport path.

By providing the surface relief on a belt as opposed to on a cylinder (as in conventional cast-cure techniques), curing can take place along a portion of the transport path which is relatively open and hence allows for the provision of a greater number of curing units than can generally be located in the vicinity of a cylinder (where access to the focussing element support layer is necessarily restricted). Hence curing can be performed with a higher intensity of radiation and therefore more quickly and/or more completely. Preferably step (a)(iii) is performed using at least two curing energy sources, preferably radiation sources, spaced from one another along the section of the transport path and/or on both sides of the transport path.

In some preferred implementations the belt is formed as an endless loop supported around at least two rollers, the belt being separated from the focussing element support layer after step (a)(iii) and retained for forming of transparent curable material on a subsequent portion of the focussing element support layer.

In a particularly preferred embodiment, the belt is formed as a transfer component which remains on the focussing element support layer after step (a)(iii) and may optionally be removed in a separate process. That is, the transfer component is not necessarily reused but can be discarded after removal.

Another aspect of the present invention provides a method of making a security device, comprising:

(a) forming an array of focussing elements on a first region of a focussing element support layer, which first region is less than the whole area of the focussing element support layer, by:

(a)(i) applying at least one transparent curable material either to the focussing element support layer or to a casting tool carrying a surface relief corresponding to the focussing elements, over an area which includes the first region and a second region laterally offset from the first region, the area preferably encompassing the whole area of the focussing element support layer or of the casting tool;

(a)(ii) forming the transparent curable material(s) with the casting tool; and (a)(iii) curing the transparent curable material(s) in the first region and in the second region, so as to retain the surface relief in the first region;

wherein the surface relief is configured such that in the cured transparent material(s) the highest parts of the focussing elements in the first region are level with or below the height of the cured transparent material(s) in the second region.

In this way the focussing element array is provided alongside (and preferably surrounded by) another portion of the curable material which has a height greater than or equal to the maximum height of the focussing elements. That is the focussing elements are ultimately level with or depressed beneath the surface of the adjacent material. This not only acts to protect the focussing elements to a degree but also provides a substantially level surface onto which a at least one opacifying layer can be applied if the focussing element support layer is the polymer substrate of a security document. This improves the application of that opacifying layer since techniques such as gravure printing can then be utilised without problems that would otherwise be caused by a substrate of a varying thickness passing through the gravure nip.

In some preferred implementations the surface relief is configured such that in the second region the surface of the cured transparent material(s) is substantially planar. This is particularly desirable where an opacifying layer is to be applied thereover. However, in other cases this could result in a high shine surface which is not desirable, especially if the curable material is applied over any opacifying layer or otherwise ultimately comprises the outermost layer of the document or device. Hence, advantageously in the surface relief is configured such that in the second region the surface of the cured transparent material(s) carries a light diffusing matt structure. This scatters light so as to present a matt surface. In this and other cases where the height of the material in the second region may vary from point to point, the height of the focussing elements is preferably equal to or less than the greatest height of the material in the second region.

In this aspect of the invention it is particularly desirable that the focussing elements are concave focussing elements, defined as depressions in the surface of the cured transparent material.

This aspect of the invention further provides a security device, comprising an array of focussing elements formed of at least one curable transparent material disposed across a first region of a focussing element support layer, wherein the at least one curable transparent material additionally extends across a second region of the focussing element support layer laterally offset from the first region and the highest parts of the focussing elements in the first region are level with or below the height of the curable transparent material(s) in the second region.

Any of the methods disclosed above may advantageously further comprise:

(b) providing an image array located in a plane spaced from the array of focussing elements by a distance substantially equal to the focal length of the focussing elements whereby the focussing elements exhibit a substantially focussed image of the image array.

Likewise, any of the security devices or security documents disclosed above may advantageously further comprise an image array located in a plane spaced from the array of focussing elements by a distance substantially equal to the focal length of the focussing elements whereby the focussing elements exhibit a substantially focussed image of the image array.

The image array can be configured to co-operate with the focussing element array to produce an optically variable effect, e.g. of any of the types mentioned above.

Another aspect of the present invention provides a method of manufacturing a security device, comprising:
- providing a transparent support layer having first and second surfaces, in the form of a web;
- conveying the web along a transport path in a machine direction; and
- during the conveying, simultaneously:
  - (a) forming an array of focussing elements on the first surface of the transparent support layer in at least a first region; and
  - (b) applying an image array to the second surface of the transparent support layer in at least part of the first region;
- whereby the array of focussing elements and the image array are registered to one another at least in the machine direction.

By performing steps (a) and (b) simultaneously on the same part of the web, the array of focussing elements and the image array will automatically be registered to one another at least in the machine direction. In particular, any distortion suffered by the web, e.g. due to the elevated temperatures that may be required for forming the array of focussing elements, will be the same at the point of forming the array of focussing elements and of applying the image array.

In a particularly preferred embodiment, in step (a), a focussing element cylinder carrying a surface relief on its circumference corresponding to the array of focussing elements is used to form the array of focussing elements on the first surface of the transparent support layer, and in step (b), an image cylinder is used to apply the image array to the second surface of the transparent support layer, steps (a) and (b) being performed simultaneously at a nip formed between the focussing element cylinder and the image cylinder, the transparent support layer passing through the nip. Depending on the location of this nip, there may be substantially no (or low) pressure applied between the two cylinders so as to avoid damage to the focussing elements.

Preferably, the transport path is configured such that the transparent support layer is held in contact with the focussing element cylinder over a portion of its circumference between a first contact point and a last contact point spaced from one another by a non-zero distance, wherein the nip formed between the focussing element cylinder and the image cylinder either is located between the first and last contact points, closer along the transport path to the last contact point than to the first contact point, or forms the last contact point. By positioning the nip in this way, the focussing elements will be relatively fixed (e.g. cured) relative to their state adjacent the first contact point, so that a greater pressure can be applied at the nip, which typically achieves a better outcome of the image array application process.

In a particularly preferred embodiment, step (a) comprises:
- (a)(i) applying at least one transparent curable material either to the transparent support layer or to a casting tool, preferably a focussing element cylinder, carrying a surface relief corresponding to the focussing elements, over an area which includes at least the first region;
- (a)(ii) forming the transparent curable material(s) with the casting tool; and
- (a)(iii) curing the transparent curable material(s) so as to retain the surface relief in the first region.

Preferably the focussing element cylinder constitutes the casting tool and step (a)(iii) is performed while the transparent support layer is held in contact with the focussing element cylinder over the portion of its circumference such that the at least one transparent curable material is at least partly cured, preferably fully cured, at the location of the nip between the focussing element cylinder and the image cylinder.

The following aspects of the invention provide security documents which can preferably be manufactured using any of the methods disclosed above, but are not limited to such methods of manufacture:

An aspect of the present invention provides a security document, comprising:
- a transparent polymer substrate having first and second surfaces;
- at least one opacifying layer on at least a portion of the first surface of the polymer substrate;
- a first image array disposed on the at least one opacifying layer, the at least one opacifying layer being between the first image array and the polymer substrate;
- a first focussing element array disposed over the first image array, the first image array being between the first focussing element array and the at least one opacifying layer, the first image array lying substantially in the focal plane of the first focussing element array whereby a substantially focussed image of the first image array is displayed by the first focussing element array;
- a second image array disposed either on the first surface of the polymer substrate between the at least one opacifying layer and the polymer substrate, or on the second surface of the polymer substrate; and
- a second focussing element array disposed over the second image array on the second surface of the substrate, the second image array lying substantially in the focal plane of the second focussing element array whereby a substantially focussed image of the second image array is displayed by the second focussing element array;
- wherein the at least one opacifying layer substantially conceals the first image array from the second focussing element array and the second image array from the first focussing element array.

By using the at least one opacifying layer as a barrier between the two image arrays, different optical effects can be viewed from the two sides of the security document without interference. The first image array may preferably be formed using the method defined in steps (b)(i) to (b)(v) above, including step (b)(ii') or (b)(ii"), the second curable material forming the at least one opacifying layer.

Preferably, the at least one opacifying layer covers substantially the whole first surface of the polymer substrate, optionally excluding one or more window regions which preferably are laterally offset from the first and/or second focussing element arrays.

Advantageously, the security document further comprises at least one opacifying layer on at least a portion of the second surface of the polymer substrate, excluding a window region in which at least part of the second focussing element array is located.

Another aspect of the present invention provides a security document comprising a substrate and, in a first region of the substrate, a security device, the security device comprising:
- (a) an array of focussing elements on a transparent support layer, the transparent support layer comprising either the substrate or a layer disposed thereon; and
- (b) an image array located in a plane spaced from the array of focussing elements by a distance substantially equal to the focal length of the focussing elements whereby the focussing elements exhibit a substantially focussed image of the image array;

wherein the security document further comprises a graphics layer extending across at least a second region of the substrate laterally offset from the first region, the graphics layer being configured to exhibit a first pattern, and the image array is configured to exhibit the same first pattern, whereby in the first region the focussing elements exhibit a substantially focussed image of the first pattern which appears to move upon changing the viewing angle relative to the static version of the first pattern exhibited by the graphics layer in the second region.

This provides a particularly strong visual effect which presents a significant challenge to counterfeiters.

Preferably, the second region in which the graphics layer is located is immediately adjacent the first region, advantageously with the two regions abutting one another. The second region may preferably surround the first region or vice versa. In particularly preferred implementations, the second region may include at least 25% of the area of the security document, more preferably at least 50%, still preferably at least 70% and most substantially the whole area of the substrate outside the first region.

Preferably, the size of the first pattern on the image array and the magnification factor of the focussing elements are configured such that the substantially focussed image of the first pattern appears substantially the same size as the static version of the first pattern.

Advantageously, the image array comprises a microimage array constituting the first pattern, and the pitches of the focussing element array and of the microimage array and their relative orientations are such that the focussing element array co-operates with the microimage array to generate a magnified version of the microimage array due to the moiré effect.

Another aspect of the present invention provides a method of manufacturing a security document, comprising:
providing a polymer substrate having first and second surfaces in the form of a web; and in any order:
(c) applying at least one opacifying layer to the first and/or second surfaces of the polymer substrate in the form of a web, the or each opacifying layer comprising a non-transparent material; and optionally either:
(a) applying an array of focussing elements to the first surface of the polymer substrate in the form of a web across a first region; or
(b) applying an image array to the polymer substrate in the form of a web in the first region, such that the image array is located in a plane spaced from the array of focussing elements by a distance substantially equal to the focal length of the focussing elements whereby the focussing elements exhibit a substantially focussed image of the image array; and then
(q) cutting the web into sheets in the direction of web transit, then performing on the sheets whichever of steps (a) and/or (b) was not performed on the web, in at least one sheet-fed process;
such that either the image array is located between the array of focussing elements and the at least one opacifying layer on the first surface of the substrate, or at least the opacifying layer(s) on the first surface of the substrate define a gap forming a window region in which at least part of the array of focussing elements is disposed such that a substantially focussed image of at least part of the image array is displayed in the window region.

By moving one or both of steps (a) or (b) to a point in the process after the web has been cut into sheets, the efficiency of the manufacturing process is enhanced. In particular, the techniques and materials involved in steps (a) and (b) are typically expensive, and may be slow, relative to other steps in the manufacture. By carrying out one or both of these steps towards the end of the process, and in particular after the web has been cut into sheets, this not only increases the speed of the web-based part of the process (since the rate at which this can be performed is no longer limited by the speed of steps (a) and/or (b)), but also reduces wastage. This is because steps (a) and/or (b) now need only be performed on sheets which have met the required quality criteria for all the preceding steps, such as application of the opacifying layers (step (c)), rather than on the whole length of the web, some of which might not reach the desired quality and therefore might ultimately be discarded. By carrying out steps (a) and/or (b) after "sheeting" as claimed, a greater number of the processing steps will have been completed (and can be checked for quality) before then performing steps (a) and/or (b). Ultimately this reduces waste and saves time and costs.

Preferably both steps (a) and (b) are performed after the web has been cut into sheets so as to maximise the above benefit. However, in some cases, one of the steps (a) or (b) could be carried out before step (q), i.e. as part of the web-based process, and only the other is performed after sheeting. This still provides the above benefit, although to a lesser degree.

In a particularly preferred implementation, the method further comprises, after cutting the web into sheets and preferably before performing on the sheets whichever of steps (a) and/or (b) was not performed on the web:
printing a graphics layer onto the at least one opacifying layer on the first and/or second surfaces of the polymer substrate in at least one sheet-fed process.

This is the conventional security print process which typically involves applying security patterns (e.g. fine lines, guilloches), portraits etc to a security document, e.g. by intaglio printing, lithographic printing, flexographic printing or the like. It is preferred that this step is completed before the sheet-fed processes (a) or (b) so that these steps are moved still later in the overall manufacturing process. This means that any sheets on which the graphics layer is not printed to the necessary quality can be removed before performance of steps (a) and/or (b), thereby reducing wastage still further.

Preferably, in step (b) the image array is provided on the first surface of the polymer substrate, the focussing element array including an optical spacing portion. The optical spacing portion can be formed integrally with the focussing element array by design of a surface relief used to cast-cure the focussing element array which option is discussed further above in connection with other aspects of the invention.

Another aspect of the invention provides a method of manufacturing a security document, comprising:
providing a document substrate having first and second surfaces in the form of a plurality of sheets, each sheet optionally carrying one of: an array of focussing elements on the first surface of the document substrate or an image array;
using a sheet-feeder to feed the plurality of sheets one by one into a transport path;
on the transport path, performing either or both of the following steps in either order:

(a) applying an array of focussing elements to the first surface of the document substrate in the form of a sheet across a first region; and/or (b) applying an image array to the polymer substrate in the form of a sheet in the first region, such that the image array is located in a plane spaced from the array of focussing elements by a distance substantially equal to the focal length of the focussing elements whereby the focussing elements exhibit a substantially focussed image of the image array.

This aspect of the invention is related to the previous aspect and provides the same benefits. However, this aspect is not limited to the use of polymer-based security documents, it being recognised that the same advantages can be achieved where the method is applied to any type of document substrate, e.g. polymer, paper or a hybrid thereof. In this case the supplied substrate sheets may already be provided with one or other of the focussing element array or the image array (but not both), e.g. formed in a separate web based process, optionally carried out by some different entity. The other component (or both) is then provided in the sheet-fed process as claimed by performing step (a) and/or (b).

Preferably, the method further comprises, after using a sheet-feeder to feed the plurality of sheets one by one into a transport path and preferably before performing on the sheets step (a) and/or (b):

printing a graphics layer onto the at least one opacifying layer on the first and/or second surfaces of the document substrate.

Again, it is preferred that the image array is provided on the first surface of the polymer substrate, e.g. by means of the focussing element array including an optical spacing portion.

Examples of security documents, security devices and methods of manufacture thereof will now be described with reference to the accompanying drawings, in which.

Figure 4A:
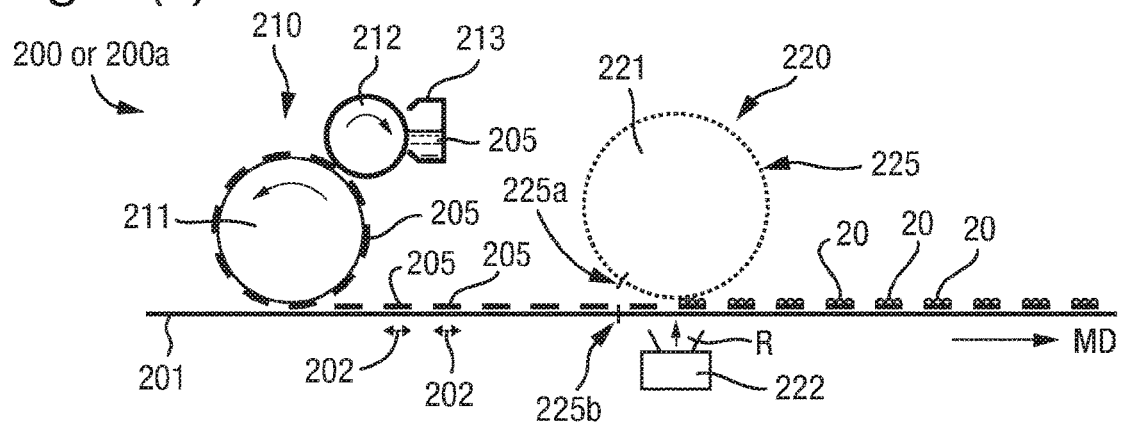
Figure 4B:
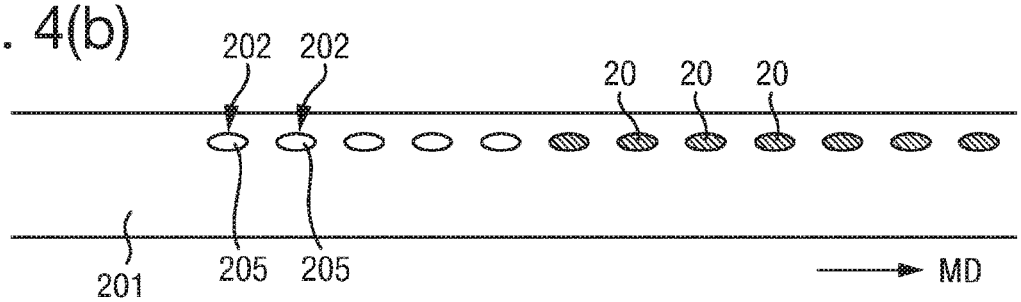
Figure 5A:
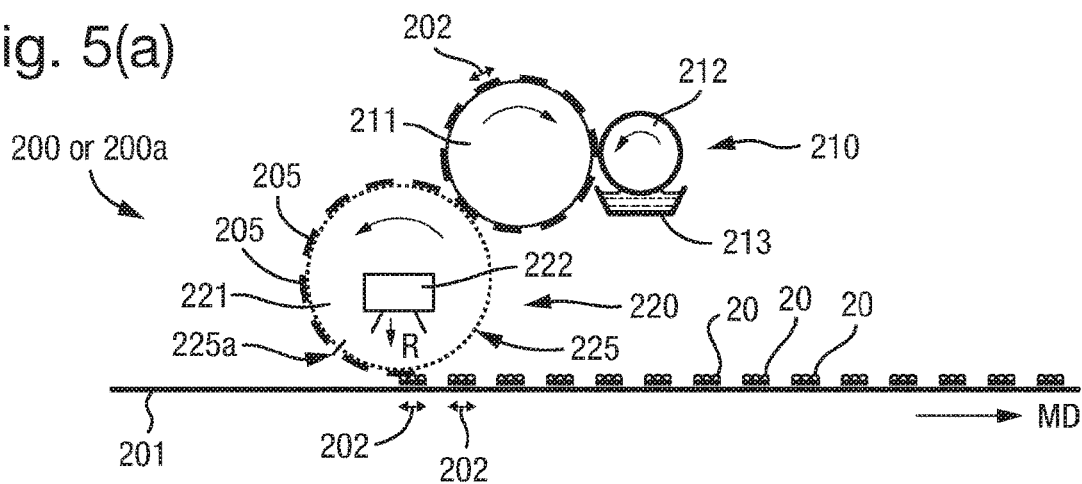
Figure 5B:
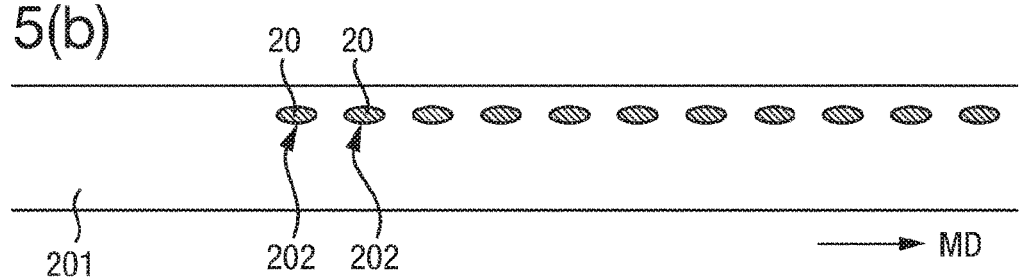
Figure 5C:
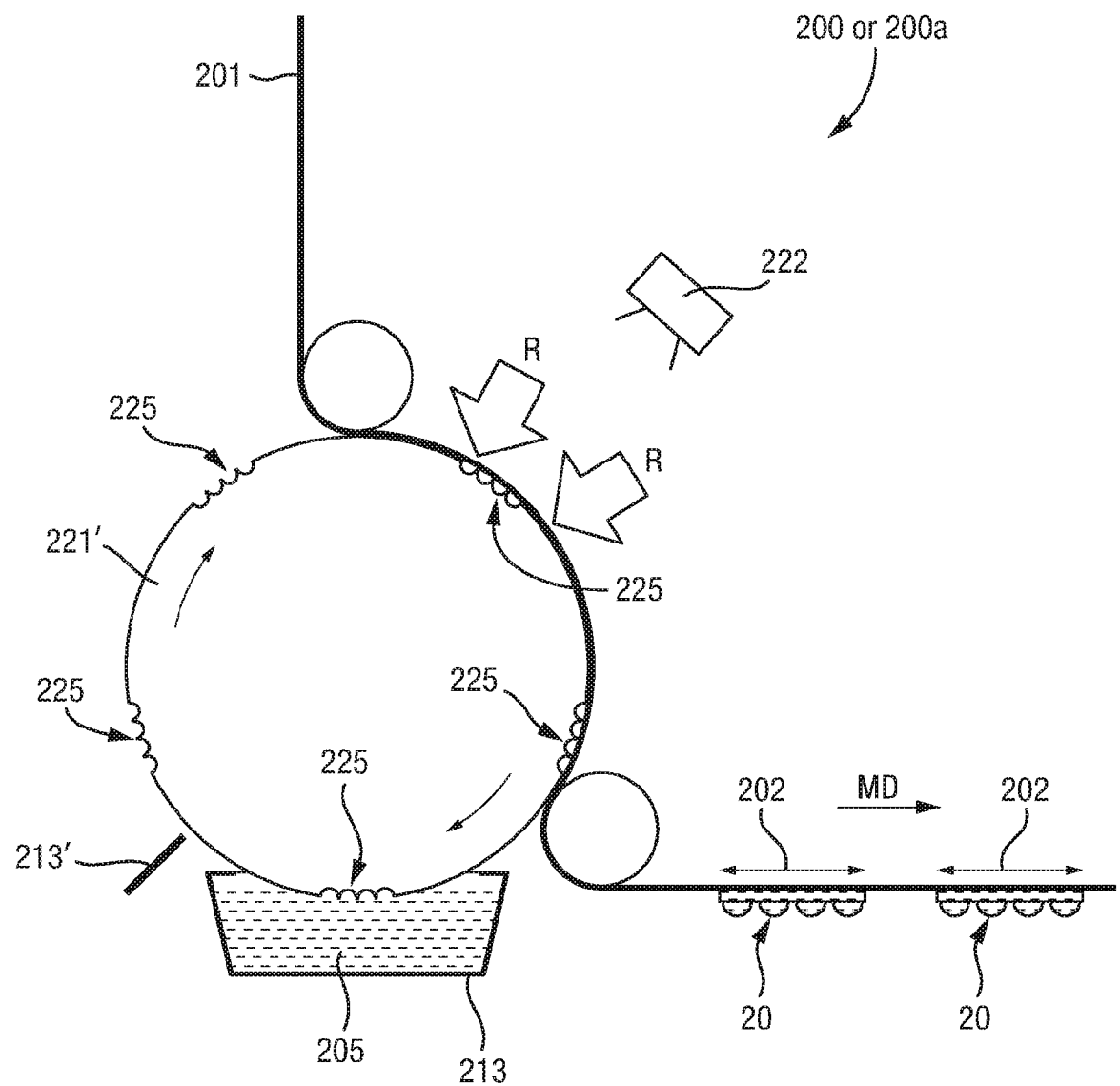
Figure 10A:
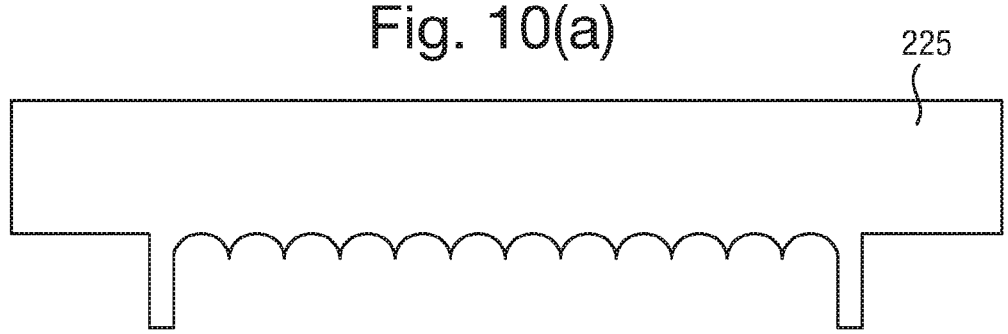
Figure 10B:
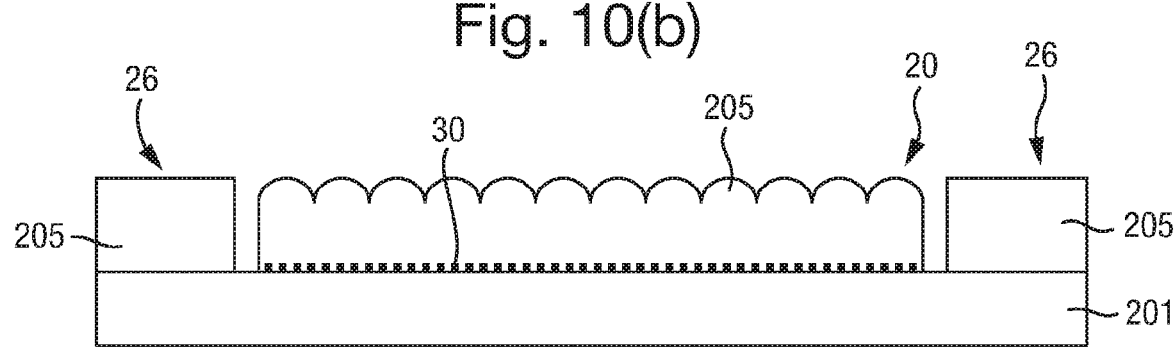
Figure 11A:
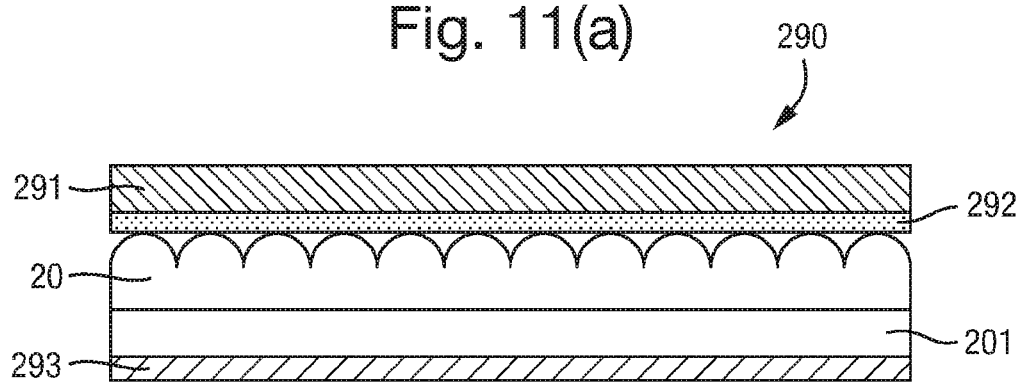
Figure 17A:
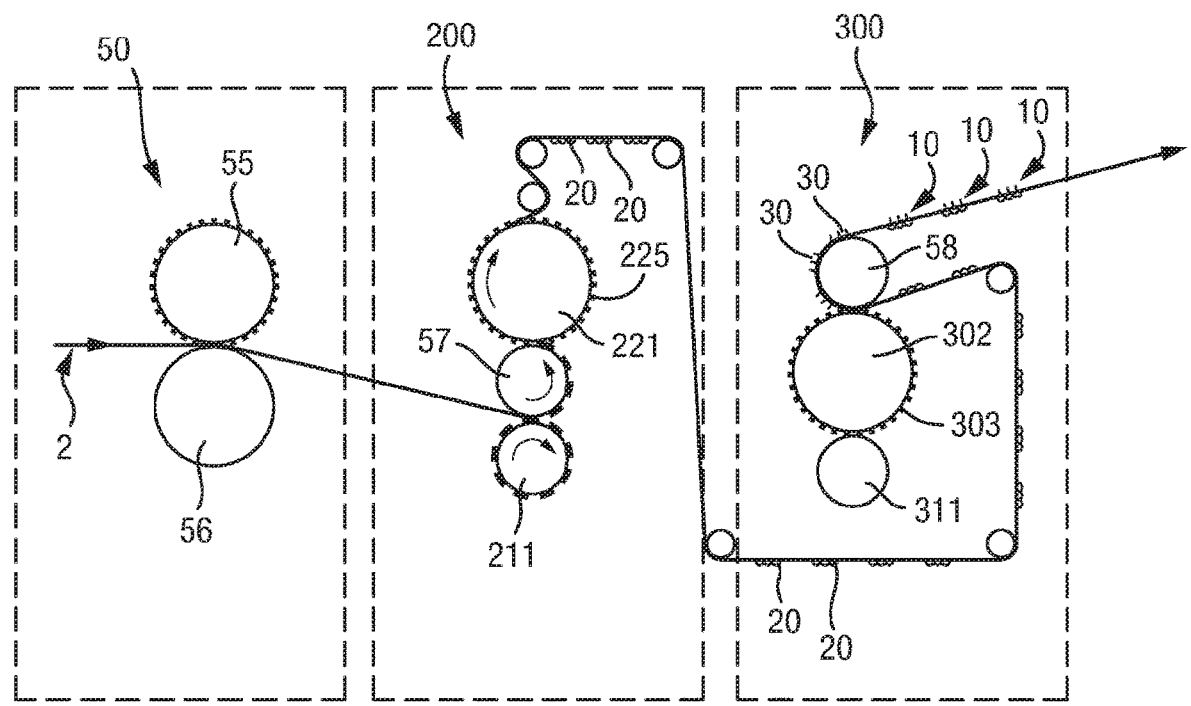
Figure 17B:
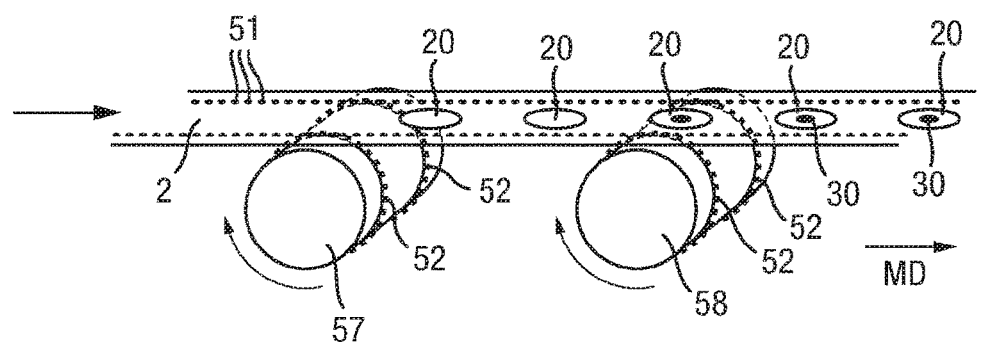
Figure 18A:
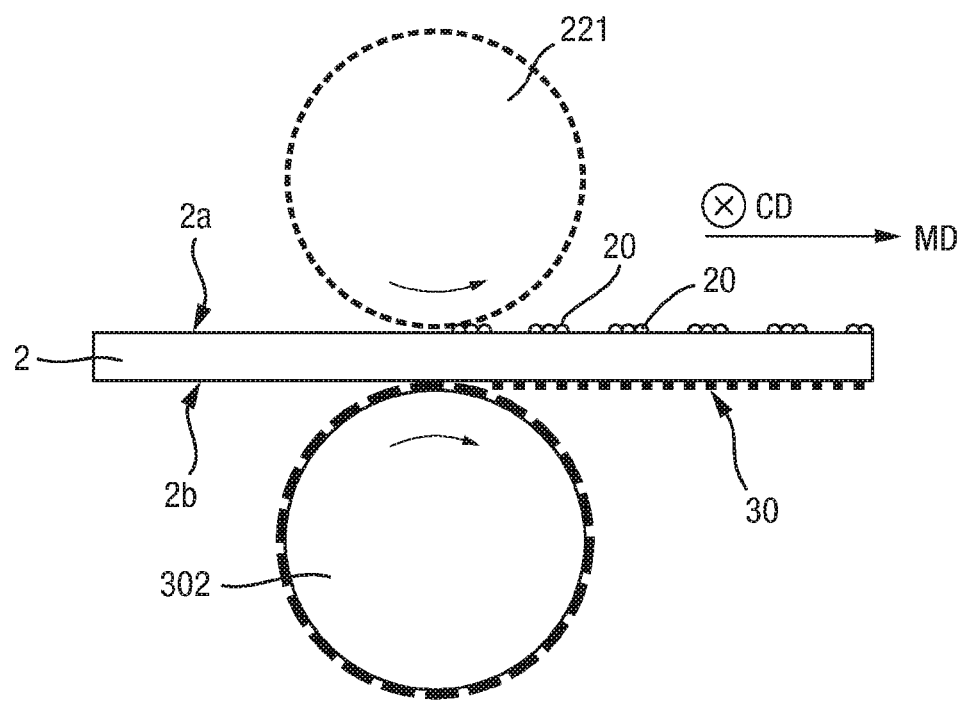
Figure 19:
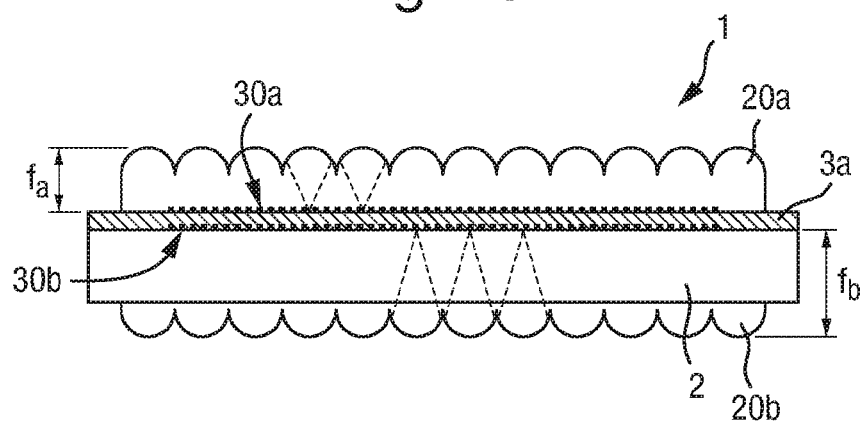
Figure 20:
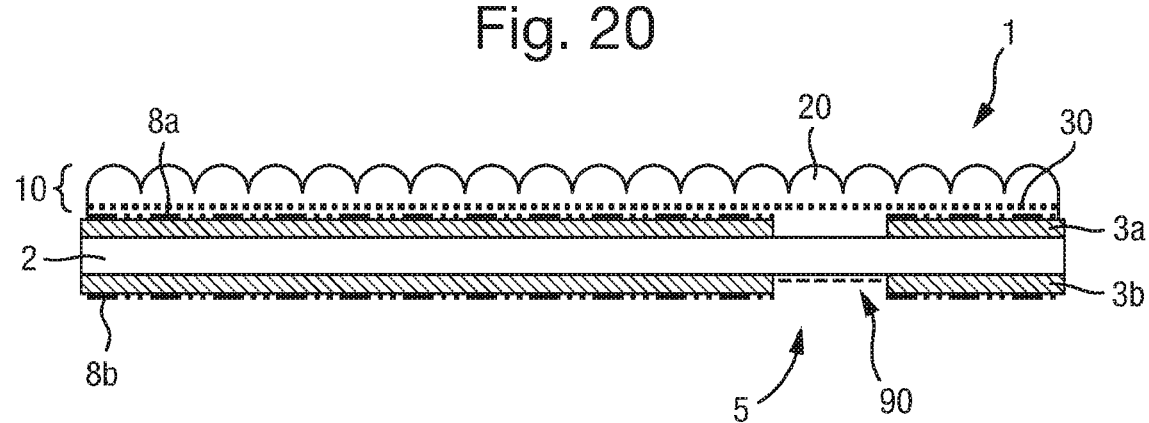
Figure 21A:
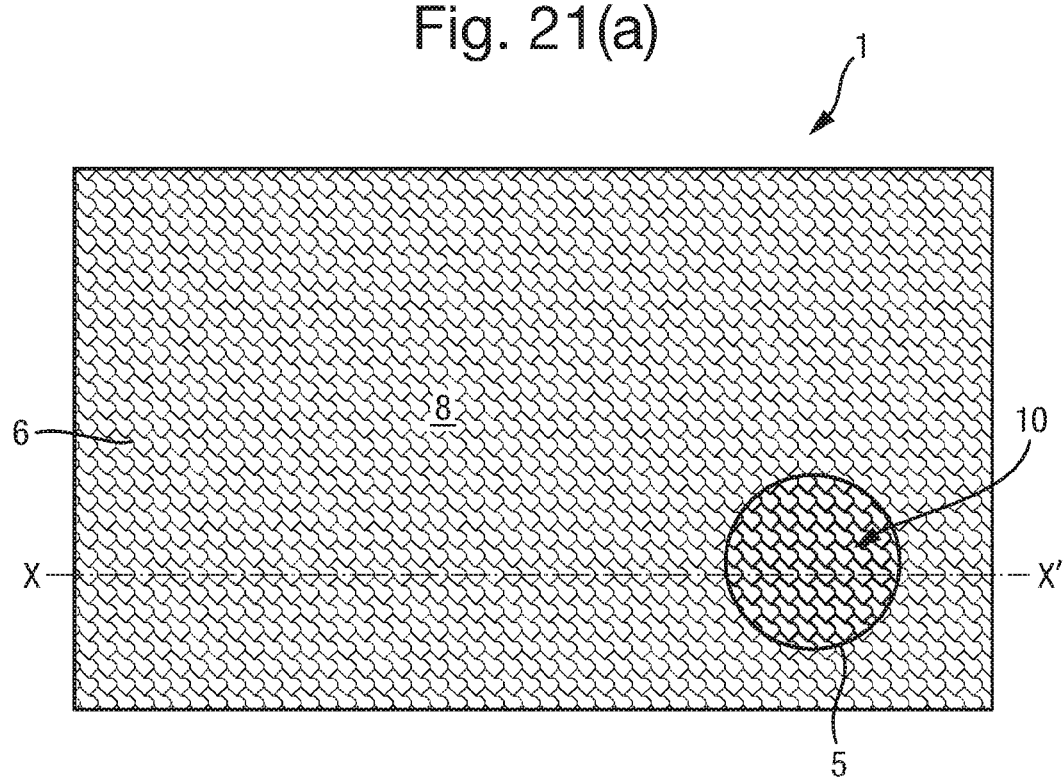
Figure 21B:
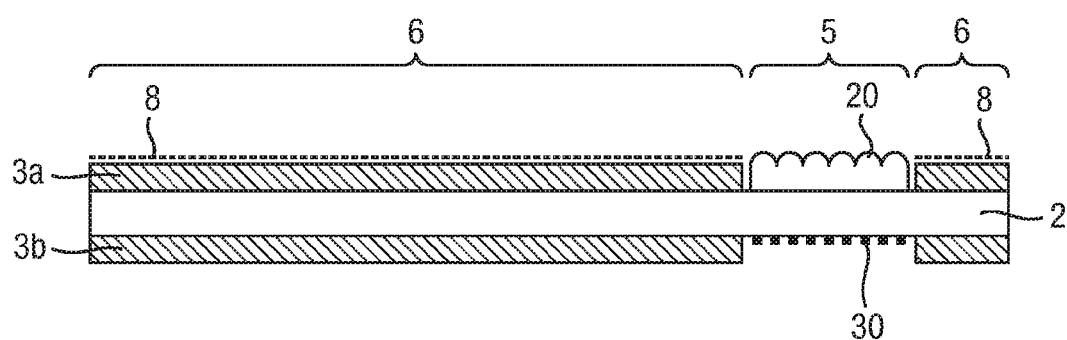

FIG. 3 schematically depicts exemplary apparatus for manufacturing a security document in an embodiment;

FIGS. 4, 5, 6 and 7 show embodiments of apparatus for forming a focussing element array, in each case illustrating (a) the apparatus from a side view, and (b) a perspective view of the focussing element support layer, FIG. 5(c) showing a further variant of FIG. 5(a);

FIG. 8 illustrates an exemplary casting module that can be used in any of the methods of FIGS. 4 to 8 and 11;

FIGS. 9(a) and (b) depict two embodiments of focussing element arrays, showing (i) a surface relief suitable for the manufacture thereof, and (ii) the resulting focussing element array disposed on a support layer FIG. 10 shows (a) an embodiment of a surface relief on a casting tool suitable for use in any of the methods of FIGS. 4 to 8, (b) a corresponding focussing element array formed on a support layer using the surface relief, and (c) a focussing element array formed on a support layer according to another variant;

FIGS. 11(a) and (b) show two examples of transfer components comprising focussing element arrays which may be used in embodiments of the invention, in cross-section;

FIGS. 12 to 15 schematically depict four embodiments of methods for forming image arrays which may be used in embodiments of the invention;

FIG. 16A to J shows examples of elements of image arrays formed as relief structures;

FIG. 17 schematically depicts exemplary apparatus for manufacturing a security document in an embodiment;

FIGS. 18(a) and (b) schematically depict selected components of apparatus for manufacturing a security document in two further embodiments;

FIGS. 19 and 20 depict two further embodiments of security documents in cross-section; and FIG. 21 depicts another embodiment of a security document (a) in plan view and (b) in cross-section.

0. INTRODUCTION

The ensuing description will focus on preferred techniques for the manufacture of security documents, such as bank notes, based on polymer document substrates. However, many aspects of the disclosure are more widely applicable and so should not be considered limited to use on polymer-based security documents unless otherwise indicated or necessitated by the nature of the product or method in question. For example, many of the methods and products described below can be utilised on security documents of conventional construction, e.g. paper-based documents. For instance, the described methods can be performed on a polymeric support layer which can then be affixed to or incorporated into a security document of any type. However, in all cases the preference is for combination with a polymer-based security document.

0.1 Definitions

To aid understanding, the following terminology has been used throughout the present disclosure:

Polymer substrate—this refers to a polymer document substrate which ultimately forms the main body of a security document. Examples of such polymer substrates are discussed in section 1 below.

Focussing element array—this refers to an array of elements capable of focussing visible light, such as lenses or mirrors. The term "array of focussing elements" is analogous. Examples are given in section 2 below.

Image array—this refers to a graphic which typically comprises a pattern of microimages or image elements, although neither is essential. In preferred cases the image array co-operates with a focussing element array to generate an optically variable effect. For example, the image array and the focussing element array may in combination form a moiré magnifier, an integral imaging device or a lenticular device (each described above), or some other optically variable device. In many preferred examples, the image array is formed of elements of applied ink or another such material. However this is not essential since the image array could instead be formed of recesses or the like. Preferred methods of manufacturing image arrays are discussed in section 3 below.

Focussing element support layer—this is a layer on the surface of which the focussing elements are formed. The focussing element support layer could be the polymer substrate (defined above) or could be another layer which is then applied to a document substrate (paper or polymer), or used as a carrier from which the focussing elements are later transferred to a document substrate (paper or polymer). For instance the focussing element support layer could take the form of a security article such as a thread, strip, patch or foil which is then incorporated into or onto a security document.

Pattern support layer—this is a layer on the surface of which the image array (e.g. a pattern) is formed. The pattern support layer could be the polymer substrate (defined above) or could be another layer which is then applied to a document substrate (paper or polymer), or used as a carrier from which the image array is later transferred to a document substrate (paper or polymer). For instance the pattern support layer could take the form of a security article such as a thread, strip, patch or foil which is then incorporated into or onto a security document.

Transparent material—"transparent" is used to mean that the material is substantially visually clear, such that an item on one side of the material can be seen sharply through the material from the other side. Therefore transparent materials should have low optical scatter. However, transparent materials may nonetheless be optically detectable (defined below), e.g. carrying a coloured tint.

Optically detectable material/optical detection characteristics—an optically detectable material may or may not be transparent but is detectable either to the human eye or to a machine via an optical detector (e.g. a camera), or both. Thus, the optical detection characteristic(s) of the material could be for example a visible colour, a non-visible reflection or absorbance such as UV or IR reflection or absorbance, or a photoluminescent response such as fluorescence or phosphorescence (the stimulating radiation and/or the emitted radiation being visible or invisible), or the like.

Curable material—"curable" means that the material hardens (i.e. becomes more viscous and preferably solid) in response to exposure to curing energy which may for example comprise heat, radiation (e.g. UV) or an electron beam. The hardening involves a chemical reaction such as cross-linking rather than mere physical solidification, e.g. as is experienced by most materials upon cooling.

0.2 Overview of Exemplary Security Document

For reference throughout the description of preferred manufacturing processes below, FIG. 1 shows an exemplary security document 1, such as a banknote, based on a polymer substrate construction. FIG. 1(a) shows the document in plan view and FIGS. 1(b), (c) and (d) show three alternative cross-sections along the line X-X'. It will be appreciated that the constructions shown are merely exemplary and alternative arrangements are viable, some of which will be discussed with reference to particular preferred manufacturing techniques discussed below.

The security document 1 is based on a polymer substrate 2 which is preferably transparent but this is not essential in all embodiments. Examples of suitable polymer substrates 2 and optional features thereof are described in Section 1 below. The polymer substrate 2 has a first surface 2a and a second surface 2b. It should be noted that wherever components are described herein as being "on" one of the surfaces of the polymer substrate 2, or actions are described as being performed "on" one of said surfaces, this does not require the component or action to be directly on the surface of the polymer substrate. Rather, some intermediate layer, such as a primer layer, could exist immediately on the surface of the polymer substrate itself and the component or action may be applied to or performed on that intermediate layer, unless otherwise specified.

Figure 1A:
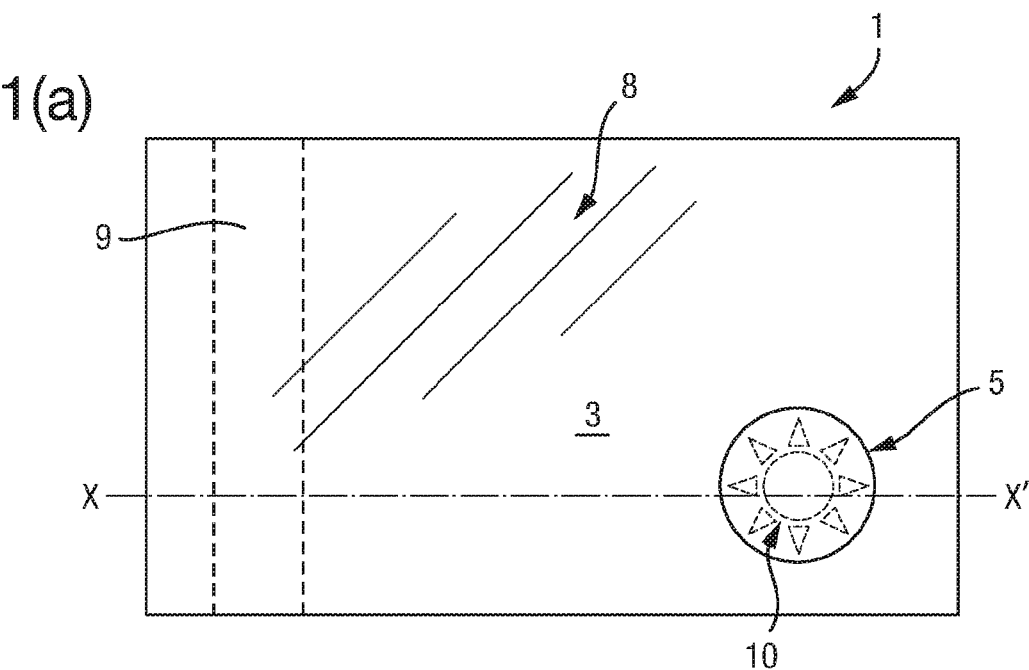
FIG. 1(a) shows an exemplary security document in plan view, FIGS. 1(b), (c) and (d) showing three alternative cross-sections along the line X-X'.

On at least one of the surfaces of the polymer substrate 2, preferably both, one or more opacifying layers 3a, 3b (indicated generally as 3 in FIG. 1(a)) are provided. The opacifying layers typically cover a large proportion of the surface area of the security document 1, in some cases the entire area (as in FIG. 1(c), described below), but in other cases being omitted on one or both sides of the polymer substrate 2 in localised areas to form window regions. An exemplary window region 5 is shown in FIGS. 1(a), (b) and (c) but is omitted in the FIG. 1(d) variant. The opacifying layer(s) 3 are configured to provide a suitable background for a graphics layer 8, typically applied by printing, which in the case of a banknote generally comprises secure fine line patterns such as guilloches, a portrait, currency and denomination information and the like. Thus the opacifying layers 3 are non-transparent and, in the case of a transparent polymer substrate 2, act to increase the opacity of the document 1 as a whole.

Figure 1B:
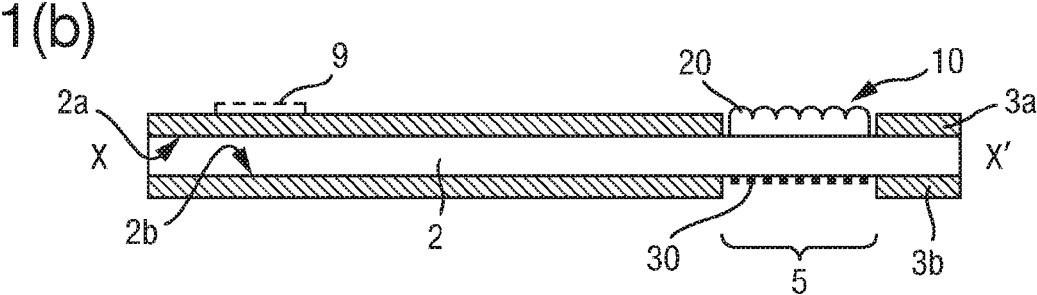
Figure 1C:
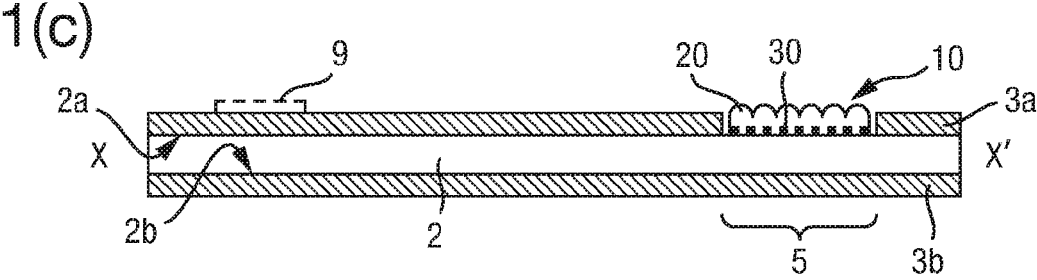

If the opacifying layers 3 are omitted in the window region 5 on both sides of the polymer substrate 2, as shown in FIG. 1(b), the window region will be a "full window" and, provided the polymer substrate is transparent, will itself be transparent. If the opacifying layers are omitted in the window region 5 on one side of the polymer substrate 2 but not the other, the window region will be a "half window" which is non-transparent but typically of lower opacity than the surrounding regions of the document 1. An example of a half window is shown in FIG. 1(c) in which the first opacifying layer(s) 3a on the first surface 2a of the polymer substrate 2 are absent in the window region 5 but the second opacifying layer(s) 3b on the second surface 2b are continuous across the window region 5. It will be appreciated that the window region 5 could contain a mixture of full and half window areas by arranging the gaps in the first and second opacifying layers to overlap one another only partially (not shown). In FIG. 1(c) there is no window, both opacifying layers 3a and 3b being continuous across region 5.

Examples of suitable materials for forming the opacifying layer(s) 3 and more detail as to preferred methods for their application are discussed in Section 4 below.

Figure 1D:
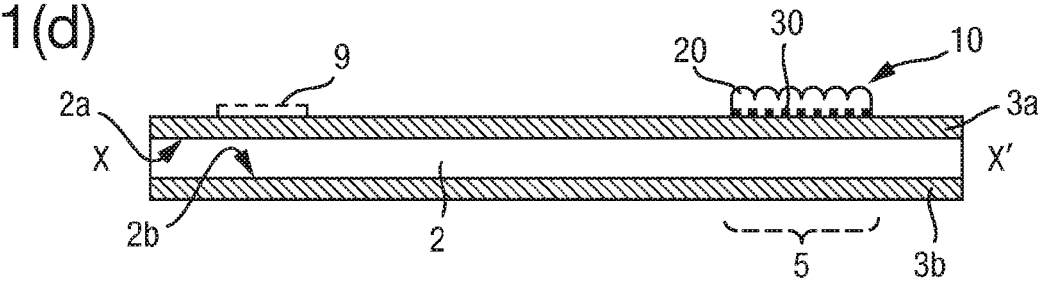

The security document 1 is provided with a security device 10 which comprises at least an array of focussing elements 20 provided on the first surface of the polymer substrate 2. The security device 10 could consist exclusively of the focussing element array 20 or may also comprise an image array 30 as discussed below. In the constructions of FIGS. 1(b) and 1(c), the focussing element array is applied in a gap defined by the first opacifying layer 3a such that the security device 10 is located in a window region 5 as discussed above. However this is not essential and FIG. 1(d) shows an example where the focussing element array 20 is applied to the first surface 2a of the polymer substrate 2 over the first opacifying layer(s) 3a. Preferred methods for manufacturing the focussing element array 20 are discussed in Section 2 below, as well as preferred configurations of the focussing element array 20 itself.

The image array 30, if provided, is preferably located in a plane which substantially corresponds to the focal plane of the focussing elements array 20 (e.g. to within +/−10%, more preferably +/−5%) so that the focussing element array 20 exhibits a substantially focussed image of the image array 30, which is illustrated schematically by the broken-line sun-shaped outline in FIG. 1(a). In practice this focussed image may be optically variable, i.e. have different appearances at different viewing angles, and as such may be referred to more generally as the "optical effect" exhibited by the security device 10. For instance, the image array 30 could co-operate with the focussing element array 20 to form a moiré magnification device, an integral imaging device or a lenticular device, the principles of each having been discussed above, or any combination thereof. Preferred methods of manufacturing the image array 30, as well as examples of its configuration, are discussed below in Section 3.

The focussing element array 20 and image array 30 can be provided at various different positions provided the necessary spacing between them is achieved. In the FIG. 1(b) example, this spacing is provided at least in part by the polymer substrate 2 itself, which here is transparent. The focussing element array 20 is located on the first surface 2a of the polymer substrate 2 whilst the image array 30 is located on the second surface 2b. It will be appreciated that whilst FIG. 1(b) shows the device 10 as being located in a full window, the second opacifying layer(s) 3b could continue across all or part of the window region 5 (over the image array 30), forming a half window or a mixture of full and half window portions.

In the FIG. 1(c) example, both the focussing element array 20 and the image array 30 are provided on the first surface 2a of the polymer substrate 2, which now need not be transparent (although this is still preferred). The optical spacing is provided by means other than the polymer substrate 2 and exemplary methods for achieving this are discussed in Section 2 below. In this case the focussing element array 20 and image array 30 are located in a gap in the first opacifying layer(s) 3a which forms a half-window. However, the second opacifying layer(s) 3b could also be at least partially omitted across the window region 5 to form a full window or a mixture of full and half window portions.

In the FIG. 1(d) example, the focussing element array 20 and image array 30 are again both provided on the first surface 2a of the polymer substrate 2, this time over the first opacifying layer 3a since as previously indicated no window is formed in this case. Again the optical spacing is achieved by means other than use of the polymer substrate 2 as will be discussed in section 2 below. It will be appreciated from the FIG. 1(d) example, in which the polymer substrate need not be transparent, that whilst security devices 10 of the sort disclosed herein are particularly well suited to application to documents based on polymer substrates, they are not limited in this regard and can be utilised on any type of security document, e.g. those based on paper substrates, or indeed on any article which requires protection from counterfeiting.

Depending on the type of optical effect desired to be displayed by the security device 10, accurate registration between the focussing element array 20 and the image array 30 may or may not be necessary. However this is highly desirable in certain cases and preferred techniques for achieving registration will be discussed in Section 5 below.

Optional additional features and some preferred examples of the security device 10 will be discussed in Section 6 below. The security documents and security devices disclosed herein can be optionally be made machine readable by the introduction of detectable materials in any of the layers or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials. This applies to all embodiments of the invention.

Typically to form the finished security document 1, a number of additional processes will take place, including printing of the graphics layer 8 already mentioned above, as well as application of any further security articles such as security threads, strips, patches, foils or the like which may carry features such as diffractive elements (e.g. holograms or Kinegrams), iridescent material, colour-shifting material etc. One example of such an applied security article is shown in FIG. 1 as strip 9. The so-formed material (generally in the form of a web or a sheet, at this stage, as discussed further below) will then be cut into individual security documents 1. All of these process steps are considered optional in the present disclosure and can be implemented by conventional means as discussed briefly in section 0.3 below.

Finally, the various components of the security document 1 described above can be applied in different orders. Section 7 describes preferred orders of the steps involved in manufacturing the security document.

0.3 Overview of Exemplary Manufacturing Method

Figure 2:
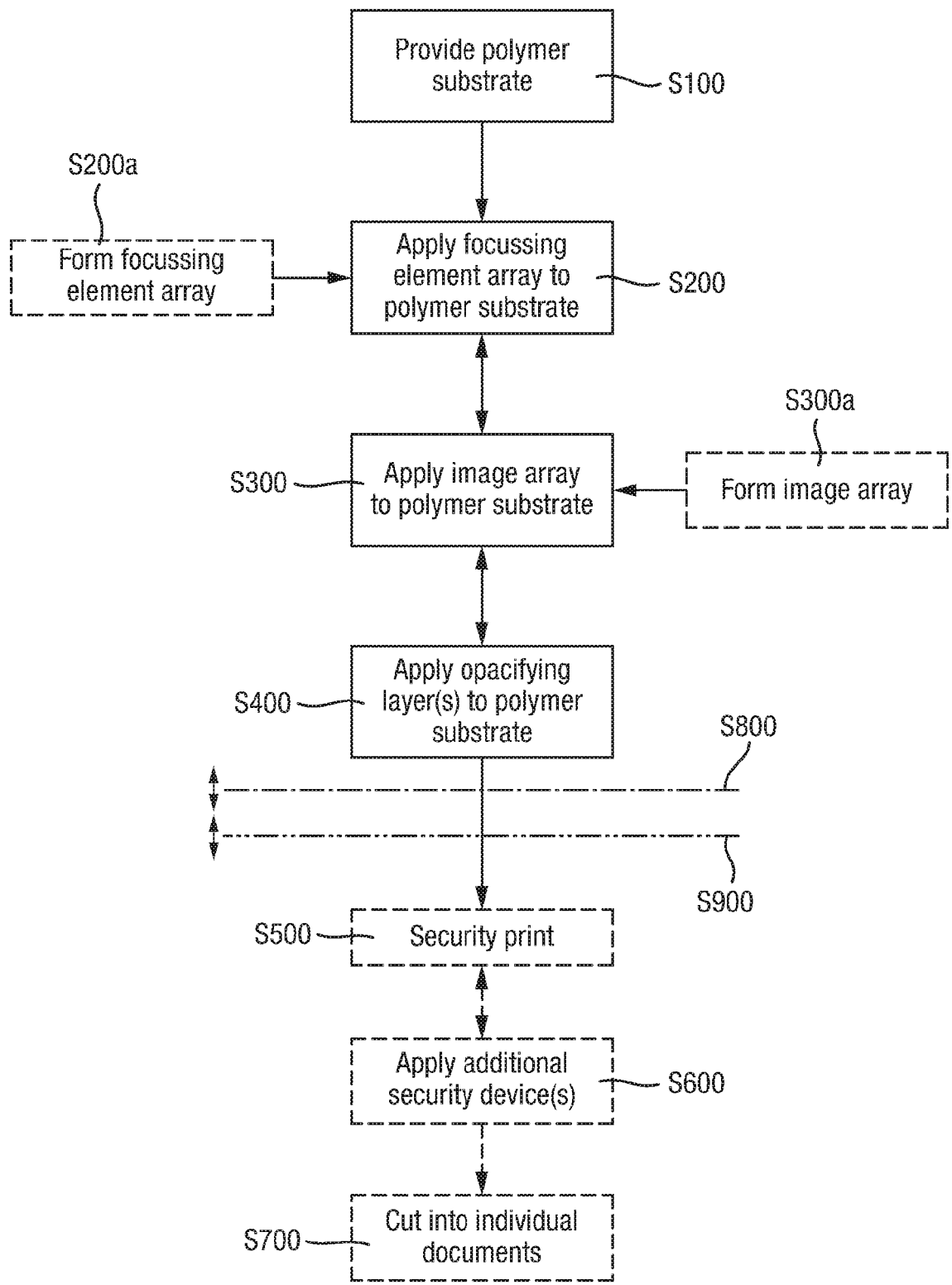
FIG. 2 is a flow diagram illustrating selected steps of a method of manufacturing a security document according to one embodiment.

Turning now to the manufacturing process, FIG. 2 is a flow diagram illustrating, at a high level, the main process steps in an exemplary implementation. It must be emphasised that the order of the steps can be varied significantly, different benefits being achieved depending on the sequence of steps adopted, as will be discussed in Section 7. Therefore, FIG. 2 serves merely to introduce the key steps involved in manufacturing a polymer-based security document and should not be considered to limit the order of those steps, except where otherwise indicated. It should further be noted that all steps shown in dashed lines are optional.

Thus in step S101, a polymer substrate 2 is provided, typically in web form. The polymer substrate 2 and optional treatment steps that may be performed before any of the steps described below are carried out, are discussed in Section 1.

In step S200, a focussing element array 20 is applied to the polymer substrate on its first surface. This will be described in Section 2 but for the time being it is sufficient to note that the step S200 could involve actual formation of the focussing element array, either on the polymer substrate or on an intermediate component such as a security thread, strip or patch (indicated as step S200a) which is then affixed to the polymer substrate. However this is not essential since the focussing element array could be formed in some separate process, possibly by a different entity, as an article such as a security thread, strip or patch, in which case the present step S200 need only involve affixing the pre-formed focussing element array 20 to the polymer substrate 2. For this reason, in the main part Section 2 describes preferred methods of forming the focussing element array as taking place on a focussing element support layer, which could be the polymer substrate 2 but alternatively could be a carrier layer in such a component.

In step S300, an image array 30 is applied to the polymer substrate as will be described further in Section 3. However, as in the case of the focussing element array 20, similarly step S300 may or may not involve the actual formation of the image array 30. That is, step S300 may comprise forming the image array 30 either on a surface of the polymer substrate or on an intermediate component such as a security thread, strip or patch (indicated as step S300a) which is then affixed to the polymer substrate. Alternatively the image array could be formed in some separate process, possibly by a different entity, as an article such as a security thread, strip or patch, in which case the present step S300 need only involve affixing the pre-formed image array 30 to the polymer substrate 2. For this reason, in the main part Section 3 describes preferred methods of forming the image array as taking place on a pattern support layer, which could be the polymer substrate 2 but alternatively could be a carrier layer in such a component.

Indeed, where the focussing element array 20 and the image array 30 are both formed away from the polymer substrate 2 and then applied thereto, the focussing element array 20 and the image array 30 could each be formed as part of one and the same security article (such as a thread, strip or patch) which can then be affixed to the polymer substrate 2 in a single step. Thus the focussing element support layer and the pattern support layer could be provided by a single support layer. It is noted as an aside that security articles equipped with a focussing element array 20 and an image array 30 can be applied to any type of security document, not necessarily one based on a polymer substrate.

Registration between steps S200 and S300 is described in section 5 below.

In step S400, the at least one opacifying layer(s) are applied to the first and/or second surfaces of the polymer substrate 2. In practice this may optionally take place in several steps, which need not all be performed immediately sequentially, one after the other. For instance, one or more of the opacifying layers could be applied before steps S200 and/or S300. Application of the opacifying layer(s) is discussed in section 4 below.

In step S500, which is optional, the graphics layer 8 is applied to the opacifying layers, typically by way of security printing techniques. For example, the graphics layer 8 may be printed by any conventional printing technique, or combination of techniques, such as intaglio printing, lithographic printing, offset printing, flexographic printing, gravure printing and the like. The graphics layer 8 typically comprises high resolution patterns such as fine line patterns and guilloches, portraits, and other indicia. In step S600, which is also optional, any additional security devices on articles such as threads, strips, patches etc., are applied to the substrate. Any conventional techniques for applying such components can be utilised, including bonding by adhesives, lamination, hot stamping, transfer methods and the like. The security devices could be of any known type, such as holograms, kinegrams and other diffractive elements, iridescent or colour-shift material, etc. Steps S500 and S600 could take place in either order and/or as a series of sub-steps which could be intermingled with one another. Finally, the processed material is cut into individual security documents in step S700.

In the present example, all of the steps described have been web-based processes, i.e. applied to a web of the polymer substrate 2, e.g. in one in-line process. Typically a web with a large width (e.g. between 0.75 and 1.5 m) is supplied for this purpose. However, for some process steps it is desirable to reduce the width of the web, e.g. so that shorter (and hence less costly) processing tools can be used. It is also desirable to carry out certain process steps on individual sheets of the material, rather than on a continuous web. This is particularly the case for security print step S500. Hence, line S800 represents slitting the initial web along its longitudinal direction so as to reduce its width, subsequent processing steps utilising processing tools of correspondingly shorter width compared with those of the preceding steps. Line S900 represents dividing the web into sheets, by cutting it along its cross direction at intervals spaced in the longitudinal direction. This process is sometimes referred to as "sheeting". Each sheet will preferably be sized so as carry a plurality of the final security documents. Subsequent processes are performed using sheet-fed machinery.

It will be appreciated that the points in the process at which steps S800 and S900 are performed can be varied and are indicated only schematically in FIG. 2. Typically at least one process step will be performed on the reduced-width web (i.e. between steps S800 and S900), although this is not depicted here. Preferences will be discussed in section 7.

In each of sections 1 to 8 below, several different options for implementing each of the process steps will be described. It will be appreciated that any one of the disclosed options in each section can be combined with any one of the options disclosed in each of the other sections. For example, any of the options disclosed for forming the focussing element array 20 in section 2 can be used in combination with any of the options disclosed for forming the image array 30 in section 3.

0.4 Overview of Exemplary Manufacturing Apparatus

To illustrate the production of various key components of the security document 1 by the above steps, FIG. 3 schematically illustrates exemplary apparatus for carrying out steps S200, S300 and S400 on a polymer substrate 2 in the form of a web. It will be noted that the order of steps shown here is different from that in FIG. 2. The polymer substrate 2 is provided from a supply such as a reel 100. As described in section 1 below the polymer substrate may undergo various treatment steps (not shown in FIG. 3) before being subjected to the processing described below. The polymer substrate is conveyed along a transport path by a transport module (not shown) of conventional construction. The direction of transit is termed the machine direction (MD) and the orthogonal direction in the plane of the web is the cross direction (CD).

At a focussing element station 200, a focussing element array 20 is applied to the first surface of the substrate. As mentioned above, this may involve actual forming of the focussing element array 20 in-situ on the polymer substrate, e.g. by cast-curing, or could involve supplying a security article 290, shown in the form of a thread or strip, from an ancillary supply 200a and affixing at least portions of it carrying a pre-formed focussing element array to the surface of the polymer substrate, e.g. by lamination, adhesive or hot-stamping. Further details of preferred methods for forming the focussing element array 20 are described in section 2 below. In the example shown, the focussing element array 20 is applied at spaced intervals so as to form one or more devices 10 on each section of the web that will form a separate security document once cut. However in other cases the focussing element array could be applied continuously along the polymer substrate 2.

At an opacifying layer station 400, one or more opacifying layer(s) are applied to the first and/or second surfaces of the polymer substrate 2, as described further in section 4 below. Since the focussing element array 20 has already been applied to the polymer substrate in this embodiment, the application of the first opacifying layer 3a should omit at least part of the area(s) in which the focussing element array 20 is disposed so that it remains at least partially uncovered. The exception is where the focussing element array comprises mirrors rather than lenses in which case it could be covered on the first surface of the substrate and ultimately viewed from the opposite side. In the example shown, the second opacifying layer 3b is also omitted in the same area, so as to form a full window in which the focussing element array 20 is arranged.

At an image array station 300, an image array 30 is applied to the second surface of the polymer substrate 2. As mentioned above, this may involve actual forming of the image array 30 in-situ on the polymer substrate, e.g. by printing, or could involve supplying a security article 390, shown in the form of a thread or strip, from an ancillary supply 300*a* and affixing at least portions of it carrying a pre-formed image array to the surface of the polymer substrate, e.g. by lamination, adhesive or hot-stamping. Further details of preferred methods for forming the image array 30 are described in section 3 below. In the example shown, the image array 30 is applied opposite each of the focussing element arrays 20 such that in each window the device 10 exhibits a focussed image of the image array 30.

The web can then go on to be subjected to any of the optional processing steps described previously with respect to FIG. 2, not shown in FIG. 3. As noted above, whilst the apparatus shown in FIG. 3 is depicted as an in-line, web-based process, it is not essential that all of steps S200, S300 and S400 be carried out in such a way as described below in section 7.

1. Polymer Substrate

The polymer substrate 2 forms the structural basis of the finished security document 1 and is typically provided initially in the form of a quasi-continuous web, e.g. of width between 0.75 and 1.5 m and typically many tens or hundreds of metres long. The thickness of the polymer substrate is preferably in the range 50 to 100 microns, preferably 60 to 80 microns and most preferably about 70 microns.

In most embodiments, the polymer substrate 2 is transparent although this is not essential in all cases. The polymer substrate 2 comprises one or more polymeric materials, typically thermoplastics, such as: polypropylene (PP) (most preferably bi-axially oriented PP (BOPP)), polyethylene terephthalate (PET), polyethylene (PE), polycarbonate (PC), polyvinyl chloride (PVC), nylon, acrylic, Cyclic Olefin Polymer (COP) or Cyclic Olefin Copolymer (COC), or any combination thereof. The polymer substrate 2 may be monolithic, e.g. formed from a single one of the above materials, or multi-layered, e.g. having multiple layers of the same type of polymer (optionally with different orientations) or layers of different polymer types.

As mentioned previously, by "transparent" it is meant that the polymer substrate is substantially visually clear, although it may carry a coloured tint and/or another optically detectable substance such as a fluorescent material.

One or both surfaces of the polymer substrate 2 may be treated to improve adhesion/retention of subsequently applied materials. For example, a primer layer may be applied to all or part of either surface of the polymer substrate 2, e.g. by printing or coating. The primer layer is preferably also transparent and again could be tinted or carry another optically detectable material. Suitable primer layers include compositions comprising polyethylene imine, hydroxyl terminated polymers, hydroxyl terminated polyester based co-polymers, cross-linked or uncross-lined hydroxylated acrylates, polyurethanes and UV curing anionic or cationic acrylates.

Alternatively or in addition to the application of a primer layer, the surface of the polymer substrate 2 may be prepared for onward processing by controlling its surface energy. Suitable techniques for this purpose include plasma or corona treatment.

The application of the primer layer(s) and/or other surface treatment steps may be carried out as part of the processing steps described below in sections 2 to 4, e.g. before the application of material to the substrate 2, potentially in line with those processes. Alternatively, the application of the primer layer(s) and/or other surface treatment steps could be carried out separately such that the pre-treated polymer substrate 2 is supplied to the security document manufacturing process ready for the application of material thereto.

2. Application of Focussing Element Array

A focussing element array 20 comprises a plurality of focussing elements, typically lenses or mirrors, arranged over an area typically in a regular one-dimensional or two-dimensional grid. The nature of the focussing elements will depend on the desired optical effect but examples include cylindrical focussing elements, spherical focussing elements, aspherical focussing elements, elliptical focussing elements, Fresnel focussing elements and the like. The focussing elements can operate on refraction, diffraction or reflection (in the case of mirrors). For brevity, in the discussion below the term "lens" is used interchangeably with the term "focussing element" but this should not be taken as limiting.

The focal length of the lenses is directly related to their size (radius) and the available optical spacing must be taken into account when designing the lens array. Generally, the relationship between focal length f and lens radius r is:

$$f \propto \frac{r}{\Delta n}$$

where $\Delta n$ is the difference in refractive index across the interface defining the lens surface. In an example, for an image array 30 on the second surface of the polymer substrate 2 to be focussed by a focussing element array on the first surface of the polymer substrate 2, the optical geometry must be taken into account when selecting the thickness of the polymer substrate 2 (and any other optical spacer layer that may exist between the focussing element array 20 and the image array 30) and the dimensions of the lenses. In preferred examples the thickness is in the range 50 to 100 microns, hence the focussing element array should have a focal length in the same range. The periodicity and therefore maximum base diameter (or width, in the case of elongate lenses) of the focusing elements is preferably in the range 5 to 200 µm, more preferably 10 to 100 µm and even more preferably 10 to 70 µm. In other examples, the focussing element array 20 and image array 30 may both be arranged on the same side of the polymer substrate in which case the available optical spacing is likely to be smaller (e.g. 5 to 50 microns) and hence the dimensions of the lenses will need to be correspondingly reduced. The f number for the lenticular focusing elements is preferably in the range 0.1 to 16 and more preferably 0.5 to 4.

The focussing element array 20 could include focussing elements with different optical properties from one another, e.g. different focal length, in different sub-regions of the array, by appropriate design of the elements' shape and size. For example, the focussing element array could include lenses of different height from one another giving rise to different focal lengths in each region. In such cases, if a focussed image of an image array 30 is desired the image array 30 may be located at just one of the focal lengths, or two image arrays 30 could be provided, one at each focal length.

Preferred methods for manufacturing the focussing element array 20 will first be discussed in section 2.1, followed by preferred configurations of the focussing element array in section 2.2.

2.1 Methods of Manufacturing a Focussing Element Array

Preferred methods of manufacturing the focussing element array 20 include direct embossing into the surface of the polymer substrate 2, cast-curing, printing and surface-treatment controlled coating methods. Apart from the first of these, each of these techniques can either be performed on the first surface of the polymer substrate 2 or could be performed on another (transparent) support layer which is then affixed to the first surface of the polymer substrate 2. As defined above, the term "focussing element support layer" is intended to cover both of these options and is therefore used below. In places this is shorted to "support layer" for brevity.

In one embodiment, lenses may be printed onto a support layer using techniques such as those discussed in U.S. Pat. No. 7,609,451 or US-A-2011/0116152. A doming resin is applied to the support layer using a printing technique such as flexographic, lithographic or gravure printing in accordance with the desired grid arrangement. The nature of the doming resin and the volume in which it is applied is configured such that, upon application, the material adopts a dome-shaped profile having light-focussing properties. Examples of suitable doming resins are mentioned in the above-cited documents and include UV curable polymer resins such as those based on epoxyacrylates, polyether acrylates, polyester acrylates and urethane acrylates. Examples include Nasdar™ 3527 supplied by Nasdar Company and Rad-Cure™ VM4SP supplied by Rad-Cure Corporation.

In another embodiment, lenses may be formed by controlling the surface energy of the support layer in accordance with the pattern of lenses to be formed, and then applying a suitable material which will reticulate in accordance with the varying surface energy to form the lenses. Examples of how to implement this, and of suitable materials, can be found in US-A-20130071568.

In a further embodiment, a surface relief defining the focussing element array can be embossed into the surface of the polymer substrate 2 from a suitably shaped embossing die, by the application of heat and pressure. This approach has the advantage that no additional layers of material need be applied to the polymer substrate 2, thereby keeping its thickness to a minimum. However, in some cases this is not beneficial since this reduces the available optical spacing and hence requires the formation of smaller lenses and (as discussed in section 3) higher resolution of the image array 30.

The most preferred method of forming the focussing element array 20 is by cast-curing. This involves applying a transparent curable material either to the support layer or to a casting tool carrying a surface relief defining the desired focussing element array, forming the material using the casting tool and curing the material to fix the relief structure into the surface of the material. FIGS. 4 and 5 schematically depict two preferred cast-curing techniques which may be used. Components common to both methods are labelled with the same reference numbers. In both cases the process is shown as applied to a focussing element support layer 201, comprising a transparent film, which may be the aforementioned polymer substrate 2 or could be another layer which is later applied to the polymer substrate 2. In each case, Figure (a) depicts the apparatus from a side view, and Figure (b) shows the support layer in a perspective view, the manufacturing apparatus itself being removed for clarity. FIG. 5(c) shows a variant of the FIG. 5(a) embodiment.

Figure 6A:
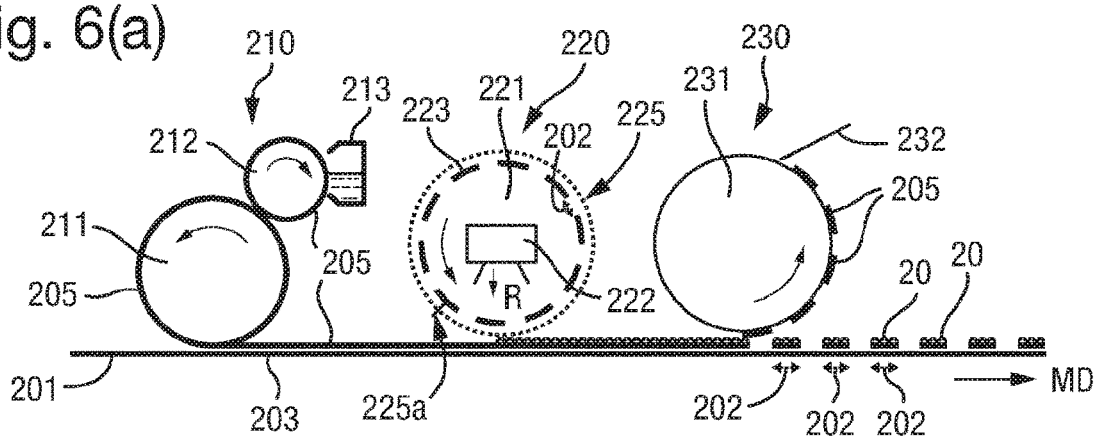
Figure 6B:
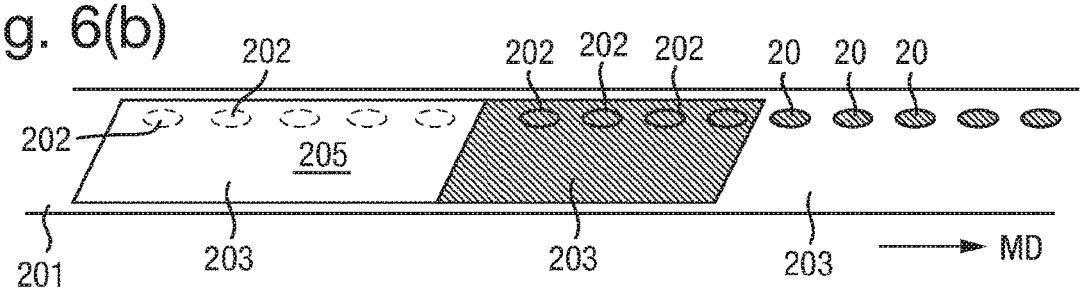
Figure 7A:
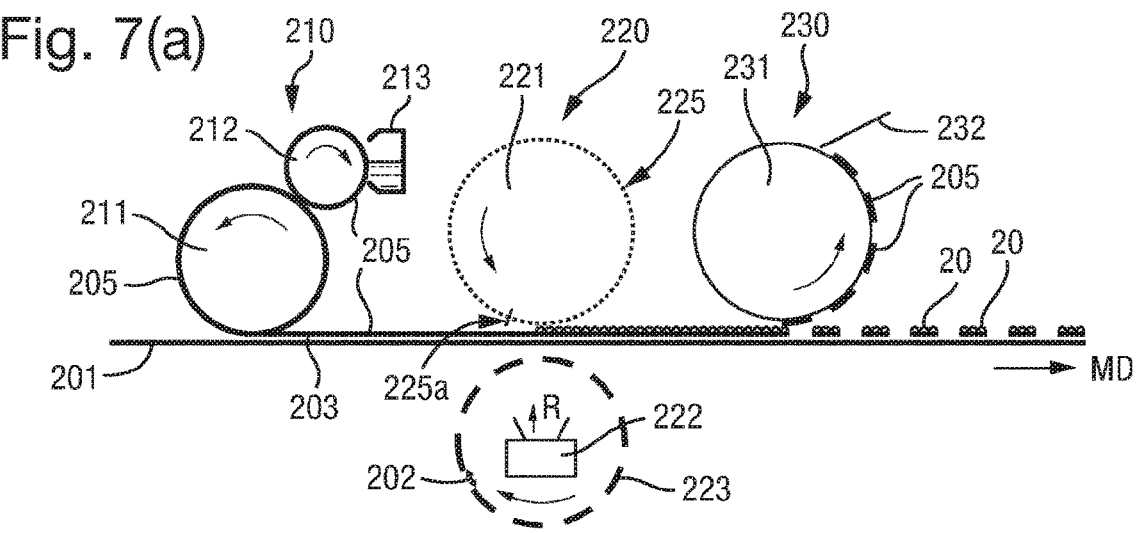
Figure 7B:
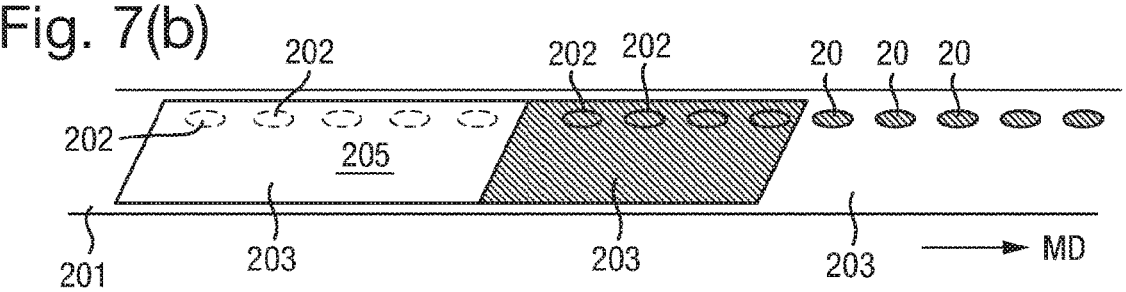

In the FIG. 4 embodiment, a transparent curable material 205 is first applied to the support layer 201 using an application module 210 which here comprises a patterned print cylinder 211 which is supplied with the curable material from a doctor chamber 213 via an intermediate roller 212. For example, the components shown could form part of a gravure printing system. Other printing techniques such as lithographic, flexographic, screen printing or offset printing could also be used. Print processes such as these are preferred since the curable material 205 can then be laid down on the support 201 only in first regions 202 thereof, the size, shape and location of which can be selected by control of the print process, e.g. through appropriate configuration of the pattern on cylinder 211. However, in other cases, an all over coating method could be used, e.g. if the focussing element array is to be formed all over the support 201 or if the method variants described below with respect to FIGS. 6 and 7 are utilised. The curable material 205 is applied to the support 201 in an uncured (or at least not fully cured) state and therefore may be fluid or a formable solid.

The support 201 is then conveyed to a casting module 220 which here comprises a casting tool 221 in the form of a cylinder carrying a surface relief 225 defining the shape of the focussing elements which are to be cast into the curable material 205. As each region 202 of curable material 205 comes into contact with the cylinder 221, the curable material 205 fills a corresponding region of the relief structure, forming the surface of the curable material into the shape defined by the relief. The cylinder 221 could be configured such that the relief structure 225 is only provided at regions corresponding to shape and position of the first regions 202 of curable material 205. However this gives rise to the need for accurate registration between the application module 210 and the casting module 220 in order that the focussing elements are accurately placed in each first region 202 of the curable material. Therefore in a particularly preferred embodiment, the cylinder 221 carries the relief structure corresponding to the focussing elements over an area larger than that of the first region 202, preferably around its complete circumference and most preferably over substantially its whole surface (although axial regions which will not come into the vicinity of the curable material may be excluded). In this way, each entire first region 202 of curable material 205 is guaranteed to come into contact with the surface relief structure 225 such that the focussing element array is formed over the full extent of the material. As a result, the shape, size and location of the focussing element array 20 is determined solely by the application of the curable material by the application module.

Having been formed into the correct surface relief structure, the curable material 205 is cured by exposing it to appropriate curing energy such as radiation R from a source 222. This preferably takes place while the curable material is in contact with the surface relief 225 although if the material is already sufficiently viscous this could be performed after separation. In the example shown, the material is irradiated through the support layer 201 although the source 222 could alternatively be positioned above the support layer 201, e.g. inside cylinder 221 if the cylinder is formed from a suitable transparent material such as quartz.

FIG. 5 shows variants of the above process in which, rather than apply the curable material 205 to the support layer 201, it is applied instead to the surface of the casting cylinder 225. Again this is preferably done in a patterned manner, using a print cylinder 211 to transfer the curable material 205 only onto the first regions 202 on the casting cylinder 221. Upon contact with the support layer 201, the regions 202 of curable material 205 affix to the support layer 205 and curing preferably takes place at this stage to ensure strong bonding. The so-formed focussing element arrays 20 again have a shape, size and location determined solely by the application module 210.

FIG. 5(c) illustrates an alternative implementation in which rather than apply the curable material 205 to the support layer 201 or the casting cylinder 221 in a patterned manner to define the first regions 202, the casting cylinder 221' is modified to achieve such patterning. Thus, the surface relief 225 defining the focussing element array is only provided in discrete patches of the surface of the casting cylinder 221' with the intervening areas having no surface relief. The curable material 205 can be applied all over the surface of casting cylinder 221', e.g. from a reservoir as shown or from an applicator roller. The curable material 205 fills at least the relief regions 225 and if any is collected on the intervening surface regions, a removal device such as a doctor blade or squeegee 213' may be provided to clear those areas. The support layer 201 is brought into contact with the cylinder 221', preferably in a wrap configuration as shown, and the curable material 205 is exposed to appropriate curing energy R from a source 222, preferably during contact as shown. The support layer 201 is then separated from the cylinder 221' and now carries discrete patches of focussing element arrays 20 in respective first regions 202.

In all of the above embodiments, preferably the first regions 202 have the form of indicia, such as an alphanumeric character, a symbol, logo or other item of information to increase the complexity of the design.

The surface relief 225 may be carried by cylinder 221 in the form of a sheet embossed or otherwise provided with the required relief, which is wrapped around the cylinder 221 and clamped in place. This may result in a noticeable join 225a where the two ends of the sheet meet, at which there is a discrepancy in the relief pattern. If replicated into one of the focussing element arrays this would cause a reduction in quality. It is therefore preferred that the casting module is at least coarsely registered to the application module so that the location of join 225a where it contacts support 201 does not coincide with any of the first regions 202 but rather is located between them, as shown by the example location labelled 225b. In cases where the curable material is applied (and retained) all over the support, or at least along a continuous strip in the machine direction MD, this join 225a is still preferably positioned outside the first region which is to be used to form the security device, advantageously in a location which will subsequently be coated with one of the opacifying layers 3. To achieve this consistently it is desirable for the process for forming the focussing element array to be registered with the opacifying layer application process, discussed in section 4, e.g. performed in the same in-line process.

FIGS. 6 and 7 show an alternative cast-cure process for forming the focussing element array. Again, components corresponding to those described above are labelled with the same reference numerals used previously and will not be described in detail again. In this case, the shape, size and location of each focussing element array is determined not by the initial application of the curable material 205 to the support layer 201 but by selective curing of that material.

Referring first to FIG. 6, here the application module 210 applies the curable material over not only the first regions 202 in which the focussing element array is ultimately to be located, but additionally over a second region 203 such that in this example substantially the whole of the first surface of the support layer 201 is coated with the curable material 205. Thus whilst in the example shown the application module is still constituted by a printing system as described previously (but in which the cylinder 211 defines a print area substantially over the whole area of the support as described here), this could be replace by a non-selective, all over coating module. The curable material 205 is then brought into contact with the casting tool 220 which again in this case is preferably provided with the appropriate surface relief 225 over substantially the whole of its circumference. Thus, the whole of the first and second regions 202, 203 of the curable material are formed in accordance with the relief structure. However, only selected portions of the material are cured. This can be achieved by providing a mask 223 through which the curable material 205 is exposed to the curing energy, e.g. UV radiation. The mask 223 defines radiation-transparent portions corresponding to the first regions 202 and radiation-opaque portions in between such that the second region 203 of the curable material is not cured. In this example, the radiation source 222 is located inside the casting cylinder 221 and the mask 223 is also arranged on the inside of that cylinder.

A removal module 230 is additionally provided to remove the uncured material 205 from the second region 203, leaving only the cured material in the first regions 202, bearing the desired surface relief and thereby forming the focussing element arrays 20. The removal module 230 can comprise a cleaning roller 231 with a (preferably soft) surface to which the uncured material 205 will adhere and be lifted off the support 201. A cleaning system such as a doctor blade or squeegee 232 may be provided to remove the waste material 205 from the roller 231.

In a variant of the FIG. 6 embodiment, the patterned mask 223 and curing energy source 222 may be arranged on the other side of the transport path, as shown in FIG. 7. Here the support layer 201 is conveyed through a nip defined between the casting cylinder 221 and a mask cylinder 223 arranged to move at substantially the same speed as one another. In other respects the FIG. 7 apparatus is the same as that of FIG. 6.

In both variants, any join 225a in the surface relief on the casting cylinder is preferably aligned with one of the opaque portions of the mask 223 such that the area of material 205 into which that part of the surface relief is formed will not be cured and is removed by station 230.

In both variants, the curable material 205 could be applied to the surface of the casting cylinder 221 instead of onto the support later 201, e.g. using an arrangement corresponding to that shown in FIG. 5.

In all of the above methods, the casting tool comprises a cylinder 221 carrying a surface relief 225 on its circumference. This is convenient in many circumstances and has been found to achieve good results. However, as already mentioned it is usual for such a cylinder to exhibit a join 225a in its surface which, if steps are not taken to avoid it, can result in some low quality focussing element arrays being produced. Also, due to the space occupied by the cylinder (and any opposing cylinder, not shown) there is a limit on the size and number of curing units (e.g. radiation sources) that can be provided to cure the curable material 205 while it is still in full contact with the surface relief on the cylinder.

FIG. 8 shows an alternative implementation of the casting module 220 which can be used in any of the above embodiments or those below. Here, the surface relief 225 is carried on a flexible belt 224, rather than a cylinder as in previous embodiments. The belt 224 is supported between at least two rollers 221a, 221b which bring it into and then out of contact with the support layer 201 at respective points $P_1$, $P_2$ spaced along the transport path by a non-zero distance. The surface relief 225 is brought into contact with the support layer 201 by the first roller 221a at point $P_1$, forming the regions of curable material 205 applied thereto in accordance with the desired relief structure defining the lenses. The surface relief 225 remains in contact with the support layer 201 as both come off the roller and are conveyed together towards point $P_2$. During this section of the transport path, the curable material 205 is cured, e.g. by radiation R. The belt 224 is preferably transparent to the radiation so that curing can take place from either or both sides. Due to the increased space in which the curable material is held in contact with the surface relief, a greater number and/or size of curing units, e.g. sources of curing energy can be arranged to effect curing, meaning that a more complete cure can be achieved more quickly. This ensures the relief structure is fixed before the cured material is removed from the casting tool.

The belt 224 can either be implemented as an endless loop, or as a sacrificial, single-use component. For example, in the former case the ends of the belt marked I and II are ultimately joined (not shown) and the belt traverses a continuous loop supported on the at least two rollers. Thus after being removed from the support layer 201 at point $P_2$ the belt 224 is circulated back to point $P_1$ where it is brought into contact with another portion of the support layer. Alternatively, the belt could stay in contact with the support layer after roller 221b indefinitely. At some later point the belt could be stripped off the support layer, leaving the formed lenses. In a still further variant, if the surface relief 225 and belt 224 are both transparent, and the surface relief 225 is formed of a material with a refractive index sufficiently different from that of the curable material 205, the belt 224 could remain in contact with the focussing element array and form part of the final assembly in the security document 1.

In all of the above methods, the transparent curable material 205 in which the lenses are formed can be of various different compositions. The curable material 205 is preferably radiation-curable and may comprise a resin which may typically be of one of two types, namely:
a) Free radical cure resins, which are typically unsaturated resins or monomers, pre-polymers, oligomers etc. containing vinyl or acrylate unsaturation for example and which cross-link through use of a photo initiator activated by the radiation source employed e.g. UV.
b) Cationic cure resins, in which ring opening (e.g. epoxy types) is effected using photo initiators or catalysts which generate ionic entities under the radiation source employed e.g. UV. The ring opening is followed by intermolecular cross-linking.

The radiation used to effect curing will typically be UV radiation but could comprise electron beam, visible, or even infra-red or higher wavelength radiation, depending upon the material, its absorbance and the process used. Examples of suitable curable materials include UV curable acrylic based clear embossing lacquers, or those based on other compounds such as nitro-cellulose. A suitable UV curable lacquer is the product UVF-203 from Kingfisher Ink Limited or photopolymer NOA61 available from Norland Products. Inc, New Jersey.

The curable material 205 could itself also be elastomeric and therefore of increased flexibility. An example of a suitable elastomeric curable material is aliphatic urethane acrylate (with suitable cross-linking additive such as polyaziridine).

2.1 Focussing Element Array Configurations

As already indicated, the focussing element array typically comprises a regular grid of elements, such as lenses or mirrors, which may be cylindrical, spherical, apsherical, Fresnel or of any other type necessary to achieve the desired visual effect. The focussing elements can be concave or convex. The array configuration may be modified to include any of the following features to provide additional benefits. Each of these structures can be formed using any of the above described methods (including embossing, printing etc), but the cast-curing embodiments described above are used for illustration.

FIG. 9(a) depicts an embodiment of a focussing element array 20, FIG. 9(a)(i) showing a surface relief 225 suitable for the manufacture thereof, and FIG. 9(a)(ii) showing the resulting focussing element array 20 disposed on a support layer 201. The location of an optional image array 30 is indicated.

In this example, the surface relief 225 is configured to include a base 24 of height $h_B$ between the lenses 20 and the opposite surface of the curable material 205 in which the focussing element array is formed, by depressing the surface relief corresponding to the lenses deeper into the casting tool. The base 24 improves the mechanical stability of the focussing element array 20 and its adhesion to the support layer 201 since the surface area of material 205 in contact with the support layer 201 is increased and the individual lens surfaces do not directly reach the surface of the material 205. In this example the integrity of the array is further enhanced by arranging the base 24 to extend beyond the periphery of the focussing element array 20 itself at regions 24'. The height $h_B$ will need to be taken into account, as well as the lens height $h_l$ itself (i.e. the sagittal height) when deciding the optical spacing between the focussing element array 20 and the image array 30 in order to ensure the image array 30 lies as the desired focal distance f from the lens apex. In preferred embodiments the height $h_B$ may be 10 microns or less, for example, preferably 5 microns or less, most preferably between 1 and 3 microns.

FIG. 9(b) depicts another embodiment of a focussing element array 20, FIG. 9(b)(i) showing a surface relief 225 suitable for the manufacture thereof, and FIG. 9(b)(ii) showing the resulting focussing element array 20 disposed on a support layer 201. The location of an optional image array 30 is indicated.

In this example, the surface relief 225 is configured to include an optical spacing region 29 of height $h_s$ between the lenses 20 and the opposite surface of the curable material 205 in which the focussing element array is formed, by depressing the surface relief corresponding to the lenses deeper into the casting tool. This enables the focussing element array itself to provide all or part of the necessary focal length f between the lenses and the image array 30. This is particularly useful where both the focussing element array and the image array are to be provided on the same surface of the security document 1. In preferred embodiments the height $h_s$ is approximately equal to the focal length of the focussing element array 20, e.g. 5 to 200 µm, more preferably 10 to 100 µm and even more preferably 10 to 70 µm.

FIG. 10 shows embodiments in which the transparent material 205 is applied and retained on the support 201 not only in the first region 202 in which the focussing element array 20 is to be located, but also in an adjacent second region 203 which may optionally extend over the whole area of the support. The surface relief 225 is configured such that in the second region 203 the curable material 205 is retained with a height greater than or equal to the maximum height of the focussing element array 20. In the example shown in FIGS. 10(a) and (b) the surface relief 225 is configured to provide gaps separating the first and second regions of the material 205, but this is not essential. By arranging for the surface of the lenses to be flush with or sit below the level of the material 205 in the neighbouring region 203, the lenses are relatively protected from damage during handling. Further the generally flat resulting surface provides a good surface for later printing of the opacifying layers 3 thereon, if desired.

Figure 10C:
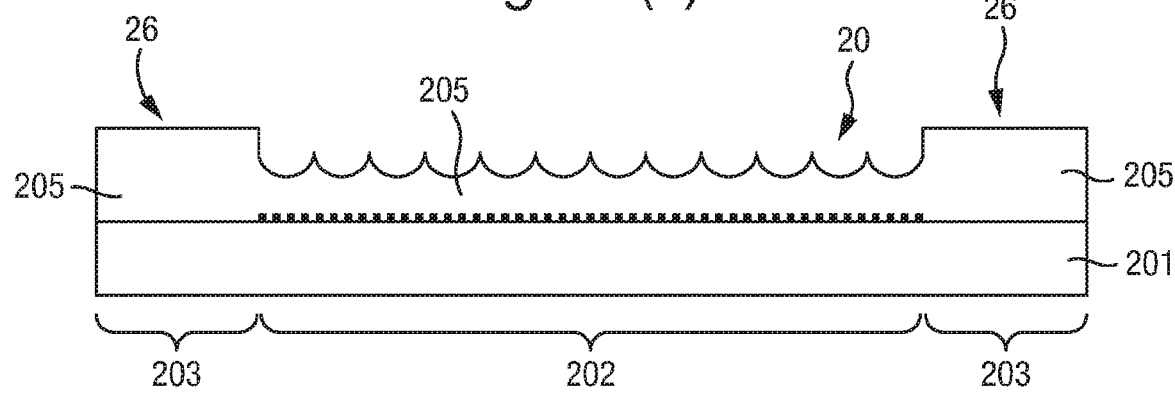

FIG. 10(c) shows an alternative embodiment employing the same principle in which the focussing elements are concave rather than convex, as is preferred in this configuration.

2.3 Indirect Formation of Focussing Element Array

As noted in the introduction, the focussing element array 20 could be formed directly on the polymer substrate 2 of the security document 1, in which case the focussing element support layer 201 referred to in sections 2.1 and 2.2 will be the polymer substrate 2. Alternatively, the above-described methods could be performed on another transparent carrier foil, forming the support layer 201, to form a security article such as a thread, strip or patch. The so-formed article can then be applied to a polymer substrate 2, e.g. by lamination, adhesive or hot-stamping, to affix the focussing element array 20 to the first surface of the substrate 2. Alternatively, the article could be formed as a transfer element from which the formed focussing element array 20 can be transferred onto the substrate 2 and affixed thereto, leaving the support layer 201 behind, which can then be disposed of.

Two preferred constructions of transfer elements 290 are shown in FIGS. 11(a) and (b). The focussing element array 20 is formed on a transparent support layer 201 using any of the techniques described above. The focussing element array 20 and support layer 201 are then laminated to a carrier film 291 via a release layer 292, which could comprise for example a pressure sensitive adhesive, a wax or a primer layer. Preferably the release layer is thin, e.g. 0.2 to 0.3 microns so as to contact only a small area on the top of each lens (or at the sides of each lens in a concave arrangement. An adhesive layer 293 is provided on the opposite surface of the support layer 201. Upon attachment to the polymer substrate 2, the adhesive layer 293 is brought into contact with the first surface 2a of the substrate 2 and any additional steps required to achieve bonding are carried out, e.g. heating and/or curing depending on the nature of the adhesive. The carrier layer 291 and release layer 292 are then stripped off the focussing element array 20.

Figure 11B:
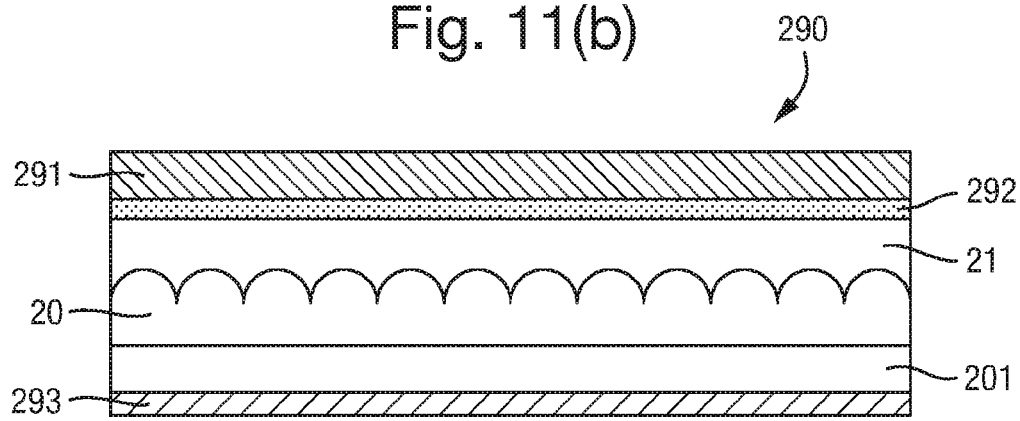

The variant shown in FIG. 11(b) is substantially the same as that already described, except that here an overcoating 21 is provided between the focussing element array 20 and the release layer 292, so that the release layer 292 does not contact the lens surfaces. The overcoating 21 could for example comprise a clear lacquer. The overcoating will however need to have a different refractive index from that of the material from which the focussing element array 20 is formed, in order to maintain the functionality of the lenses. Preferably, the difference in refractive index is at least 0.1, preferably at least 0.15. The overcoating 21 is retained on the lenses when the carrier layer 291 and release layer 292 are stripped off.

3. Application of Image Array

As noted in the introduction above, the provision of an image array 30 is optional but preferred. It is particularly advantageous to provide an image array configured to co-operate with the focussing element array 20 to produce an optically variable effect. For example, the image array 30 and focussing element array 20 may, in combination, form a moiré magnification device, an integral imaging device or a lenticular device, the mechanism on which each operates having been discussed above.

Security devices of the above types depend for their optical effect at least in part upon the high resolution with which the image array 30 has been produced. For instance, in a lenticular device, each image element or "slice" making up image array 30 must be narrower than the pitch of the focussing element array 20, which as discussed above is typically no more than 100 microns, usually less. For example, if the diameter of the focusing elements is 30 µm then each image element may be around 15 µm wide or less. Alternatively for a smooth lenticular animation effect it is preferable to have as many different interleaved images as possible, typically at least five but ideally as many as thirty. In this case the size of the image elements should be in the range 0.1 to 6 µm. In practice, in a lenticular device, the width of the image elements is directly influenced by two factors, namely the pitch of the focusing element (e.g. lens) array and the number of image elements required within each lens pitch or lens base width. The former however is also indirectly determined by the thickness of the lenticular device. This is because the focal length for a plano-convex lens array (assuming the convex part of the lens is bounded by air and not a varnish) is approximated by the expression $r/(n-1)$, where r is the radius of curvature and n the refractive index of the lens resin. Since the latter has a value typically between 1.45 and 1.5 then we may say the lens focal approximates to 2r. Now for a close packed lens array, the base diameter of the lens is only slightly smaller than the lens pitch, and since the maximum value the base diameter can have is 2r, it then follows that the maximum value for the lens pitch is close to the value 2r which closely approximates to the lens focal length and therefore the device thickness.

To give an example, for a security thread component as may be incorporated into a banknote, the thickness of the lenticular structure and therefore the lens focal length is desirably less than 35 µm. Let us suppose we target a thickness and hence a focal length of 30 µm. The maximum base diameter we can have is from the previous discussion equal to 2r which closely approximates to the lens focal length of 30 µm. In this scenario the f-number, which equals (focal length/lens base diameter), is very close to 1. The lens pitch can be chosen to have a value only a few µm greater than the lens diameter—let us choose a value of 32 µm for the lens pitch. It therefore follows for a two channel one-dimensional lenticular device (i.e. two image element strips per lens) we need to fit two image strips into 32 µm and therefore each strip is 16 µm wide. Similarly for a four channel one-dimensional lenticular the printed line width requirement drops down to 8 µm (in this example).

As a result, the f-number of the lens should preferably be minimised, in order to maximise the lens base diameter for a given structure thickness. For example suppose we choose a higher f-number of 3, consequently the lens base diameter will be 30/3 or 10 µm. Such a lens will be at the boundary of diffractive and refractive physics—however, even if we still consider it to be primarily a diffractive device then the we may assume a lens pitch of say 12 µm. Consider once again the case of a two channel device, now we will need to print an image strip of only 6 μm and for a four channel device a strip width of only 3 μm.

Similar considerations apply to other types of devices. For example, in moiré magnifiers and integral imaging devices, each microimage must be of the same order of magnitude as one lens, or smaller. Thus, the microimage will typically have overall dimensions of 50 microns or less. In order to provide the microimage with any detail, small line widths are required, e.g. of 15 microns or preferably less, ideally 5 microns or less.

Conventional printing techniques will generally not be adequate to achieve such high resolution. For instance, typical printing processes used to manufacture pattern elements (image arrays) for security devices include intaglio, gravure, wet lithographic printing and dry lithographic printing. The achievable resolution is limited by several factors, including the viscosity, wettability and chemistry of the ink, as well as the surface energy, unevenness and wicking ability of the substrate, all of which lead to ink spreading. With careful design and implementation, such techniques can be used to print pattern elements with a line width of between 25 μm and 50 μm. For example, with gravure or wet lithographic printing it is possible to achieve line widths down to about 15 μm. However, consistent results at this resolution are difficult to achieve and in any case this level of resolution still imposes a significant limitation on the security device. Thus while any of the above-mentioned techniques can be employed in embodiments of the present invention, higher resolution methods (i.e. suitable for achieving smaller line widths) for forming the image array 30 would be highly desirable.

Specialist high resolution printing techniques for forming image arrays which can achieve smaller line widths are discussed below in section 3.1

Another approach for forming high-resolution image arrays 30 is through the use of relief structures, such as diffractive structures, in place of ink-based processes. This approach can be used in embodiments of the present invention and is discussed in more detail below in section 3.2.

3.1 Print-Based Methods for Forming Image Arrays

One method which has been put forward as an alternative to the printing techniques mentioned above, and can be employed in embodiments of the invention, is used in the so-called Unison Motion™ product by Nanoventions Holdings LLC, as mentioned for example in WO-A-2005052650. This involves creating pattern elements ("icon elements") as recesses in a substrate surface before spreading ink over the surface and then scraping off excess ink with a doctor blade. The resulting inked recesses can be produced with line widths of the order of 2 μm to 3 μm.

A different method of producing high-resolution image elements is disclosed in WO-A-2015/044671 and is based on flexographic printing techniques. A curable material is placed on raised portions of a die form only, and brought into contact with a support layer preferably over an extended distance. The material is cured either whilst the die form and support layer remain in contact and/or after separation. This process has been found to be capable of achieving high resolution and is therefore advantageous for use in forming the image array 30 in the present application.

Some more particularly preferred methods for generating patterns or micropatterns (i.e. an image array 30) on a substrate are known from US 2009/0297805 A1 and WO 2011/102800 A1. These disclose methods of forming micropatterns in which a die form or matrix is provided whose surface comprises a plurality of recesses. The recesses are filled with a curable material, a treated substrate layer is made to cover the recesses of the matrix, the material is cured to fix it to the treated surface of the substrate layer, and the material is removed from the recesses by separating the substrate layer from the matrix.

Another strongly preferred method of forming a micropattern is disclosed in WO 2014/070079 A1. Here it is taught that a matrix is provided whose surface comprises a plurality of recesses, the recesses are filled with a curable material, and a curable pickup layer is made to cover the recesses of the matrix. The curable pickup layer and the curable material are cured, fixing them together, and the pickup later is separated from the matrix, removing the material from the recesses. The pickup layer is, at some point during or after this process, transferred onto a substrate layer so that the pattern is provided on the substrate layer.

The above-mentioned methods described in US 2009/0297805 A1, WO 2011/102800 and WO 2014/070079 A1 have been found to produce particularly good results and are therefore particularly preferred for use in forming the image array 30 in embodiments of the invention.

Figure 12:
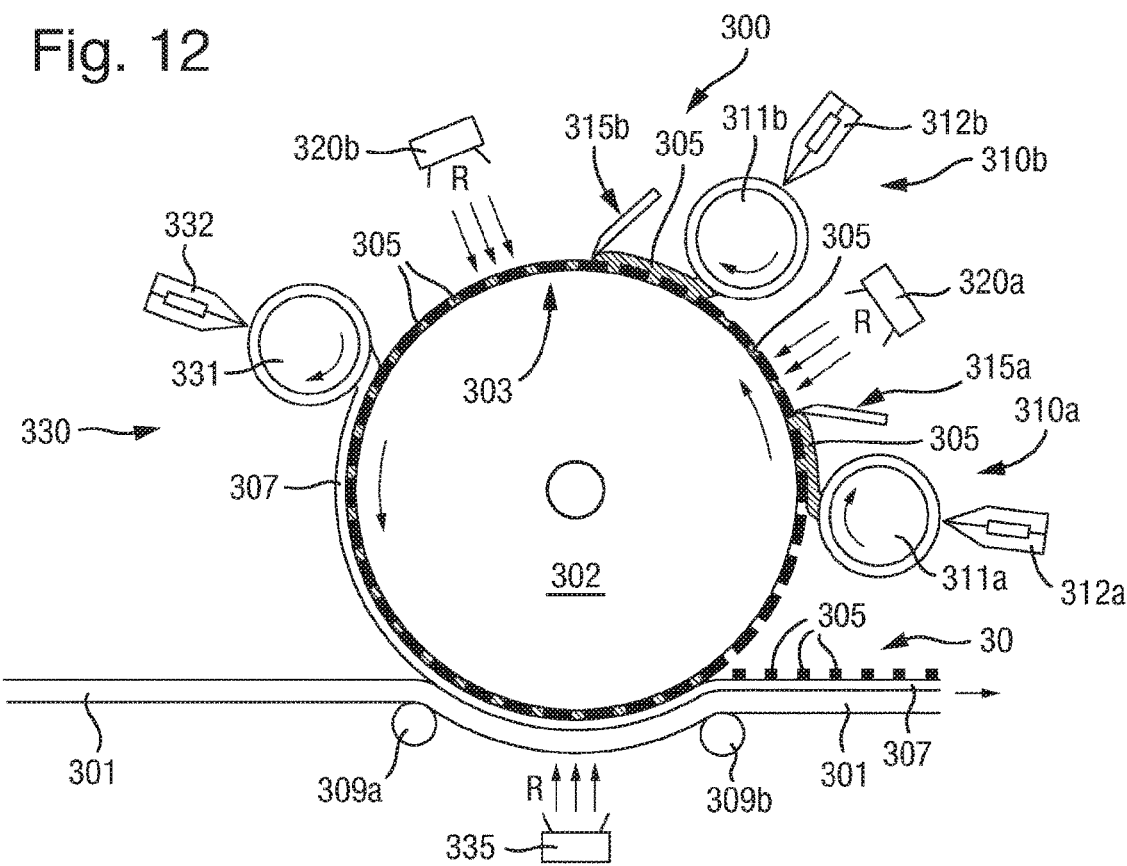

FIG. 12 shows a preferred embodiment of a method for forming the image array 30, which is based on the principles disclosed in WO 2014/070079 A1, where more details can be found. The image array is formed on an image array support layer 301, which is preferably transparent, and which could be the polymer substrate 2 ultimately forming the basis of the security document 1, or could be another carrier film which is then affixed to the security document 1. The image array support layer 301 is preferably pre-primed, e.g. by applying a primer layer such as a thin, optically clear UV adhesive layer (not shown) or by raising its surface energy e.g. by corona treatment. The desired pattern of image elements which are to form the image array 30 (e.g. microimages, or slices of interleaved images) is defined by recessed areas in the surface 303 of a die form 302. Each recessed area preferably has a depth of the order of 1 to 10 microns, more typically 1 to 5 microns, and a width in the range 0.5 to 5 microns. The recessed areas are separated by raised areas of that surface 303. The die form preferably takes the form of a cylinder, but this is not essential.

The recessed areas of the die form are filled with a curable material 305, which is preferably visibly coloured (including white, grey or black) but this is not essential and the material could be colourless. The material 305 may or may not be transparent. An exemplary first application module for applying the material 305 into the recessed areas is shown at 310a. This includes a slot die 312a configured to supply the curable material 305 to a transfer roller 311a from which it is applied to the die form surface 303. The shore hardness of the transfer roller 311a is preferably sufficiently low that some compression/compliance is achieved to improve the transfer of material to the die form 302, which is typically relatively rigid such as a metal print cylinder. The applied ink layer should match or exceed the depth of the recessed areas. The viscosity of the curable material may be configured so that the material 305 transfers substantially only into the recessed areas of the die form and not onto the raised surfaces but in case any of the material 305 remains on the raised surfaces it is preferred to provide a removal means such as doctor blade 315a to remove any such excess material 305 from outside the recessed areas. The material 305 in the recessed areas is preferably then at least partially cured by exposing the material 305 to appropriate curing energy, e.g. radiation, from a source 320a, although this curing could be performed at a later stage of the process.

Any suitable curable material 305 could be used, such as a thermally-curable resin or lacquer. However, preferably, the curable material is a radiation curable material, preferably a UV curable material, and the curing energy source is a radiation source, preferably a UV source. UV curable polymers employing free radical or cationic UV polymerisation are suitable for use as the UV curable material. Examples of free radical systems include photo-crosslinkable acrylate-methacrylate or aromatic vinyl oligomeric resins. Examples of cationic systems include cycloaliphatic epoxides. Hybrid polymer systems can also be employed combining both free radical and cationic UV polymerization. Electron beam curable materials would also be appropriate for use in the presently disclosed methods. Electron beam formulations are similar to UV free radical systems but do not require the presence of free radicals to initiate the curing process. Instead the curing process is initiated by high energy electrons.

Preferably the finished pattern is visible (optionally after magnification) to the human eye and so advantageously the curable material comprises at least one colourant which is visible under illumination within the visible spectrum. For instance, the material may carry a coloured tint or may be opaque. The colour will be provided by one or more pigments or dyes as is known in the art. Additionally or alternatively, the curable material may comprise at least one substance which is not visible under illumination within the visible spectrum and emits in the visible spectrum under non-visible illumination, preferably UV or IR. In preferred examples, the curable material comprises any of: luminescent, phosphorescent, fluorescent, magnetic, thermochromic, photochromic, iridescent, metallic, optically variable or pearlescent pigments.

If the first application module 310a achieves substantially complete filling of the recessed areas with material 305 then no further application of curable material 305 may be required. However it has been found that the recessed areas may not be fully filled by a single application process and so, in particularly preferred embodiments, a second application module 310b is provided downstream of the first (and preferably of curing source 320a) for applying more of the same material 305 to the die form. In the example shown, the second application module 310b is of the same configuration as the first, comprising a slot die 312b for supplying the curable material 305 onto a transfer roller 311b which applies the curable material 305 into the partially-filled recessed areas on the die form surface. Again the viscosity of the material could be adjusted so that it only fills those recessed areas and is not substantially applied to the raised areas, but preferably another removal means such as doctor blade 315b is provided to remove any such excess material 305 from outside the recessed areas. In the present embodiment, the transferred material 305 is then at least partially cured by second curing source 320b although as discussed below this is not essential, or the degree of curing of the additional material applied by second application module 310b may be lower than that of the material applied first.

If the recessed areas of the die form surface 303 are still not substantially filled, third and subsequent application modules 310 can be provided as necessary.

Next, a tie coat 307 formed of a second curable material is applied over substantially the whole surface of the die form 303, i.e. coating both the filled recessed areas and the raised areas of the surface 303. The second curable material may be of the same composition as the first curable material but is preferably of a different appearance (e.g. colour) so as to provide a visual contrast with the first material in the finished array. In particularly preferred embodiments, the tie coat composition may be selected so as to improve the adhesion between the first curable material and the support layer 301. The tie coat 307 is applied by a tie coat application module 330 which here comprises a slot die 332 and a transfer roller 331. It is desirable for the tie coat to be applied in a continuous, homogenous manner at the micron level hence it is preferably applied in a metered way via a slot die and transfer roller combination.

The tie coat may be partially cured at this point by a further radiation source (not shown). The die form surface carrying the filled recesses and tie coat is then brought into contact with the support layer 301, either at a nip point or, more preferably, along a partial wrap contact region between two rollers 309a, 309b as shown. The combination is then exposed to curing energy, e.g. from radiation source 335, preferably while the support layer 301 is in contact with the die form surface. The support layer 301 is then separated from the die form at roller 309b, carrying with it the tie coat 307 and the elements of material 305 removed from the recessed areas of the die form surface 303 by the tie coat 307. The material 305 is therefore present on the support layer 301 in accordance with the desired pattern, forming image array 30.

The tie coat 307 is preferably at least partially cured before the die form 302 leaves contact with the support layer 301 at roller 309b, hence the preferred use of a partial wrap contact via lay on and peel off rollers 309a, b as shown which tension the web around the die form cylinder. If the material is not fully cured in this step, an additional curing station may be provided downstream (not shown) to complete the cure.

In a variant, after the tie coat 307 has been applied, a removal means such as a further doctor blade could be provided to remove the tie coat 307 from the raised portions of the die form surface 303 such that the regions of the tie coat 307 are confined to the print images. These tie coat regions will most likely not be proud of the die form surface. As such the support layer 301 in this embodiment is preferably primed with a compliant adhesive layer which may be partly cured prior to contacting the die form but should still be compliant before entering the curing wrap.

Figure 13:
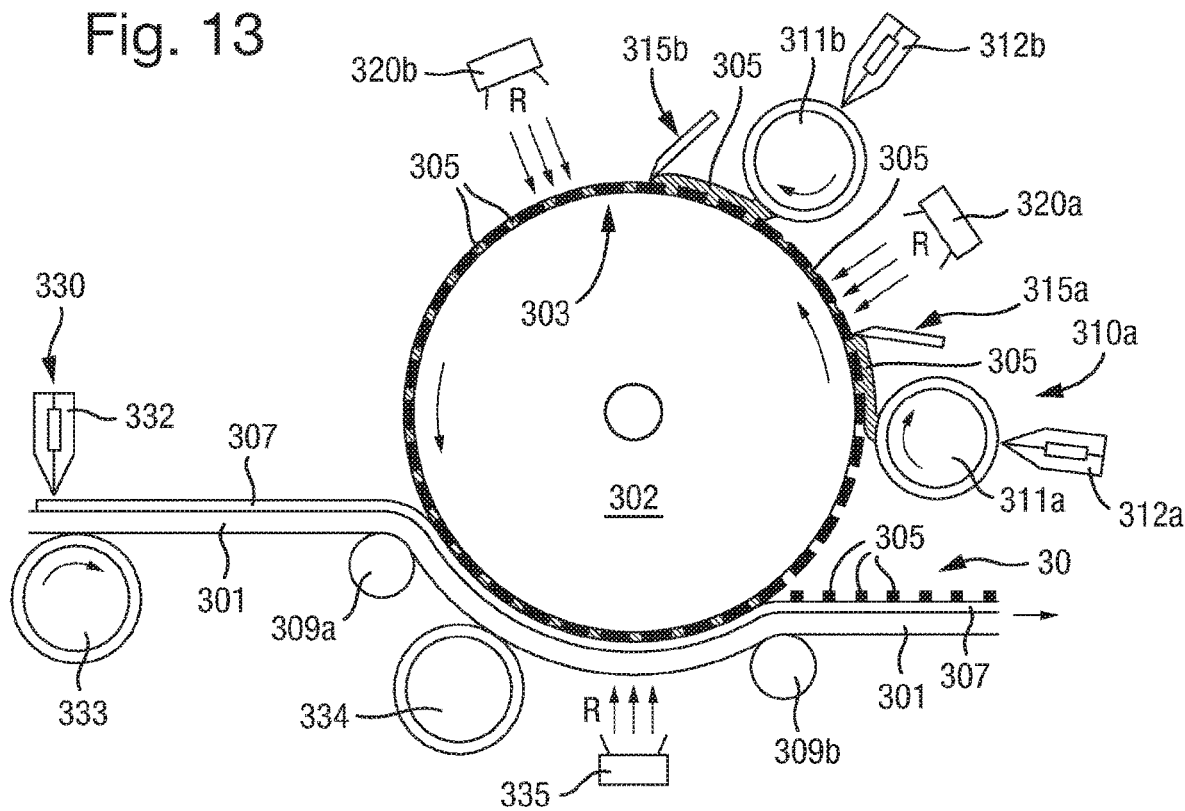

Another embodiment of a method for forming an image array 30 is shown in FIG. 13. In many respects this is the same as described above with reference to FIG. 12 and so like items are labelled with the same reference numbers and will not be described again. The main difference is that here, the tie coat 307 is not applied to the die form surface 303 but rather to the surface of support layer 301, upstream of the point at which it is brought into contact with the die form. Thus the tie coat application module 330 is positioned upstream and is configured to apply the material 307 over substantially the whole surface of support layer 301, either directly, e.g. using a slot die 332 opposite an impression roller 333, or indirectly by applying the material 307 onto an offset roller or transfer blanket (not shown) from which it is applied to the support layer 301. The tie coat 307 could be applied to the support layer by various other methods, including flexographic printing or offset gravure, although these are less preferred since they do not offer the same consistency and spatial homogeneity as a slot die system.

The support layer 201 carrying the tie coat 307 is then brought into contact with the die form surface so as to cover the filled recessed areas and adjacent raised areas with the tie coat 307. Preferably the tie coat 307 is pressed into the recessed areas so as to achieve good joining therebetween before the curing process begins. A second impression roller 334 may be provided for this purpose, located after the lay on roller 309a but before curing module 335.

In each of the methods described above, the recessed areas are filled with curable material 205 in at least two application steps. As described already, it is preferable to cure each application of material 205 before the next is applied. The last application of material may also be cured as described above. However, in a further embodiment, additional benefits may be achieved by not curing, or only partially curing, the last application of material 305 before it is brought into contact with the support layer 301. In this way the last portion of material 305, located at the top of each recessed area, remains relatively fluid and tacky at the point at which it contacts either the tie coat 307 (if this is provided) or the support layer 301. Once in contact, the material 305 can then be fully cured by source 335. This has been found to result in a particularly strong bond between the support layer 301 and the pattern elements formed of material 305.

Whilst all of the above methods have been described with the use of a tie coat 307, in fact this is optional but strongly preferred. Hence the tie coat and its application steps may be omitted from the above-described methods. This is particularly the case where the last application of material 305 is not fully cured, as described immediately above, since this incompletely cured material can take on the function of the tie coat, helping to affix the material 305 onto the support 301.

Where a tie coat 307 is provided, in particularly preferred embodiments the material forming the tie coat 307 may contain an anti-static additive, e.g. an electrically conductive substance. This helps to disperse and therefore prevent the build-up of electrostatic charge on the substrate, which in turn reduces the tendency of the substrate to stick to other surfaces, including other such substrates. Suitable anti-static materials for use in the tie coat include graphite particles, as well as those substances disclosed in EP1008616, WO2014/000020 and WO2008/042631. In particularly preferred examples, the anti-static additive is selected so as not to significantly modify the appearance of the tie coat 307. Most advantageously, both the anti-static additive and the tie-coat 307 as a whole may be visually transparent (i.e. clear, but potentially carrying a coloured tint).

In many cases, the tie coat 307, if provided, will be a transparent material such that the pattern formed by the material 305 transferred onto the support 301 can be viewed from either side. However, this is not essential and in one advantageous embodiment, the tie coat 307 could be non-transparent and configured to form one of the opacifying layer 3 on the finished security document 1. Thus, the tie coat 307 could comprise any of the opacifying materials discussed below in section 3, if necessary with the addition of a curing agent. The tie coat 307 could be applied in a patterned manner, leaving gaps so as to form window regions if desired. The patterned material 305 need not be applied all over the tie coat but may be restricted to selected regions to form localised image arrays 30, through appropriate configuration of the surface relief on die form 302. The resulting image array 30 will of course then be visible only from one side of the transparent support layer 301 (which will be the polymer substrate 2 in this scenario). However, this lends itself well to constructions of the sort shown in FIG. 1(d) above, with the image array 30 and focussing element array 20 both located on the same side of the substrate 2. To provide the necessary optical spacing, the focussing element array 20 could be formed using a surface relief as described with reference to FIG. 9. Another example in which forming the tie coat 307 as an opacifying layer 3 can be used to beneficial effect will be described below with reference to FIG. 19.

Each of the above described methods will result in a pattern of spaced elements of material 305 on the support layer 301, optionally with an intermediate layer in the form of the tie coat 307 (if provided). Due to the manner in which the elements of material 305 are formed, the pattern has a surface relief with the elements of material 305 standing proud of the surface on which they are arranged, with substantially none of the material 305 between them. The following embodiments of methods for forming an image array 30 make use of this surface relief to modify the appearance of the so-formed pattern.

Figure 14:
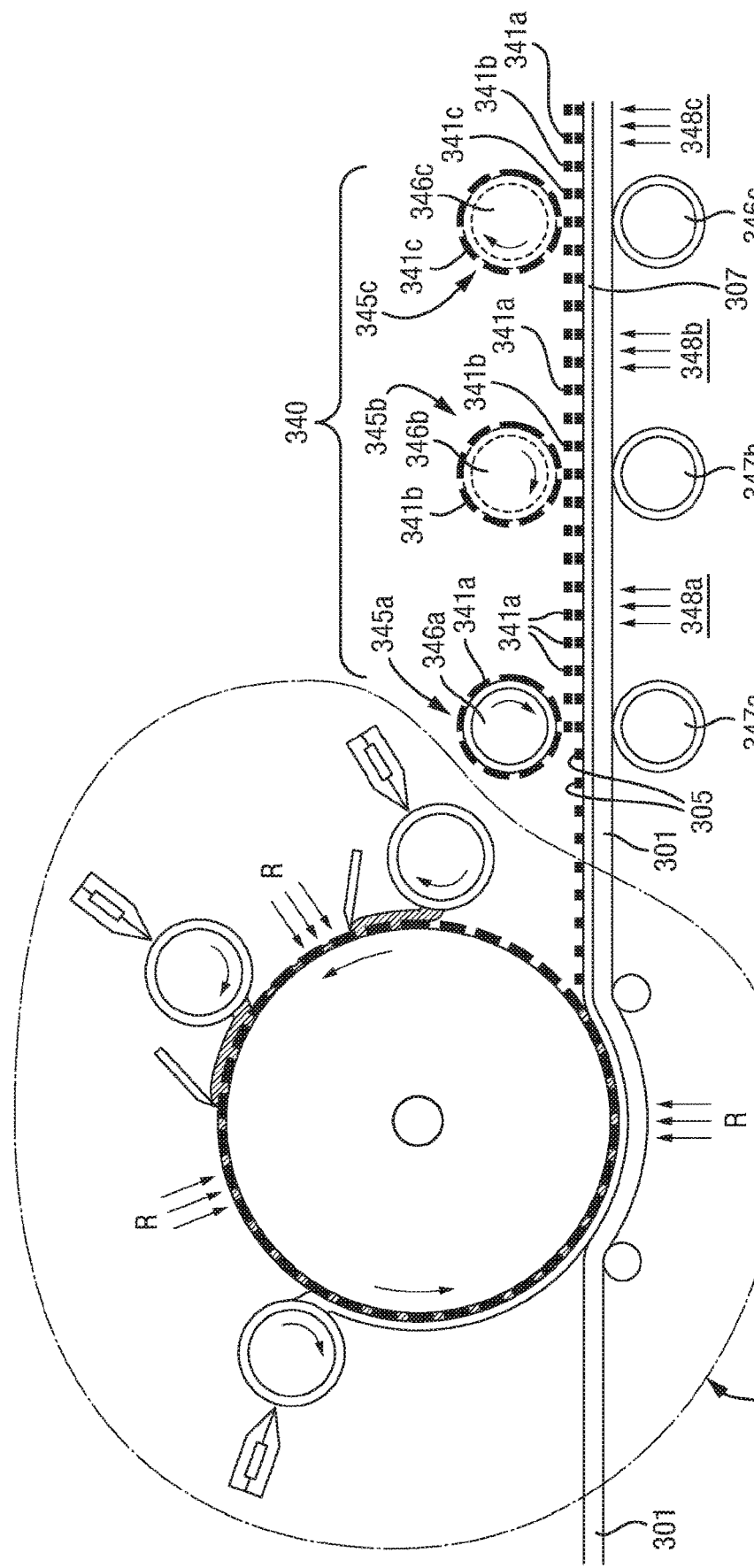

FIG. 14 shows an extension of the method described above with respect to FIG. 12 and those aspects already described in relation to FIG. 12 will not be described again. It will be appreciated that the presently described extension can be applied equally to the output of the FIG. 13 method, or of any of the other variants described above. Thus, the described method outputs a support layer 301 carrying a relief formed of the material 305 as mentioned. The appearance of the pattern is now modified by applying one or more optically detectable materials 345 to either the tops of the relief structure (i.e. onto the tops of the elements of material 305), or into the gaps between them. The same material must not be applied to both, else the pattern will be lost. Hence, FIG. 14 shows a station 340 which here is adapted to apply three different optically detectable materials, e.g. three different colours of ink, to only the tops of the material elements 305. In this case the station 340 comprises three patterned print cylinders 346a, 346b and 346c each configured to apply a working of a different material 341a, 341b, 341c so as to form a multi-coloured image. The cylinders 346a, 346b, 346c are registered to one another in a conventional way. Highly accurate register beyond that visible to the human eye is not required since the high resolution patterning is achieved by the upstream process of FIG. 12. The print cylinders 346a, b, c (each opposed here by impression rollers 347a, b, c) and the materials 341a, b, c are configured in this example so as to deposit the material only onto the tops of the elements 305 and not into the gaps therebetween. This can be achieved for example by controlling the viscosity of the materials 341a, b, c and/or selecting a process such as flexographic printing in which the material is applied to the print surface under only a light pressure. In this way, the multi-coloured image is formed only on the elements 305 and is absent elsewhere. The result is an image array 30 comprising high-resolution pattern images which vary in colour in accordance with the desired (macro) image, or any other pattern. This can be used for instance to form a full colour lenticular device which has previously proved extremely difficult to manufacture.

The materials 341a, b, c may be curable materials in which case one or more curing stations 348a,b,c may be positioned along the transport path as necessary.

FIG. 15 shows a variant of the above process in which the optically detectable materials 345a, 345b, 345c and 345d are applied to the tops of the elements 305 in an indirect process. The materials are applied in register with one another to a transfer roller 349 such as an offset roller, to form the desired multi-coloured image thereon. The materials are then applied to the elements 305 from the transfer roller 349 in one step. This has been found to achieve an increase resolution.

In both method variants, the optically detectable material(s) could be placed only in the gaps between elements 305, rather than on their tops. This can be achieved by changing the viscosity of the materials and/or utilising a method in which the materials are forced into the gaps and/or cleaned from the tops. In a still further refinement, one optically detectable material could be placed only in the gaps and a different optically detectable material only onto the tops of the elements. More details as to how the optically detectable materials may be applied, and suitable types of materials, can be found in US20110045248.

3.2 Relief-Based Methods of Forming Image Arrays

In other examples the image array 30 can be formed by a relief structure and a variety of different relief structure suitable for this are shown in FIG. 16. Thus, FIG. 16*a* illustrates image regions of the image elements (IM), in the form of embossed or recessed regions while the non-embossed portions correspond to the non-imaged regions of the elements (NI). FIG. 16*b* illustrates image regions of the elements in the form of debossed lines or bumps.

In another approach, the relief structures can be in the form of diffraction gratings (FIG. 16*c*) or moth eye/fine pitch gratings (FIG. 16*d*). Where the image elements are formed by diffraction gratings, then different image portions of an image (within one image element or in different elements) can be formed by gratings with different characteristics. The difference may be in the pitch of the grating or rotation. This can be used to achieve a multi-colour diffractive image which will also exhibit a lenticular optical effect such as an animation through the mechanism described above. For example, if the image elements had been created by writing different diffraction tracks for each element, then as the device is tilted, lenticular transition from one image to another will occur as described above, during which the colour of the images will progressively change due to the different diffraction gratings. A preferred method for writing such a grating would be to use electron beam writing techniques or dot matrix techniques. Using a diffractive structure to provide the image elements provides a major resolution advantage: although ink-based printing is generally preferred for reflective contrast and light source invariance, techniques such as modern e-beam lithography can be used generate to originate diffractive image strips down to widths of 1 μm or less and such ultra-high resolution structures can be efficiently replicated using UV cast cure techniques.

Such diffraction gratings for moth eye/fine pitch gratings can also be located on recesses or bumps such as those of FIGS. 16*a* and *b*, as shown in FIGS. 16*e* and *f* respectively.

FIG. 16*g* illustrates the use of a simple scattering structure providing an achromatic effect.

Further, in some cases the recesses of FIG. 16*a* could be provided with an ink or the debossed regions or bumps in FIG. 16*b* could be provided with an ink. The latter is shown in FIG. 16*h* where ink layers 200 are provided on bumps 210. Thus the image areas of each image element could be created by forming appropriate raised regions or bumps in a resin layer provided on a transparent substrate. This could be achieved for example by cast curing or embossing. A coloured ink is then transferred onto the raised regions typically using a lithographic, flexographic or gravure process. In some examples, some image elements could be printed with one colour and other image elements could be printed with a second colour. In this manner when the device is tilted to create the lenticular animation effect described above, the images will also be seen to change colour as the observer moves from one view to another. In another example all of the image elements in one region of the device could be provided in one colour and then all in a different colour in another region of the device.

Finally, FIG. 16*i* illustrates the use of an Aztec structure.

Additionally, image and non-image areas could be defined by combination of different element types, e.g. the image areas could be formed from moth eye structures whilst the non-image areas could be formed from gratings. Alternatively, the image and non-image areas could even be formed by gratings of different pitch or orientation.

Where the image elements are formed solely of grating or moth-eye type structures, the relief depth will typically be in the range 0.05 microns to 0.5 microns. For structures such as those shown in FIGS. 16*a, b, e, f, h* and *i*, the height or depth of the bumps/recesses is preferably in the range 0.5 to 10 μm and more preferably in the range of 1 to 2 μm. The typical width of the bumps or recesses will be defined by the nature of the artwork but will typically be less than 100 μm, more preferably less than 50 μm and even more preferably less than 25 μm. The size of the image elements and therefore the size of the bumps or recesses will be dependent on factors including the type of optical effect required, the size of the focusing elements and the desired device thickness.

4. Application of Opacifying Layer(s)

Referring back to FIG. 1, the opacifying layer(s) 3 comprise a non-transparent material, the primary purpose of which is to provide a suitable background for later printing of graphics 8 thereon. Thus, preferably, the opacifying layers comprise polymeric, non-fibrous material containing at least a light scattering substance such as a pigment. The opacifying layers 3 are preferably light in colour, most preferably white or another light colour such as off-white or grey so that a later-applied graphics layer 8 will contrast well against it. In preferred examples, the opacifying layers each have a brightness L* in CIE L*a*b* colour space of at least 70, preferably at least 80 and more preferably at least 90. For example, each opacifying layer may comprise a resin such as a polyurethane based resin, polyester based resin or an epoxy based resin and an opacifying pigment such as titanium dioxide (TiO2), silica, zinc oxide, tin oxide, clays or calcium carbonate.

Two or more opacifying layers may be applied to each surface of the polymer substrate 2, in order to achieve the necessary opacity. The optical density of each layer by itself may typically be around 0.2 to 0.5. Preferably, 3 or more layers are applied to each surface, overlapping one another.

In a preferred embodiment, at least one of the opacifying layers (preferably one on each surface of the polymer substrate (2) is made electrically conductive, e.g. by the addition of a conductive pigment thereto. This reduces the effect of static charges which may otherwise build up on the security document 1 during handling.

The opacifying layers are preferably applied to the polymer substrate using a printing process such as gravure printing, although in other case the opacifying layers could be coated onto the substrate, or applied by offset, flexographic, lithographic or any other convenient method. Depending on the design of the security document 1, the opacifying layers may be omitted across gaps on one or both surfaces of the polymer substrate to form window regions (which may be full windows or half windows, or a mixture of both). This can be achieved through appropriate patterning of the opacifying layers during the application process.

In one preferred method, mentioned in section 2 above, an outer one of the opacifying layers 3 can be applied as a tie coat 307 during the application of an image array 30 thereon.

In alternative constructions, the opacifying layers 3 could comprise self-supporting pre-formed layers (optionally including apertures to later form windows) which are then laminated to the polymer substrate 2. In this case, the opacifying layers could be polymeric or could be of fibrous construction, such as paper, thus rendering the security document a "hybrid" paper/polymer construction.

5. Registration of Focussing Element Array and Image Array

In some cases, accurate registration of the focussing element array 20 and the image array 30 is not required, provided the two items are at least coarsely registered to one another such that they overlap in the desired device region. This is particularly the case for moiré magnification devices in which a magnified version of the microimage array will be generated even if the two arrays are misaligned, although the translational position and/or the orientation and size of the magnified images may vary.

However, if registration can be achieved between the focussing element array 20 and the image array 30, this enables a level control over the optical effect generated by the device which is extremely difficult to imitate by any other means and thereby presents a substantial challenge to counterfeiters. For example, in a moiré magnification device, accurate registration enables the precise location, size and orientation of the magnified images to be maintained constant for every device manufactured such that a user checking the authenticity of the device will be able to compare the location of the magnified image to some reference point on the security document (such as the centre of the device 10) and if this is incorrect, reject the device as fraudulent.

Registration has even more profound effects on lenticular type devices, in which the range of viewing angles over which each of the interleaved images will be displayed depends on the positioning of the respective image elements underneath each lens. It is important to achieve good skew registration so that the orientation of the two arrays are aligned. If not, parts of individual image elements will extend from the footprint of the lens through which they are intended to be viewed into another, with the result that the desired images may not be displayed properly, or only across part of the security device. In addition, without accurate translational registration (in the machine direction and/or the cross direction) of the focussing element array 20 to the image array 30, it is not possible to control the location of the image elements relative to the lenses meaning that the order in which they will be displayed as the device is tilted cannot be controlled. For instance, an image which is intended to be displayed when the device is viewed along the normal may in practice be displayed only at some off-axis angle, and images which are intended to show different extremes of an animation (e.g. an object at its largest size and at its smallest) may be displayed at adjacent viewing angle ranges meaning that upon tilting the animation appears to skip frames, jumping from one to another without a smooth continuum therebetween. Various approaches for avoiding this problem have been proposed, including the use of cyclic effects as described in GB-A-2490780, in which the images are configured such that the same cyclic animation will be displayed no matter which image is located at the centre viewing position. However, the lack of registration limits the type of optical effect which can be implemented successfully. In particular, sets of images showing the same object from different view points so as to create a 3D effect upon tilting would benefit greatly from accurate registration.

Some preferred methods for improving registration between the focussing element array 20 and the image array 30 are discussed below.

5.1 Mechanical Register

FIG. 17 shows an embodiment of the invention which provides good skew register between the focussing element array 20 and the image array 30, and offers an improvement in translational register also.

The polymer substrate 2 is provided with at least one line of apertures 51 spaced along the machine direction. Preferably two such lines of apertures 51 are provided at either side of the web. The manufacturing line may be provided with a die cutting module 50 for cutting the apertures 51 into the polymer substrate 2, e.g. using a die cylinder 55 against an impression cylinder 56 with corresponding recesses. Alternatively the polymer substrate 2 may be supplied with the apertures 51 pre-cut.

In the focussing element array module 200, which is shown here schematically but could take any of the forms discussed in section 2 above, either the casting tool 221 or an impression cylinder 57 provided to oppose it, is equipped with corresponding pegs 52 arranged to protrude along lines corresponding to the location of the apertures 51 in the polymer substrate. In use, the pegs 52 extend through the apertures 51, holding the polymer substrate square across its width as the focussing element array 20 is formed.

The web 2 is then conveyed to an image array forming module 300, which again is shown schematically but could take any of the forms discussed in section 3 above. Either the die form 302 or an impression cylinder 58 opposing it is provided with lines of pegs 52 which as before engage with the apertures 51 in the polymer substrate as it is conveyed through the nip between the die form and the impression cylinder, thereby holding the polymer substrate square. As such, the degree of skew between the applied focussing element array 20 and image array 30 is reduced.

It will be appreciated that the above technique involving the engagement of the apertures and pegs can be employed no matter what the order of the processing steps, and can also be utilised during other steps such as application of the opacifying layers.

This method additionally achieves an improvement in the translational registration of the components, but to a lesser degree.

5.2 Simultaneous Application of Focussing Element Array and Image Array

In preferred embodiments of the invention, the focussing element array 20 and image array 30 are applied to opposite sides of a transparent material, whether this be the polymer substrate 2 or another support layer which can then be applied to the polymer substrate 2 or to a conventional (e.g. paper-based) security document, e.g. so as to form the structure shown in FIG. 1(*d*).

In such cases it is highly desirable for the focussing elements array 20 and the image array 30 to be applied to the opposite surfaces of the substrate simultaneously. That is, at the same position along the transport path in the machine direction.

FIG. 18(*a*) shows an example of this in the case where the focussing element array 20 and image array 30 are applied to the first and second surfaces, respectively, of the polymer substrate 2. However the same principles can be applied to the construction of an article such as a security thread, in which case the substrate 2 will be replaced by some other, typically thinner, transparent film. The focussing element array 20 and image array 30 can be formed using any of the processes described above in sections 2 and 3. For clarity, FIG. 18(a) depicts only selected components of the apparatus used to form the focussing element array 20 and image array 30, namely a casting tool 221 (e.g. as shown in any of FIGS. 4 to 8) and a die form 302 (e.g. as shown in any of FIGS. 12 to 15). Other components of the process line are not shown. The casting tool 221 and die form 302 are arranged on opposite sides of the transport path along which the polymer substrate 2 is conveyed, so as to form a (low pressure) nip through which the polymer substrate 2 passes. At each location along the polymer substrate 2, its first surface 2a therefore comes into contact with the casting tool 221 at the same time as its second surface 2b comes into contact with the die form 302. As a result, the focussing element array 20 and image array 30 are applied to each point of the substrate web simultaneously.

This has the significant advantage that any deformation experienced by the polymer substrate 2, as a result of changes in processing temperature or the like, will be exactly the same when the focussing element array 20 is applied to the polymer substrate 2 as it is when the image array 30 is applied. The web has no time to expand or contract between the instant at which the focussing element array 20 is applied and when the image array 30 is applied, since they occur at the same time. As such, a high degree of register between the two components is automatically achieved.

The arrangement shown in FIG. 18(a) has the disadvantage that since the nip between the casting tool 221 and the die form 302 constitutes the first point of contact between the polymer substrate and the casting tool 221, the transparent curable material 205 from which the focussing element array 20 is formed will be substantially uncured when it enters the nip. As such, the pressure applied between the casting tool 221 and the die form 302 should be low so as to avoid damage to the cast focussing element array 20.

Figure 18B:
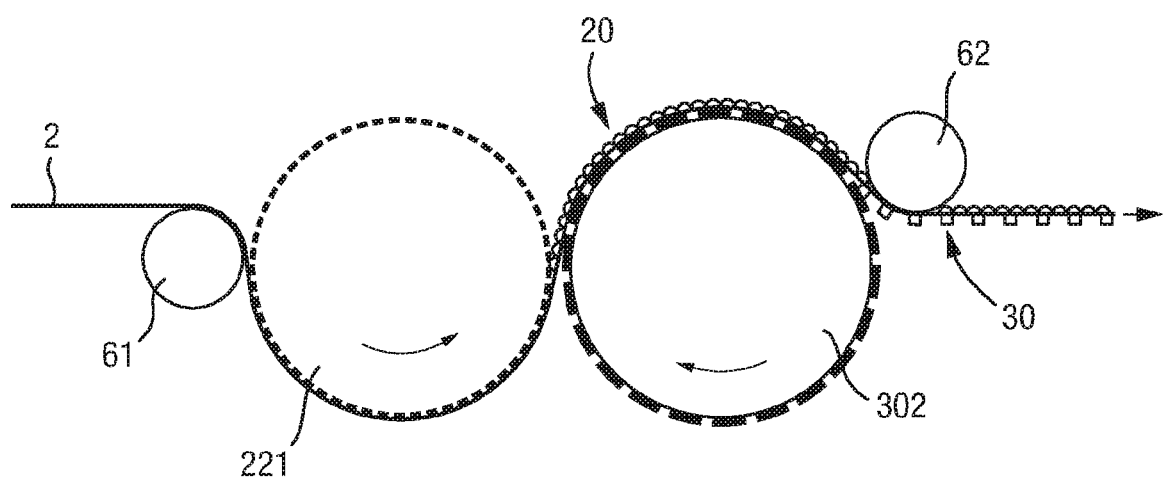

FIG. 18(b) shows an improved arrangement in which formation of the focussing element array 20 and application of the image array 30 can still be considered simultaneous because the curable material 205 is still in contact with the surface relief on casting tool 221 at the nip location between the casting tool 221 and the die form 302. The polymer substrate is wrapped around a portion of the casting tool 221 from a first point at lay on roller 61, at which casting of the focussing element array 20 begins, until the nip with die form 302 at which point the focussing element array 20 will be relatively well cured, preferably fully cured. As such, the pressure between the two components 221, 302 can be increased relative to that in the FIG. 18(a) embodiment since the material 205 is relatively hard and less prone to damage. This improves the quality achieved in the image array formation process. A further benefit of the arrangement shown is the increased wrap length of the substrate 2 around die form 302, allowing for prolonged curing here also. The substrate 2 stays in contact with die form 302 from the nip location until take-off roller 62.

6. Optional Additional Features and Preferred Examples

As mentioned above, whilst in many cases it is desirable to use the polymer substrate 2 as the optical spacer between the focussing element array 20 and the image array 30, this is not essential and methods are provided above for arranging both components on one side of the polymer substrate. This can be used to provide a number of new effects.

A first example is shown in FIG. 19, in which opacifying layer 3a on the first surface of polymer substrate 2 is used as an optical barrier to separate two lens-based security devices, the first formed by focussing element array 20a and image array 30a and the second by focussing element array 20b and image array 30b. Image array 30a is located on top of opacifying layer 3a, and focussing element array 20 is positioned thereover. This could be manufactured for example by using the methods described in section 3 above with a tie coat 207 formed of opacifying material to form layer 3a. The focussing element array 20 could be formed with an integral optical spacing portion to provide the necessary focal length $f_a$, as described in section 2 above. Alternatively, the focussing element array 20 could be formed on a support layer 201 (not shown in FIG. 19) and the image array formed on the reverse side of the support layer 201. Both can then be applied to the opacifying layer by lamination or hot stamping.

Before the opacifying layer 3a is applied, however, the image array 30b must be formed on the first surface of polymer substrate 2 and this could be achieved by any of the previously described methods. Focussing element array 20b can also be formed on the second surface of polymer substrate 2 using any of the methods described in section 2. The polymer substrate 2 provides the necessary optical spacing to achieve focal length $f_b$.

FIG. 20 shows another example of a security document 1. Here, the polymer substrate 2 is first provided with opacifying layers 3a (and optionally 3b) and then printed with graphics layers 8a, 8b as described above in section 0.3. Only then is security device 10 applied formed of image array 30 and focussing element array 20. Each of these components can be formed using any of the methods described above, e.g. lamination of a security sheet carrying both components across the substrate 2. The image array 30 and focussing element array 20 extend across substantially the whole surface, or at least a significant part of, the security document 1 so as to produce a strong visual impact. The image array 30 is preferably configured to have a low fill factor so as not to significantly obstruct the view of the underlying graphics layer 8a. For instance the device 10 may be a moiré magnifier or an integral imaging device both of which are well suited to this application.

FIG. 20 also illustrates another optional feature which could be provided in any embodiment of the invention, namely a camouflage layer 90. This is provided to conceal the presence of an image array 30 from the side of view from which the focussed version thereof will not be visible. This is desirable since when viewed without the focussing element array 20 the image array 30 is likely to have a dull, indistinct appearance due to the very fine pattern of microimages or image elements of which it is typically made up. The camouflage layer can be formed of any suitable non-transparent material, but metallic inks, iridescent inks or colour-shifting inks are particularly preferred. The layer 90 may be uniform or patterned, e.g. displaying indicia.

Another preferred example of a security document 1 is shown in FIG. 21, (a) in plan view and (b) in cross section. The construction of the security document 1 is substantially the same as shown in FIGS. 1(a) and (b) although the security device 10 could alternative have the construction shown in FIG. 1(c) or (d).

The image array 30 and focussing element array 20 forming the security device 10 are configured so as to display a focussed image (which may preferably be optically variable) across the region 5 (here a full window region) which is a pattern or a portion of another image which is also displayed by the graphics layer 8 across a second region 6 of the security document 1 outside the region 5. In the example shown the second region 6 encompasses the whole area of the security document 1 outside window 5 but this is not essential. Preferably however the region 6 abuts (i.e. borders) the window region 5, and desirably surrounds it.

The two regions are configured so as to display the same image as one another, preferably a repeating "wallpaper" type pattern, although this is not essential and the window 5 could provide a missing portion of any image the remainder of which is displayed in region 6. However, the image in region 6 will appear static, since it is formed by conventional means in graphics layer 8. In region 5 however, the image will be projected onto an image plane by the focussing element array 20 and hence appears non-static, tending to move relative to the image in graphics layer 8 upon tilting. This effect can be enhanced further by forming device 10 as an optically variable device such as a moiré magnifier or a lenticular device, in both cases projecting the same image as in region 6 but in a manner which changes upon tilting the device. For example, a moiré magnifier exhibiting the image in the form of an array of magnified microimages may give the impression of the array moving and the images "scrolling" across the region 5 upon tilting. A lenticular device can be arranged to animate the image, e.g. by moving it around inside region 5, and/or by changing its colour.

Preferably the device 10 is configured such that the image is displayed in region 5 at substantially the same size as in region 6, through control of any magnification factor applied by the focussing element array 20 and the size of the elements forming image array 30.

The result is a particularly distinctive security effect. It should be appreciated that the above described image in region 6 will typically not form the whole of graphics layer 8 but rather it will be provided in addition to other features such as a portrait, indicia etc. For instance, the image may provide a background to such features.

7. Preferred Process Sequences

As noted at the outset, the various steps involved in manufacturing the security document 1 can be carried out in different orders. However, certain orders provide particular benefits and some examples are given below. Also relevant is which steps are performed on the initial web form in which the polymer substrate 2 are supplied, and which in a sheet-fed process after the web has been cut into sheets.

Some preferred examples are now described, with reference to the numbering of the process steps introduced in FIG. 2.

In a first preferred embodiment, key steps of the process are carried out all in line, on a continuous web of the polymer substrate 2. This has the benefit that the most accurate registration between the various process can be achieved. Hence, in one example first step S200 is performed to apply the focussing element array 20 to the polymer substrate, using any of the methods discussed in section 2 above. If any registration zones/marks are to be used they should also be formed at this stage. If the formation of the focussing element array 20 involves raised temperatures, it is beneficial to perform this process first so that any thermal distortion can be taken account of during the later steps.

Next, the opacifying layer(s) are applied in step S400 (section 4), e.g. by gravure, then the image array 30 is formed, e.g. using any of the processes described in section 3. All of the above can be performed on the initial web width, e.g. 0.75 to 1.5 m wide. If necessary the web can then be slit to narrow it (step S800).

The web is then cut into sheets (step S900) and subsequently printed and subject to any further finishing processes before cutting into documents.

A second preferred option is substantially the same as above except that step 200 is performed on a separate press (i.e. not in line) before the opacifying layers and image array 30 are then applied to the web (in line).

A third preferred option is substantially the same as the first preferred embodiment above, but the image array 30 is applied after the web has been narrowed (step S800), but before sheeting (step S900). It is potentially more achievable to control web tension on a narrower web (as opposed to the initial wide web) and therefore higher registration and image resolution may be achieved in this way.

In a fourth preferred option, either of the first or second options above is modified by postponing formation of the image array 30 until after sheeting (step S900) and therefore typically in a print works on a lithographic or flexographic press.

In a fifth preferred option, only the application of the opacifying layers 3 (step S400) is performed on the web and the formation of the focussing element array 20 and image array 30 are carried out after sheeting (step S900), in a sheet-fed process. For example, the image array 30 may be applied to the sheet first, on its first surface, followed by a focussing element array 20 on the same surface, e.g. incorporating an optical spacer. Any of the above mentioned processes could be used. Preferably these steps take place after printing of the graphics layer 8 and potentially after any other security devices 9 have been applied.

By moving the focussing element array formation step and image array formation step towards the end of the manufacturing process, wastage and costs can be reduced. This is because both steps are relatively slow and expensive compared to other steps of the manufacturing process. By completing more of the other process steps before the focussing element array 20 and image array 30 are formed, these more costly steps need only be performed on sections of the polymer substrate which have met the necessary quality threshold in each of the preceding steps, and not on any waste material.

Whilst it is preferred that both steps S200 and S300 are move towards the end of the manufacturing process for this reason, benefits are still achieved if just one or the other is postponed in this way. Hence one of these steps could be performed on the web (i.e. before sheeting S900) and only the other remaining one may be performed on the sheets.

The invention claimed is:

1. A method of manufacturing a security device, comprising:
   providing a transparent support layer having first and second surfaces;
   conveying the transparent support layer along a transport path in a machine direction; and during the conveying, simultaneously at the same position along the transport path in the machine direction:
   (a) forming an array of focussing elements on the first surface of the transparent support layer in at least a first region by:
      (a)(i) applying at least one transparent curable material either to the transparent support layer or to a casting tool, carrying a surface relief corresponding to the focussing elements, over an area which includes at least the first region;
      (a)(ii) forming the at least one transparent curable material with the casting tool; and
      (a)(iii) curing the at least one transparent curable material so as to retain the surface relief in the first region; and (b) applying an image array to the second surface of the transparent support layer in at least part of the first region by printing the image array onto the transparent support layer via one of: intaglio printing, gravure printing, wet lithographic printing, dry lithographic printing, or flexographic printing;

wherein the array of focussing elements and the image array are registered to one another at least in the machine direction.

2. The method according to claim 1, wherein:

in step (a), a focussing element cylinder carrying the surface relief on its circumference corresponding to the array of focussing elements is used as the casting tool to form the array of focussing elements on the first surface of the transparent support layer, in step (b), an image cylinder is used to apply the image array to the second surface of the transparent support layer, steps (a) and (b) are performed simultaneously at a nip formed between the focussing element cylinder and the image cylinder, and the transparent support layer passes through the nip.

3. The method according to claim 2, wherein:

the transport path is configured such that the transparent support layer is held in contact with the focussing element cylinder over a portion of its circumference between a first contact point and a last contact point spaced from one another by a non-zero distance, and the nip formed between the focussing element cylinder and the image cylinder either is located between the first and last contact points, closer along the transport path to the last contact point than to the first contact point, or forms the last contact point.

4. The method according to claim 1, wherein:

a focussing element cylinder constitutes the casting tool, and step (a)(iii) is performed while the transparent support layer is held in contact with the focussing element cylinder over the portion of its circumference such that the at least one transparent curable material is at least partly cured at a location of a nip formed between the focussing element cylinder and an image cylinder used to apply the image array to the second surface of the transparent support layer.

5. A method of manufacturing a security document, comprising:

providing a polymer substrate having first and second surfaces in the form of a web;

applying at least one opacifying layer to the first and/or second surfaces of the polymer substrate in the form of a web, the or each opacifying layer comprising a non-transparent material; and then cutting the web into sheets in the direction of web transit, then performing on the sheets, in at least one sheet-fed process:
  (a) applying an array of focussing elements to the first surface of the polymer substrate across a first region by:
    (a)(i) applying at least one transparent material either to the polymer substrate or to a casting tool carrying a surface relief corresponding to the focussing elements, over an area that includes at least the first region;
    (a)(ii) forming the at least one transparent curable material with the casting tool; and
    (a)(iii) curing the at least one transparent curable material so as to retain the surface relief in the first region; and
  (b) applying an image array to the polymer substrate in the first region, such that the image array is located in a plane spaced from the array of focussing elements by a distance substantially equal to the focal length of the focussing elements via one of: intaglio printing, gravure printing, wet lithographic printing, dry lithographic printing, or flexographic printing, wherein:

the focussing elements exhibit a substantially focussed image of the image array; and either the image array is located between the array of focussing elements and the at least one opacifying layer on the first surface of the substrate, or at least the opacifying layer(s) on the first surface of the substrate define a gap forming a window region in which at least part of the array of focussing elements is disposed such that a substantially focussed image of at least part of the image array is displayed in the window region.

6. The method according to claim 5, further comprising, after cutting the web into sheets:

printing a graphics layer onto the at least one opacifying layer on the first and/or second surfaces of the polymer substrate in at least one sheet-fed process.

7. The method according to claim 5, wherein:

in step (b) the image array is provided on the first surface of the polymer substrate, and the focussing element array includes an optical spacing portion.

8. A method of manufacturing a security document, comprising:

providing a polymer substrate having first and second surfaces in the form of a web; and in either order:
  (i) applying at least one opacifying layer to the first and/or second surfaces of the polymer substrate in the form of a web, the or each opacifying layer comprising a non-transparent material; and
  (ii) applying an array of focussing elements to the first surface of the polymer substrate in the form of a web across a first region by:
    applying at least one transparent curable material either to the polymer substrate or to a casting tool carrying a surface relief corresponding to the focussing elements, over an area that includes at least the first region;
    forming the at least one transparent curable material with the casting tool; and
    curing the at least one transparent curable material so as to retain the surface relief in the first region; and
  then after steps (i) and (ii):

cutting the web into sheets in the direction of web transit;

then performing on the sheets, in at least one sheet-fed process:

applying an image array to the polymer substrate in the first region, such that the image array is located in a plane spaced from the array of focussing elements by a distance substantially equal to the focal length of the focussing elements via one of: intaglio printing, gravure printing, wet lithographic printing, dry lithographic printing, or flexographic printing;

wherein:

the focussing elements exhibit a substantially focussed image of the image array; and either the image array is located between the array of focussing elements and the at least one opacifying layer on the first surface of the substrate, or at least the opacifying layer(s) on the first surface of the substrate define a gap forming a window region in which at least part of the array of focussing elements is disposed such that a substantially focussed image of at least part of the image array is displayed in the window region.

9. The method according to claim 8, further comprising, after cutting the web into sheets:
printing a graphics layer onto the at least one opacifying layer on the first and/or second surfaces of the polymer substrate in at least one sheet-fed process.

10. The method according to claim 8, wherein:
the image array is provided on the first surface of the polymer substrate, and
the focussing element array includes an optical spacing portion.

11. A method of manufacturing a security document, comprising:
providing a polymer substrate having first and second surfaces in the form of a web; and in either order:
(i) applying at least one opacifying layer to the first and/or second surfaces of the polymer substrate in the form of a web, the or each opacifying layer comprising a non-transparent material; and
(ii) applying an image array to the polymer substrate in the form of a web in a first region via one of: intaglio printing, gravure printing, wet lithographic printing, dry lithographic printing, or flexographic printing; and then after steps (i) and (ii):
cutting the web into sheets in the direction of web transit;
then performing on the sheets, in at least one sheet-fed process:
applying an array of focussing elements to the first surface of the polymer substrate across the first region, such that the image array is located in a plane spaced from the array of focussing elements by a distance substantially equal to the focal length of the focussing elements by:
applying at least one transparent curable material either to the polymer substrate or to a casting tool carrying a surface relief corresponding to the focussing elements, over an area that includes at least the first region;
forming the at least one transparent curable material with the casting tool; and
curing the at least one transparent curable material so as to retain the surface relief in the first region;
wherein:
the focussing elements exhibit a substantially focussed image of the image array; and
either the image array is located between the array of focussing elements and the at least one opacifying layer on the first surface of the substrate, or at least the opacifying layer(s) on the first surface of the substrate define a gap forming a window region in which at least part of the array of focussing elements is disposed such that a substantially focussed image of at least part of the image array is displayed in the window region.

12. The method according to claim 11, further comprising, after cutting the web into sheets:
printing a graphics layer onto the at least one opacifying layer on the first and/or second surfaces of the polymer substrate in at least one sheet-fed process.

13. The method according to claim 11, wherein:
the image array is provided on the first surface of the polymer substrate, and
the focussing element array includes an optical spacing portion.

14. The method according to claim 1, wherein the casting tool is a focussing element cylinder.

15. The method according to claim 6, wherein the graphics layer is printed onto the at least one opacifying layer before performing step (a) and/or step (b).

16. The method according to claim 9, wherein the graphics layer is printed onto the at least one opacifying layer before applying the image array to the polymer substrate.

17. The method according to claim 12, wherein the graphics layer is printed onto the at least one opacifying layer before applying the array of focussing elements to the first surface of the polymer substrate.

* * * * *